(12) United States Patent
Palumbo et al.

(10) Patent No.: US 10,790,523 B2
(45) Date of Patent: Sep. 29, 2020

(54) CPOX REACTOR CONTROL SYSTEM AND METHOD

(71) Applicant: Upstart Power, Inc., Southborough, MA (US)

(72) Inventors: Nathan Palumbo, West Boylston, MA (US); Siddhant Singhal, Brighton, MA (US); Matthew Otis, Allston, MA (US); Tyler Samuel Cote, Chelmsford, MA (US); Richard Flathers, Southborough, MA (US); Paul Osenar, Boxborough, MA (US)

(73) Assignee: Upstart Power, Inc., Southborough, MA (US)

( * ) Notice: Subject to any disclaimer, the term of this patent is extended or adjusted under 35 U.S.C. 154(b) by 170 days.

(21) Appl. No.: 15/908,200

(22) Filed: Feb. 28, 2018

(65) Prior Publication Data

US 2018/0191009 A1 Jul. 5, 2018

Related U.S. Application Data

(63) Continuation-in-part of application No. 15/287,402, filed on Oct. 6, 2016.
(Continued)

(51) Int. Cl.
*H01M 8/0432* (2016.01)
*H01M 8/0612* (2016.01)
(Continued)

(52) U.S. Cl.
CPC ......... *H01M 8/04373* (2013.01); *B01J 4/001* (2013.01); *C01B 3/386* (2013.01);
(Continued)

(58) Field of Classification Search
CPC ..................................................... C01B 3/386
See application file for complete search history.

(56) References Cited

U.S. PATENT DOCUMENTS 3,162,411 A 12/1964 Duggan
3,372,960 A 3/1968 Fisher
(Continued)

FOREIGN PATENT DOCUMENTS

EP 1202366 8/2007
EP 1966850 9/2008
(Continued)

OTHER PUBLICATIONS

International Search Report for Application No. PCT/US2017/046246 dated Dec. 14, 2017, 6 pages.
(Continued)

*Primary Examiner* — Matthew J Merkling
(74) *Attorney, Agent, or Firm* — George N. Chaclas; Burns & Levinson, LLP

(57) ABSTRACT

A fuel reformer module (8005) for initiating catalytic partial oxidation (CPOX) to reform a hydrocarbon fuel oxidant mixture (2025, 3025) to output a syngas reformate (2027) to solid oxide fuel cell stack (2080, 5040). A solid non-porous ceramic catalyzing body (3030) includes a plurality of catalyst coated fuel passages (3085). A thermally conductive element (9005, 10005, 11005, 13005), with a coefficient of thermal conductivity of 50 W/m° K or greater is thermally conductively coupled with the catalyzing body. A first thermal sensor (8030) is thermally conductively coupled with the thermally conductive element. A second thermal sensor is thermally conductively coupled with a surface of the fuel cell stack. A control method independently modulates an
(Continued)

oxidant input flow rate, based on first thermal sensor signal values, a hydrocarbon fuel input flow rate, based on second thermal sensor signal values.

19 Claims, 17 Drawing Sheets

Related U.S. Application Data

(60) Provisional application No. 62/243,960, filed on Oct. 20, 2015.

(51) Int. Cl.
| | |
|---|---|
| C01B 3/38 | (2006.01) |
| H01M 4/86 | (2006.01) |
| B01J 4/00 | (2006.01) |
| H01M 8/04701 | (2016.01) |
| H01M 8/04537 | (2016.01) |
| H01M 8/04746 | (2016.01) |
| H01M 8/2425 | (2016.01) |
| H01M 8/124 | (2016.01) |

(52) U.S. Cl.
CPC ..... *H01M 4/8621* (2013.01); *H01M 8/04365* (2013.01); *H01M 8/04619* (2013.01); *H01M 8/04731* (2013.01); *H01M 8/04738* (2013.01); *H01M 8/04753* (2013.01); *H01M 8/04776* (2013.01); *H01M 8/0618* (2013.01); *H01M 8/0631* (2013.01); *H01M 8/2425* (2013.01); *C01B 2203/066* (2013.01); *C01B 2203/1619* (2013.01); *H01M 2008/1293* (2013.01)

(56) References Cited

U.S. PATENT DOCUMENTS

| | | | |
|---|---|---|---|
| 4,656,689 A | 4/1987 | Dennis | |
| 4,910,100 A | 3/1990 | Nakanishi et al. | |
| 4,997,726 A | 3/1991 | Akiyama et al. | |
| 5,169,730 A | 12/1992 | Reichner et al. | |
| 5,415,233 A | 5/1995 | Roussakis et al. | |
| 5,501,472 A | 3/1996 | Brancher et al. | |
| 5,732,440 A | 3/1998 | Wright | |
| 5,733,675 A | 3/1998 | Dederer et al. | |
| 5,750,278 A | 5/1998 | Gillett et al. | |
| 5,827,620 A | 10/1998 | Kendall | |
| 6,221,522 B1 | 4/2001 | Zafred et al. | |
| 6,265,092 B1 | 7/2001 | Meltser et al. | |
| 6,306,531 B1 | 10/2001 | Clingerman et al. | |
| 6,358,640 B1 | 3/2002 | Kendall et al. | |
| 6,485,852 B1 | 11/2002 | Miller et al. | |
| 6,492,050 B1 | 12/2002 | Sammes | |
| 6,608,463 B1 | 8/2003 | Kelly et al. | |
| 6,627,339 B2 | 9/2003 | Haltiner, Jr. | |
| 6,696,187 B2 | 2/2004 | Kendall et al. | |
| 6,770,106 B1 * | 8/2004 | Okamoto ............... | B01J 8/0242 |
| | | | 48/127.9 |
| 6,824,907 B2 | 11/2004 | Sarkar et al. | |
| 6,841,284 B2 | 1/2005 | Brown et al. | |
| 7,001,682 B2 | 2/2006 | Haltiner, Jr. | |
| 7,008,711 B2 | 3/2006 | Pondo et al. | |
| 7,014,822 B1 | 3/2006 | Shinke et al. | |
| 7,195,663 B2 | 3/2007 | Edlund et al. | |
| 7,226,681 B2 | 6/2007 | Florence et al. | |
| 7,252,902 B2 | 8/2007 | Bram et al. | |
| 7,335,432 B2 | 2/2008 | Koripella | |
| 7,349,959 B2 | 3/2008 | Imamura et al. | |
| 7,419,060 B2 | 9/2008 | Arthur et al. | |
| 7,422,810 B2 | 9/2008 | Venkataraman et al. | |
| 7,425,381 B2 | 9/2008 | Gilman et al. | |
| 7,452,622 B2 | 11/2008 | Sarkar et al. | |
| 7,645,535 B2 | 1/2010 | Rehg et al. | |
| 7,655,337 B2 | 2/2010 | Kaye | |
| 7,674,543 B2 | 3/2010 | Chiang et al. | |
| 7,767,329 B2 | 8/2010 | Crumm et al. | |
| 7,875,403 B2 | 1/2011 | Finnerty | |
| 7,887,959 B2 | 2/2011 | Gallet et al. | |
| 7,943,263 B2 | 5/2011 | Brantley et al. | |
| 8,026,011 B2 | 9/2011 | Ooshima et al. | |
| 8,043,760 B2 | 10/2011 | Okamoto et al. | |
| 8,071,251 B2 | 12/2011 | Eshraghi et al. | |
| 8,163,433 B2 | 4/2012 | Zafred et al. | |
| 8,178,256 B2 | 5/2012 | Ogawa et al. | |
| 8,188,382 B2 | 5/2012 | Monden et al. | |
| 8,197,249 B1 | 6/2012 | Nguyen | |
| 8,197,976 B2 | 6/2012 | Poshusta et al. | |
| 8,273,485 B2 | 9/2012 | Schaevitz et al. | |
| 8,304,122 B2 | 11/2012 | Poshusta et al. | |
| 8,343,684 B2 | 1/2013 | Devoe et al. | |
| 8,377,604 B2 | 2/2013 | Nakajima et al. | |
| 8,389,180 B2 | 3/2013 | Hawkes et al. | |
| 8,530,114 B2 | 9/2013 | Kirkwood | |
| 8,614,023 B2 | 12/2013 | Poshusta et al. | |
| 8,628,891 B2 | 1/2014 | Brown et al. | |
| 8,652,707 B2 | 2/2014 | Finnerty et al. | |
| 8,658,327 B2 | 2/2014 | Mook et al. | |
| 8,714,563 B2 | 5/2014 | Yamamoto et al. | |
| 8,715,879 B2 | 5/2014 | Devoe et al. | |
| 9,056,768 B2 | 6/2015 | Langan | |
| 9,065,159 B2 | 6/2015 | Chan et al. | |
| 9,105,917 B2 | 8/2015 | Kuehn et al. | |
| 9,190,673 B2 | 11/2015 | Venkataraman et al. | |
| 9,343,758 B2 | 5/2016 | Poshusta et al. | |
| 9,452,475 B2 | 9/2016 | Armstrong et al. | |
| 9,500,116 B2 | 11/2016 | Foos et al. | |
| 9,559,364 B2 | 1/2017 | Wood et al. | |
| 9,831,043 B2 | 11/2017 | Roumi et al. | |
| 9,863,557 B2 | 1/2018 | Haynes et al. | |
| 2001/0041159 A1 * | 11/2001 | Tamhankar ............... | B01J 23/63 |
| | | | 423/418.2 |
| 2003/0054215 A1 | 3/2003 | Doshi et al. | |
| 2005/0053819 A1 | 3/2005 | Paz | |
| 2005/0081444 A1 | 4/2005 | Anumakonda et al. | |
| 2005/0089465 A1 * | 4/2005 | Anumakonda ......... | B01J 12/007 |
| | | | 423/418.2 |
| 2005/0217991 A1 | 10/2005 | Dahlquist, Jr. | |
| 2005/0269234 A1 | 12/2005 | Gore et al. | |
| 2006/0127725 A9 | 6/2006 | Sarkar et al. | |
| 2006/0153751 A1 * | 7/2006 | Tonkovich ............. | B01J 12/007 |
| | | | 422/600 |
| 2007/0099065 A1 | 5/2007 | Rawson et al. | |
| 2007/0237998 A1 | 10/2007 | Armstrong et al. | |
| 2008/0118803 A1 | 5/2008 | Dekker et al. | |
| 2008/0211226 A1 | 9/2008 | Whitney | |
| 2009/0044971 A1 | 2/2009 | Kataoka et al. | |
| 2009/0050680 A1 | 2/2009 | Martin et al. | |
| 2009/0142639 A1 | 6/2009 | Gregorski | |
| 2010/0044971 A1 | 2/2010 | Henry | |
| 2015/0004528 A1 | 1/2015 | Palumbo et al. | |
| 2015/0144841 A1 * | 5/2015 | Finnerty ............... | H01M 8/0618 |
| | | | 252/373 |
| 2016/0099476 A1 | 4/2016 | Palumbo et al. | |
| 2017/0110748 A1 | 4/2017 | Palumbo et al. | |

FOREIGN PATENT DOCUMENTS

| | | |
|---|---|---|
| JP | 2006019119 | 1/2006 |
| JP | 2009140695 | 6/2009 |
| JP | 2011129280 | 6/2011 |
| WO | WO2007/076440 | 7/2007 |
| WO | 2013/088122 | 6/2013 |
| WO | 2018/031742 | 2/2018 |

OTHER PUBLICATIONS

International Search Report for Application No. PCT/US2017/055554 dated Dec. 14, 2017, 7 pages.
K. Burke et al., "Development of Passive Fuel Cell Thermal Management Materials", May 12, 2009, pp. 1-13.

(56) References Cited

OTHER PUBLICATIONS

Lessing, A review of sealing technologies applicable to solid oxide electrolysis cells, Journal of Materials Science, 2007, pp. 3465-3476, vol. 42, No. 10.
M.K. Mahapatra et al., "Glass-based seals for solid oxide fuel and electrolyzer cells—A review", Materials Science and Engineering R, 67 (2010), pp. 65-85.
ENrG Incorporated, HEXIM—Improved Thermal Management of SOFC, MCFC, PEM and HTPEM Fuel Cell and Reformer Systems, Apr. 16, 2014, 1 page.
Baukal Jr., The John Zink Hamworthy Combustion Handbook, Second Edition; vol. 3, Applications, 2013, pp. 321-322, vol. 3, ISBN; 1439839662, CRC Press.
Flash Back and Flame Arrestors, International Industrial Gases Ltd., 7 pages.
HHO 3/8" Flashback Arrestor Hydrogen Fuel Cell Generator Flash Flame Browns Gas, eBay Jan. 19, 2015, 3 pages.
international Search Report and Written Opinion for International PCT Application No. PCT/US2019/019183, dated May 2, 2019, 13 pages.

\* cited by examiner

| O:C | T_CPOX (C) | %CH4 | %C2Hx |
|---|---|---|---|
| 1.237 | 610 | 0.25% | 0% |
| 1.243 | 610 | 0.21% | 0% |
| 1.268 | 611 | 0.14% | 0% |
| 1.269 | 612 | 0.13% | 0% |
| 1.318 | 616 | 0.04% | 0% |
| 1.318 | 615 | 0.03% | 0% |
| 1.349 | 618 | 0.02% | 0% |
| 1.379 | 619 | 0.00% | 0% |
| 1.397 | 621 | 0.00% | 0% |
| 1.451 | 624 | 0.00% | 0% |
| 1.485 | 628 | 0.00% | 0% |

CPOX REACTOR CONTROL SYSTEM AND METHOD

1 CROSS REFERENCE TO RELATED U.S. PATENT APPLICATIONS

The present application claims the benefit of U.S. Provisional Patent Application Ser. No. 62/243,960 entitled Improved CPOX Fuel Reformer and SOFC System, filed Oct. 20, 2015 under 55 U.S.C. § 119(e) and is a continuation-in-part of non-provisional U.S. patent application Ser. No. 15/287,402 entitled SOFC System Formed with Multiple Thermally Conductive Pathways, filed on Oct. 6, 2016, each of which is incorporated herein by reference in its entirety and for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © Protonex Technology Corporation 2015.

3 BACKGROUND

3.1 Field

The exemplary, illustrative technology described herein relates to Solid Oxide Fuel Cell (SOFC) systems and particularly to structural features and methods of making enclosure walls from thermally conductive materials and forming the enclosures to provide thermally conductive pathways designed to distribute thermal energy by thermal conduction in a desired manner. More specifically the technology relates to thermal energy management in an SOFC system by providing thermally conductive pathways configured to improve operating performance, safety, and reliability.

3.2 The Related Art

Conventional solid oxide fuel cell (SOFC) systems used to generate electrical energy by an electrochemical process that typically utilized gas to gas heat exchangers to transfer thermal energy from exhaust gases to incoming air. Example embodiments are disclosed in U.S. Pat. No. 8,557,451 entitled Fuel Processor for Fuel Cell System, issued Oct. 15, 2013 and in U.S. Pat. No. 8,197,976 entitled Solid Oxide Fuel Cell System with Hot Zones and Two-Stage Tail Gas Combustors. While the gas-to-gas heat exchangers transfer waste heat from exhaust gases to incoming cathode air, the overall systems operate with hot spots at the tail gas combustion chamber and other locations where fuel is being combusted.

In conventional SOFC systems, the temperature surrounding hot spots tends to exceed a safe operating temperature for many highly thermally conductive metals such as copper and aluminum. Additionally, highly thermally conductive metals such as copper and aluminum are often damaged by oxidation when exposed to oxygen rich cathode gasses used in conventional SOFC systems. This has led to reluctance in the art to use highly thermally conductive metals with conventional SOFC systems which are instead constructed with temperature resistant metals surrounding the hot spots to avoid burn through and other failures including shortened product life caused by metal oxidation. The temperature resistant metals tend to include elevated temperature resident super alloys usually comprising nickel and cobalt such as Hastelloy, Monel, Inconel, and others that are less likely to be damaged by prolonged elevated temperature and oxygen exposure. One problem with using elevated temperature resistant super alloys is that they have a low coefficient of thermal conductivity such as less than about 40 W/m° K and more generally less than 20 W/m° K. As compared with more thermally conductive metals (e.g. aluminum and copper alloys) with a coefficient of thermal conductivity of more than 200 W/m° K, the elevated temperature resistant super alloys are poorer thermal conductors. As a result, heat transfer by thermal conduction in conventional SOFC enclosures is slow and the slow rate of thermal conduction tends to create permanent hot spots or temperature gradients in the overall structure of the SOFC system.

More recently SOFC systems have been constructed to promote thermal energy transfer by thermal conduction to reduce thermal gradients. One such system is disclosed in U.S. application Ser. No. 14/399,795 entitled SOFC-Conduction published Apr. 7, 2016 as US: 20160099476A1. This document discloses an SOFC system that is formed with inner and outer metal enclosures formed as thermally conductive pathways made from more thermally conductive metals such as aluminum and copper alloys in order to improve the rate of thermal conduction from hot spots to cooler areas of the structure. By providing a thermally conductive pathway with a higher coefficient of thermal conductivity and providing some walls with a larger thermal mass than others, thermal gradients are reduced as each different enclosure wall system tends to more rapidly normalize to a uniform temperature enabled by more rapid thermal conduction through the aluminum and copper enclosure walls which in some cases include a copper core.

Conventional SOFC systems utilize internal temperature sensors to measure instantaneous temperature at hot spot locations located inside hot zones of the SOFC system. An electric controller monitors the instantaneous temperature reported by each internal temperature sensor. If an over temperature condition is detected, the electronic controller is operable to shut down operation of the SOFC system by closing an input fuel valve. However, one problem with the use of internal sensors in an elevated temperature environment is that the thermal sensors can fail to provide the instantaneous internal temperature at all or can provide an inaccurate instantaneous temperature. As a result of a damaged or inaccurate internal thermal sensor an over temperature condition goes undetected and that can cause catastrophic failure such as a burn through of one of the enclosure walls. Other consequences include damage to thermal insulation surrounding hot zones and or damage to coating layers applied to internal and external enclosure wall surfaces. Even when damage due to an over temperature condition is minimal, when internal temperature sensors fail they need to be replaced. To replace a damaged internal temperature sensor the SOFC system must be disassembled and this is costly.

In view of the foregoing discussion there is a need in the art to provide an SOFC system that uses external temperature sensors to detect over temperature operating conductions that may lead to system damage or failure without relying on internal sensors. There is a further need in the art to provide a passive backup to thermal sensors that detect over temperature conditions. The passive back is provided to shut down the SOFC system if the temperature sensor fails or otherwise reports an inaccurate temperature.

4 SUMMARY

The present disclosure solves problems relating to controlling a solid oxide fuel cell system and controlling a catalytic partial oxidation (CPOX) fuel reformer operating to reform a mixture of hydrocarbon fuel and an oxidant, e.g. air. The syngas reformate is delivered to the anode side of a plurality of solid oxide fuel cells (SOFC) operating to generate electrical power. The CPOX reformer of the present disclosure includes a control system and a control method for monitoring changes in a temperature of each the CPOX reaction and changes in a temperature or the SOFC reaction as well as control elements for independently modifying an input flow rate of the hydrocarbon fuel and independently modifying an input flow rate of the oxidant.

A fuel reformer module of the present disclosure initiates a CPOX reaction to reform a hydrocarbon fuel oxidant mixture into a syngas reformate. The fuel reformer module includes catalyzing body, having an input end for receiving the hydrocarbon fuel oxidant mixture therein and an output end for delivering the syngas reformate therefrom. The catalyzing body is formed from a solid non-porous ceramic substrate with a plurality of independent catalyst fuel passages extending between the input end and an output end of each fuel passage. An inside surface of each catalyst fuel passages is coated with a catalyst layer comprising a material selected to initiate the CPOX reaction. A thermally conductive element, comprising a material having a coefficient of thermal conductivity of 50 W/m° K or greater and preferably 100 W/m° K or greater is thermally conductively coupled with the catalyzing body over a contact surface area. The contact surface area can be an external or internal surface of the catalyzing body and preferably extends along a longitudinal axis of the catalyzing body. A first thermal sensor is thermally conductively coupled with the thermally conductive element. The first thermal sensor generates a first temperature signal corresponding with a surface temperature of the thermally conductive element proximate to whatever surface of the thermally conductive element the first thermal sensor is coupled to.

An SOFC system of the present disclosure includes the above described fuel reformer module and a fuel oxidant control module configured to mix the hydrocarbon fuel oxidant mixture in various proportion. The fuel oxidant control module is disposed between a hydrocarbon fuel supply source and an oxidant supply source and the input end of the catalyzing body. A hydrocarbon fuel flow rate modulator is disposed between the hydrocarbon fuel source and the input end. An oxidant flow rate modulator is disposed between the oxidant source and the input end. An electronic controller is operated to transmit independent command and control signals to each of the hydrocarbon fuel flow rate modulator and the oxidant flow rate modulator.

The SOFC system includes a solid oxide fuel cell (SOFC) stack comprising a plurality individual SOFC fuel cells each comprising a solid oxide anode electrode layer. The syngas reformate output from the fuel reformer module is directed to flow over the solid oxide anode electrode layers to initiate and maintain an SOFC reaction. A hot zone enclosure comprises a plurality of hot zone enclosure walls that are joined together to enclose a hot zone cavity surrounding the SOFC stack. The hot zone enclosure walls are formed from materials having a coefficient of thermal conductivity of 100 W/m° K or greater and are joined together using to form a first continuous thermally conductive pathway that includes all the hot zone enclosure walls. A second thermal sensor is thermally conductively coupled with a surface of the first thermally conductive pathway for generating a second temperature signal corresponding with a temperature of the surface of the first thermally conductive pathway that he second thermal sensor is coupled to.

A range of first set point temperature values are stored by the electronic controller. The range of first set point values corresponds with a calibrated operating temperature range know to produce the syngas reformate having a desired syngas composition. In one example the first set point temperature values correspond with a syngas composition has a low percentage of unreacted hydrocarbon fuel molecules. A range of second set point temperature values are stored by the electronic controller. The range of second set point values corresponds with a calibrated operating temperature range know to produce a desired performance characteristic of the SOFC stack. In one example the second set point temperature values correspond with a fuel to electrical power efficiency rating.

The electronic controller operates a first control loop based on sampling the first thermal sensor signal values. The first control loop commands the oxidant flow rate modulator to increase or decrease the oxidant flow rate to maintain the sampled first temperature signal values within the range of first set point values. The electronic controller operates a second control loop based on sampling second thermal sensor signal values. The second control loop commands the hydrocarbon fuel flow rate modulator to increase or decrease the hydrocarbon fuel flow rate to maintain the sampled second temperature signal values within the range of second set point values.

A method for controlling the SOFC system included delivering a hydrocarbon fuel and oxidant mixture into the input end of the catalyzing body. A hydrocarbon fuel flow rate modulator is disposed between a hydrocarbon fuel supply source and the input end of the catalyst body. An oxidant flow rate modulator disposed between an oxidant supply source and the input end of the catalyst body. The electronic controller delivers first command and control signals to the oxidant flow rate modulator to modulate an oxidant flow rate. The electronic controller delivers second command and control signals to the hydrocarbon fuel flow rate modulator to modulate a hydrocarbon fuel flow rate. An input manifold provided between the catalyst body output end and an SOFC stack delivers the syngas reformate output from the catalyst body to the solid oxide anode electrodes of the solid oxide fuel cell (SOFC) stack to initiate an SOFC reaction at an SOFC reaction temperature. The electronic controller samples the first temperature control signals generated by the first temperature sensor and also sampled second temperature control signals generated by a second temperature sensor. The electronic controller stores a range of first set point temperature values corresponding with a desired composition of the syngas reformate being output from the fuel reformer module and stores a range of second set point temperature values corresponding with a desired performance characteristic of the SOFC stack. The electronic controller operates a first control loop based on sampling first temperature sensor signal values and commanding the oxidant flow rate modulator to increase or decrease the oxidant flow rate to maintain the sampled first temperature signal values within the range of first set point values. The electronic controller operates a second control loop based on sampling second thermal sensor signal values and commanding the hydrocarbon fuel flow rate modulator to increase or decrease the hydrocarbon fuel flow rate to maintain the sampled second temperature signal values within the range of second set point values.

5 BRIEF DESCRIPTION OF THE DRAWINGS

The features of the present disclosure will best be understood from a detailed description of the subject technology and example embodiments thereof selected for the purposes of illustration and shown in the accompanying drawings in which.

6 DEFINITIONS

Figure 1:
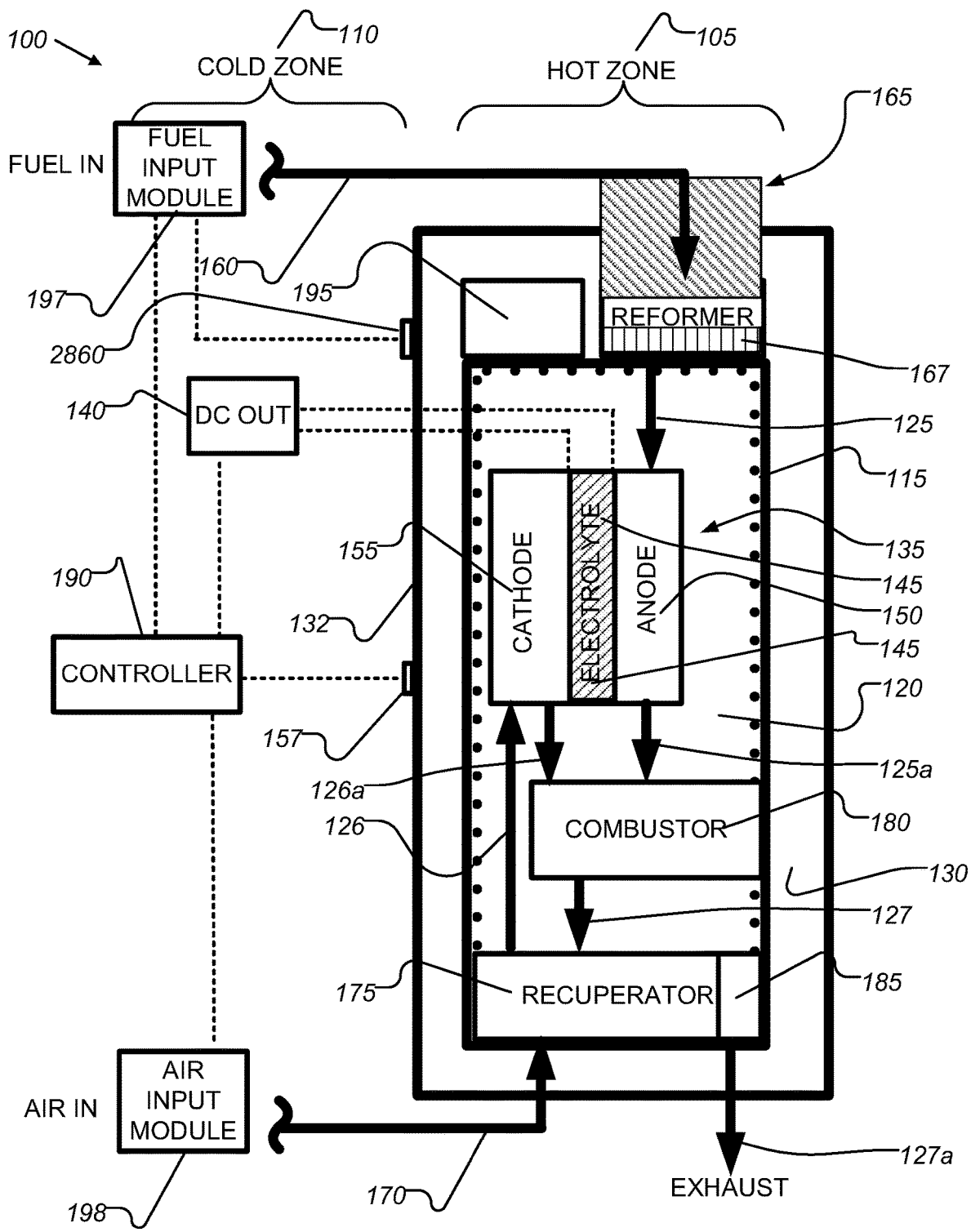
FIG. 1 depicts a schematic view of a non-limiting exemplary SOFC system embodiment according to the present disclosure.

The following definitions are used throughout, unless specifically indicated otherwise:

| TERM | DEFINITION |
| --- | --- |
| Hastelloy | A group of alloys comprising predominantly metal nickel plus molybdenum, chromium, cobalt, iron, copper, manganese titanium, zirconium, aluminum, and tungsten in varying percentages, between zero and 20%. Hastelloy alloys are primarily used for effective survival under high temperature and or high stress in moderate to severely corrosive environments. Available from Haynes International Inc. of Kokomo IN, USA. |
| Monel | A group of alloys comprising up to 67% metal nickel and cobalt, up to 30% copper with between 0 and 5% iron, titanium, manganese, carbon, and silicon and aluminum. Monel is used for its resistance to corrosion. Available from Special Metals Corp. of New Hartford NY, USA. |
| SOFC | Solid Oxide Fuel Cell |
| Inconel | A family of austenitic nickel-chromium alloys comprising nickel 40-70%, chromium 14-30%, iron 3-9%, manganese 0.3-1%, plus silicon, carbon, sulfur, and other elements. Inconel is used for its resistance to oxidation and corrosion and strength over a wide range of temperatures. When heated, Inconel forms a thick stable passivating oxide layer protecting the surface from further attack. Attractive for high temperature applications to reduce creep. Available from Special Metals Corp. of New Hartford NY, USA. |
| Cermet | Any of a class of heat-resistant materials made of ceramic and sintered metal. Often formed and sintered as a ceramic oxide mixture and converted through the reduction from an oxide ceramic to the metallic phase. (NiO-YSZ →Ni-YSZ). |
| Perovskite | A ternary material with the general structure $A^{[12]}B^{[6]}X\text{-}3^{[6]}$ same type of crystal structure as calcium titanium oxide ($CaTiO_3$). |

7 ITEM NUMBER LIST

The following item numbers are used throughout, unless specifically indicated otherwise.

| ITEM NUMBER | DESCRIPTION |
| --- | --- |
| 100 | SOFC system |
| 105 | Hot zone |
| 110 | Cold zone |
| 115 | Hot zone enclosure walls |
| 120 | Hot zone cavity |
| 125 | Anode gas |
| 125a | Spent anode gas |
| 126 | Cathode gas |
| 126a | Spent cathode gas |
| 127 | Combustion exhaust gases |

| ITEM NUMBER | DESCRIPTION |
|---|---|
| 127a | Spent exhaust gas |
| 130 | Thermal insulation |
| 132 | Outer enclosure walls |
| 135 | Fuel cell stack |
| 140 | DC power output module |
| 145 | Solid electrolyte layer |
| 150 | Solid oxide anode electrode |
| 155 | Solid oxide cathode electrode |
| 157 | Hot zone thermocouple/temperature sensor |
| 160 | Incoming fuel |
| 165 | Fuel reformer module |
| 167 | Catalyst support structure |
| 170 | Incoming air |
| 175 | Recuperator module |
| 180 | Combustor module |
| 185 | Exhaust port |
| 190 | Electronic controller |
| 195 | Cold start module |
| 197 | Fuel input module |
| 198 | Air input module |
| 2000 | SOFC fuel cell stack assembly |
| 2005 | SOFC fuel cell stack |
| 2010 | Cathode chamber |
| 2015 | Longitudinal cylindrical side wall |
| 2016 | Disk shaped bottom end wall |
| 2017 | Disk shaped top end wall |
| 2020 | Fuel reformer module |
| 2025 | Incoming fuel air mixture |
| 2026 | Spent cathode gas |
| 2027 | Reformed fuel/syngas |
| 2028 | Spent fuel |
| 2045 | Fuel input conduit |
| 2055 | Fuel inlet manifold |
| 2060 | Longitudinal axis |
| 2080 | Tubular fuel cells |
| 2082 | Disk shaped top tube support wall |
| 2084 | Disk shaped bottom tube support wall |
| 2086 | Tube holding flange |
| 2115 | Anode gas flow |
| 2135 | Combustion chamber |
| 2145 | Cathode feed tube |
| 2150 | Combustor exit port |
| 2155 | Air gap |
| 2165 | System exit port |
| 2200 | Incoming air |
| 2205 | Air input port |
| 2210 | Recuperator chamber |
| 2212 | Flow barrier |
| 2214 | Disk shaped separator wall |
| 2230 | Recuperator input ports |
| 2235 | Recuperator output port |
| 2240 | Air exit ports |
| 2245 | Cathode chamber exit port |
| 2300 | Cold start combustion chamber |
| 2302 | Cold start exit port |
| 2304 | Fuel inlet |
| 2306 | Ignitor |
| 2510 | Intermediate cylindrical sidewall |
| 2511 | Disk shaped intermediate bottom end wall |
| 2512 | Thermal insulation |
| 2513 | Disk shaped intermediate top end wall |
| 2514 | Outer cylindrical sidewall |
| 2516 | Disk shaped outer top wall |
| 2518 | Disk shaped outer bottom wall |
| 2830 | Fuel supply valve power conduit |
| 3000 | Fuel reformer system |
| 3005 | Cylindrical fuel chamber |
| 3010 | Annular perimeter wall |
| 3015 | Reactor shield base wall |
| 3017 | Fuel chamber cap |
| 3020 | Fuel reformer module |
| 3025 | Incoming fuel air mixture |
| 3030 | Cylindrical catalyzing body |
| 3032/3033 | Catalyzing body input end |
| 3034 | Catalyzing body output end |
| 3035 | Cylindrical catalyzing cavity |
| 3040 | Fuel reactor body |
| 3055 | Fuel inlet manifold |
| 3060 | Annular enclosure wall |
| 3065 | Catalyzing body support flange |
| 3070 | Circular aperture |
| 3075 | First annular washer |
| 3080 | Annular thermally insulating element |
| 3085 | Catalyst fuel passage |
| 3088 | Catalyst fuel passage (larger square) |
| 3090 | Catalyst layer |
| 3095 | Base wall fuel passages |
| 3100 | Heat dissipating flange |
| 3102 | Disk shaped outer enclosure top end flange |
| 3105 | Annular seal plate |
| 3110 | O-ring seal element |
| 3115 | O-ring seal element |
| 3120 | Fasteners |
| 3125 | Array of fuel passages |
| 3130 | Air moving element |
| 3135 | Temperature sensing element |
| 3140 | Communication pathway |
| 5000 | SOFC system |
| 5002 | Cathode chamber |
| 5010 | Circumferential edge |
| 5015 | Inner shaded area |
| 5020 | Outer shaded area |
| 5025 | Cathode feed tube |
| 5030 | Longitudinal central axis |
| 5035 | Inner circular pattern |
| 5040 | Tubular fuel cell |
| 5045 | Outer circular pattern |
| 7000 | Fuel Reformer System |
| 7005 | Fuel chamber |
| 7010 | Annular perimeter wall |
| 7015 | Reactor shield base wall |
| 7020 | Fuel reformer module |
| 7035 | Cylindrical catalyzing cavity |
| 7040 | Fuel reactor body |
| 7045 | Fuel conduit |
| 7060 | Annular enclosure wall |
| 7102 | Outer enclosure top end flange |
| 7105 | Annular seal plate |
| 7110 | O-ring seal element |
| 7135 | External temperature sensor |
| 7140 | Communication pathway |
| 7610 | Fuel supply valve |
| 7666 | Fuel supply valve communication channel |
| 7830 | Power conduit |
| 7860 | Thermal fuse |
| 8000 | Solid Oxide Fuel Cell (SOFC) system |
| 8005 | Fuel/oxidant input control module |
| 8010 | Oxidant supply source |
| 8015 | Mixing chamber |
| 8017 | Oxidant input conduit |
| 8020 | Hydrocarbon fuel supply source |
| 8022 | Fuel input conduit |
| 8025 | Oxidant flow modulator |
| 8030 | First thermal sensor |
| 8031 | First temperature signal |
| 8035 | Hydrocarbon fuel flow modulator |
| 8040 | Second thermal sensor |
| 8041 | Second temperature signal |
| 8045 | Cathode air or other oxidant source |

-continued

| ITEM NUMBER | DESCRIPTION |
| --- | --- |
| 8050 | Cathode air flow modulator |
| 8055 | Cathode air input conduit |
| 9005 | Prismatic rod |
| 9010 | External surface of the catalyzing body |
| 9015 | Longitudinal axis of the prismatic rod |
| 9020 | Longitudinal axis of the catalyzing body |
| 9025 | Through hole or blind hole |
| 10005 | Nearly horizontal cylindrical segment |
| 10010 | External surface of the catalyzing body |
| 10015 | Longitudinal axis of the nearly horizontal cylindrical segment |
| 10020 | Longitudinal axis of the cylindrical catalyzing body |
| 10025 | Through hole or blind hole |
| 11005 | Hollow cylinder |
| 11010 | External surface of the catalyzing body |
| 11015 | Longitudinal axis of the hollow cylinder |
| 11020 | Longitudinal axis of the catalyzing body |
| 12005 | Spiral portion of a hollow cylinder |
| 12010 | External surface of the catalyzing body |
| 12015 | Longitudinal axis of the spiral portion of a hollow cylinder |
| 12020 | Longitudinal axis of the catalyzing body |
| 13005 | Thermally conductive element |
| 13007 | Central cavity |
| 13010 | Circumferential external surface |
| 13020 | Central longitudinal axis of the cylindrical catalyzing body |
| 13025 | Through hole or blind hole |
| 13030 | Cylindrical catalyzing body |
| 13032 | Input end of the cylindrical catalyzing body |
| 13034 | Output end of the cylindrical catalyzing body |
| 14010 | Circumferential external surface |
| 14020 | Longitudinal axis of the cylindrical catalyzing body |
| 14030 | Cylindrical catalyzing body |
| 14031 | Open cells |
| 14032 | Input end |
| 14034 | Output end |
| 1500 | Calibration data graph |
| 1505 | Calibration data table |
| 1510 | Linear plot |
| 1515 | Non-linear plot |
| 1520 | Plot that is not clearly linear or non-linear |
| 1530 | Set point values |

8 DETAILED DESCRIPTION

8.1 Solid Oxide Fuel Cell System

Referring to FIG. 1, a schematic diagram of a first exemplary non-limiting embodiment of the present disclosure depicts a Solid Oxide Fuel Cell (SOFC) system (100). The system (100) includes a hot zone (105) enclosed within hot zone enclosure walls (115) which in the present embodiment enclose a cylindrical hot zone cavity (120). The hot zone enclosure walls (115) are further enclosed by a layer of thermal insulation (130) which is further enclosed by outer enclosure walls (132). The hot zone enclosure walls (115) and the outer enclosure walls (132) each include a separate cylindrical side wall with each sidewall mechanically interfaced with a different pair of opposing disk shaped end walls described further below.

The hot zone enclosure walls (115) enclose a fuel cell stack (135). The fuel cell stack (135) includes at least one SOFC fuel cell but preferably includes a plurality of SOFC fuel cells each electrically interconnected in series or in parallel with a DC power output module (140). The DC power output module receives electrical power generated by the fuel cell stack and delivers output power to an external power load, (not shown). Each fuel cell comprises a solid oxide cathode electrode (155) which is oriented for exposure to cathode gas present inside the hot zone cavity (120). The hot zone cavity (120) is filled with a cathode gas that at least comprises oxygen, e.g. air, (126) during operation and the cathode gas in the hot zone cavity (120) chemically reacts with surfaces of the solid oxide cathode electrode (155). Each fuel cell further comprises a solid oxide anode electrode (150) which is not exposed to the hot zone cavity (120) or to the cathode gas contained therein but instead is oriented for exposure to an anode gas (reformed fuel) (125) such that during operation the anode gas is passed over the solid oxide anode electrode (150) in order to chemically react with the solid oxide anode electrode (150). The SOFC fuel cell further comprises a solid electrolyte layer (145) disposed to separate the solid oxide cathode electrode (155) from the solid oxide anode electrode (150). The solid electrolyte layer (145) is an oxygen ion conducting layer provided as an ion exchange medium for ion exchange between the solid oxide anode electrode (150) and the solid oxide cathode electrode (155).

The fuel cell stack (135) is maintained at a high operating temperature (e.g. ranging from 350 to 1200° C.), depending on the composition of the solid material layers of the fuel cell stack and the characteristics of the anode and cathode gases. A preferred operating temperature is selected to support efficient electrochemical energy generation. Electrical energy is generated by the fuel cell stack (135) when anode gas (125) comprising hydrogen is reacted with the solid oxide anode electrode (150) and cathode gas (126) comprising oxygen is reacted with the solid oxide cathode electrode (155).

The hot zone (105) further encloses a combustor module (180), or tail-gas combustor, which comprises a combustion chamber configured to receive spent anode gas (125a) and spent cathode gas (126a) after each of the spent anode gas and the spent cathode gas has reacted with the corresponding solid oxide anode electrode (150) and solid oxide cathode electrode (155). Upon mixing in the combustor module (180) the spent anode gas (125a) and the spent cathode gas (126a) are combusted. Thermal energy generated by combustion taking place inside the combustion module (180) is used to heat the hot zone enclosure walls (115) as well as the hot zone cavity (120).

The hot zone cavity (120) further encloses a recuperator module (175). The recuperator module (175) is in fluid communication with the combustor module (180) and receives combustion exhaust gases (127) exiting therefrom. The combustion exhaust gases (127) pass through the recuperator module (175) and transfer thermal energy therefrom to incoming air (170) when each of the combustion exhaust gases (127) and the incoming air (170) pass through separate gas conduits of a gas counter flow heat exchanger (not shown). Thereafter, spent combustion exhaust gas (127a) exits the recuperator module (175) and is delivered out of the hot zone through an exhaust port (185). The incoming air (170) after exiting from the recuperator module (175) comprises the cathode gas (126) which is delivered into the hot zone cavity (120).

The system cold zone (110) includes a fuel input module (197). Various hydrocarbon fuels such as propane, methane, or kerosene, and other suitable fuels, are received into the fuel input module (197) from various fuel sources (not shown). The fuel input module (197) is operable to modulate incoming fuel (160) delivered from the fuel source and deliver a desired volume or mass flow rate of incoming fuel (160) to the fuel reformer module (165). The fuel reformer (165) is operable to reform the fuel in a manner that makes the incoming fuel more suitable for the desired chemical reaction with the solid oxide anode electrode (150).

The incoming fuel (160) comprises a liquid or gaseous hydrocarbon compound from which hydrogen can be extracted. The incoming fuel (160) may be mixed with air and may be atomized or otherwise vaporized. The fuel reformer module (165) of the present disclosure comprises a Catalytic Partial Oxidation (CPOX) reactor which provides a catalyst support structure (167) having some of its surfaces coated by a catalytic layer, described below. As the incoming fuel is passed over the catalyst layer, the fuel is combusted or partially combusted inside the catalyst support structure (167). The heat generated by the combustion reforms the incoming fuel (160) into hydrogen gas (H.sub.2) and carbon monoxide gas (CO). The reformed fuel exits the fuel reformer module (165) as anode gas (125) which is reacted with the solid oxide anode electrode (150) of each fuel cell in the SOFC fuel cell stack (135).

The system cold zone (110) includes an air input module (198) for incoming air (170) or another oxygen rich source gas into the recuperator module (175). Air or any other oxygen rich source gas is received into the air input module (198) from various air sources, (not shown), or the air comprises room air which is pumped into the recuperator module (175) by a fan. The air input module (198) is operable to modulate air flow into the recuperator module (175). The recuperator module (175) heats the incoming air (170) with combustion exhaust gases (127) by passing the combustion exhaust gases through a gas counter flow heat exchanger (not shown). The heated air exits the recuperator as the cathode gas (126).

The system cold zone (110) includes an electronic controller (190) in electrical communication with the fuel input module (197) and the air input module (198). The electronic controller (190) includes a digital data processor and associated digital data memory with various operating programs and or digital logic control elements operating thereon to manage operation of the SOFC system (100). The electronic controller (190) is in electrical communication with the DC power output module (140) to monitor and modulate DC power output to a load. The electronic controller is also in electronic communication with the fuel input module (197) to monitor and modulate incoming fuel (160) and further is in electronic communication with the air input module (198) to monitor and modulate incoming air (170) and further is in electronic communication with the at least one temperature sensor (157) to monitor the temperature of one or more surfaces of the hot zone enclosure walls (115), the outer enclosure walls (132), the fuel reformer module (165) and other surfaces as may be required to monitor temperature of various surfaces of the SOFC system (100).

Each of the fuel input module (197) and the air input module (198) may include one or more gas pressure regulators, gas flow actuator valves, mass or volume gas flow rate controllers, and or mass flow rate sensors, or the like, gas pressure sensors, or the like, and temperature sensors, or the like, each operable by or otherwise in electrical communication with the electronic controller (190) to modulate incoming fuel (160) into the fuel reformer module (165) or incoming air (170) into the recuperator module (175). More specifically the fuel input module (197) in cooperation with the electronic controller (190) is operable to regulate input fuel pressure, to variably regulate incoming fuel mass or volume flow rates and to stop incoming fuel (160) from entering the SOFC system (100) as required. Similarly, the air input module (198) in cooperation with the electronic controller (190) may also be operable to regulate input air pressure, to variably regulate incoming air mass or volume flow rates and to stop incoming air (170) from entering the SOFC system (100) as required. In some operating environments the air input module (198) may comprise a simple fan running at constant angular velocity without any further air input control sensors or elements.

According to the present disclosure the fuel reformer module (165) is configured to cause an exothermic reaction between the incoming fuel (160) and catalyst layers provided on surfaces of the ceramic catalyst support structure (167) in order to reform the fuel into hydrogen gas (H.sub.2) and carbon monoxide (CO). Further, according to the present disclosure an improved fuel reformer module (165) comprises a ceramic catalyst support structure (167) comprising a plurality of longitudinal fuel flow passages, described below, with each longitudinal fuel flow passage being coated on internal surfaces thereof with a catalyst layer. In addition, the fuel reformer module (165) is configured to prevent auto ignition of unprocessed fuels entering the ceramic catalyst support structure (167) in part by providing the longitudinal fuel flow passage as a means of transferring thermal energy generated by the exothermic reaction taking place inside the ceramic catalyst support structure (167) out of the ceramic catalyst support structure (167) along the longitudinal pathways toward the incoming fuel. As can be seen in FIG. 1, the fuel reformer module (165) is disposed in part between the outer enclosure walls (132) and in part outside the outer enclosure walls (132) and is further configured to provide a thermally conductive pathway that passes through the outer enclosure walls (132). In addition, the SOFC system (100) optionally includes one or more cooling devices (e.g. air fans, water pumps, or the like) to cool portions of the fuel reformer module (165) that are disposed outside the outer enclosure walls (132).

The SOFC system (100) may optionally include a cold start module (195). The cold start module (195) is configured to receive and combust a portion of the incoming fuel (160) which is redirected into the cold start module (195). Operation of the cold start module (195) is initiated by the electronic controller (190) when the temperature of the incoming fuel (160) or the temperature of the hot zone enclosure walls (115) or the temperature of the fuel cell stack (135) is below a desired operating or reaction temperature. In operation, a portion of the incoming fuel (160) is diverted to a combustion chamber associated with the cold start module (195). A controllable fuel igniter is provided inside a combustion chamber of the cold start module (195) and fuel inside the combustion chamber is ignited and combusted to heat the incoming fuel (160), the fuel reformer module (165) and the hot zone enclosure walls (115) during a cold start. Once the SOFC system (100) reaches its desired operating temperature, operation of the cold start module (195) is terminated.

During operation, the electronic controller (190) is in communication with other electronic elements such as one or more cooling fans, one or more electrically operable gas flow actuator valves, gas flow rate detectors, and or gas modulators, associated with the fuel input module (197), the air input module (198) and electrical power output detectors, or the like, and other elements as may be required to control various operating parameters of the SOFC (100). The electronic controller (190) monitors DC current/power output as well as temperature measured by one or more thermocouples, or the like, and further operates to vary the mass flow rate of incoming fuel and optionally of incoming air as a means of increasing or decreasing DC current/power output.

8.2 Solid Oxide Fuel Cell Stack Side Section

Figure 2:
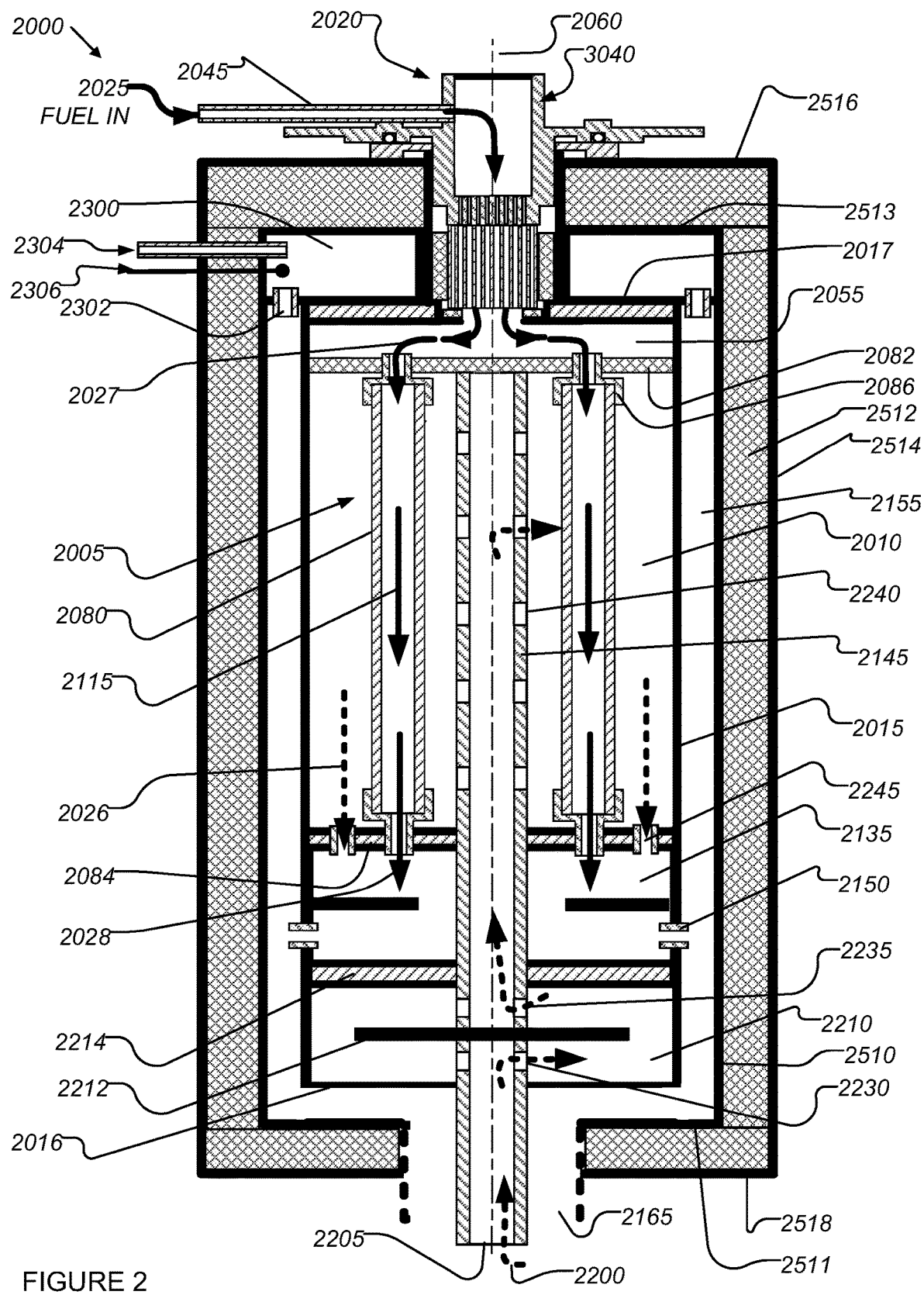
FIG. 2 depicts a schematic side section view taken through a non-limiting exemplary solid oxide fuel cell stack assembly according to the present disclosure.

Turning now to FIG. 2, a second non-limiting exemplary embodiment of an improved SOFC fuel cell stack assembly (2000) according to the present disclosure is shown in side section view. The SOFC fuel cell stack assembly (2000) includes a SOFC fuel cell stack (2005) comprising a plurality of tubular fuel cells (2080) each longitudinally extended along a substantially cylindrical hot zone cavity or cathode chamber (2010).

Turning now to FIG. 2, a second non-limiting exemplary embodiment of an improved SOFC fuel cell stack assembly (2000) according to the present disclosure is shown in side section view. The SOFC fuel cell stack assembly (2000) includes a SOFC fuel cell stack (2005) comprising a plurality of tubular fuel cells (2080) each longitudinally extended along a substantially cylindrical hot zone cavity or cathode chamber (2010).

In the present example embodiment, the disk shaped bottom end wall (2016) also forms a bottom wall of a recuperator chamber (2210). As described above the recuperator chamber (2210) is provided to heat incoming air (2200) entering the fuel cell stack assembly through a cathode feed tube (2145). The incoming air (2200), or cathode gas, flows into the recuperator chamber (2210) through recuperator input ports (2230) and out of the recuperator chamber (2010) returning back to the cathode feed tube (2145) through recuperator output ports (2235). One or a plurality the recuperator input ports (2230) and the recuperator output port (2235) may be disposed around the circumference of the cathode feed tube (2145). A flow barrier (2212) directs air flow toward peripheral walls of the recuperator chamber (2210) thereby increasing thermal energy exchange between air passing through the recuperator chamber and its peripheral walls. The recuperator chamber (2210) is bounded on a top side thereof by a disk shaped separator wall (2214) disposed between a combustion chamber (2135) and the recuperator chamber (2210). The disk shaped separator wall (2214) is configured to absorb thermal energy as spent anode and spent cathode gas is combusted inside the combustion chamber (2135) such that the absorbed thermal energy is reemitted into the recuperator chamber (2210).

An intermediate cylindrical enclosure surrounds the hot zone enclosure walls. The intermediate cylindrical enclosure is bounded by an open ended longitudinal intermediate cylindrical side wall (2510) that mechanically interfaces with a disk shaped intermediate bottom end wall (2511) and an opposing disk shaped intermediate top end wall (2513). The intermediate cylindrical enclosure is sized to form an air gap (2155) substantially surrounding the longitudinal cylindrical side wall (2015) and the disk shaped top end wall (2017). The air gap (2155) provides a fluid flow passage proximate to portions of the hot zone enclosure walls and the fluid passage is in fluid communication with a system exit port (2165). The air gap (2155) is further in fluid communication with the combustion chamber (2135) through one or more combustor exit ports (2150) and is in fluid communication with a cold start combustion chamber (2300) through one or more cold start exit ports (2302). Accordingly exhaust gas exiting each the combustion chamber (2135) and the cold start combustion chamber (2300) flows over outside surfaces of the hot zone enclosure walls before exiting the fuel cell stack assembly (2000) through the system exit port (2165). In one non-limiting example embodiment the dimension of the air gap (2155) from an exterior surface of wall (2015) to an interior surface of wall (2510) ranges from 1 to 4 mm. The intermediate cylindrical enclosure also encloses a cold start combustion chamber (2300) further described below.

Each of the intermediate enclosure walls (2510, 2511, and 2513) comprise Hastelloy, a Cobalt-Nickel-Chromium-Tungsten alloy that combines excellent high temperature strength with very good resistance to oxidizing environments up to 2000° F. (1095° C.). Other metal alloys are also suitable including Monel, which is a group of alloys comprising up to 67% metal nickel and about 30% copper with smaller amounts of iron, manganese, carbon, and silicon. In any event the intermediate enclosure walls (2510, 2511, and 2513) are preferably formed from a metal alloy that has a coefficient of thermal conductivity of less than about 25.0 W/m° K at the operating temperature of the hot zone. This much lower coefficient of thermal conductivity of the intermediate enclosure walls as compared with the thermal conductivity of the hot zone enclosure walls causes a much slower conductive heat flow rate from one area of the intermediate enclosure walls to another as compared with the heat flow rate of the hot zone enclosure walls which are formed from a metal alloy having much higher, e.g. at least 4 times greater, coefficient of thermal conductivity. Thus, according to one aspect of the present disclosure the intermediate enclosure walls (2510, 2511, and 2513) are formed as a second thermally conductive pathway having a slower rate of thermally conducted heat transfer. One other embodiments the intermediate enclose walls (2510, 2511, and 2513) may comprise steel or other metal alloys that may have a coefficient of thermal conductivity of less than about 50.0 W/m° K without deviating from the present disclosure.

An outer cylindrical enclosure surrounds the intermediate cylindrical enclosure. The outer enclosure is bounded by an open ended outer cylindrical side wall (2514) that mechanically interfaces with a disk shaped outer bottom wall (2518) and an opposing disk shaped outer top wall (2516). Each of the walls (2514, 2518, and 2516) preferably comprises aluminum or an aluminum alloy preferably having a coefficient of thermal conductivity above 140 W/m° K to support rapid thermal energy conduction in order to provide a substantially homogeneous temperature of the outer cylindrical enclosure during operation. A layer of thermal insulation (2512) is disposed between outside surfaces of the intermediate enclosure walls and the inside surfaces of outer enclosure walls and the layer of thermal insulation (2512) impedes thermal energy being radiated across the air gap (2155) or being carried through the air gap by exhaust gases exiting the SOFC system from reaching surfaces of the outer cylindrical side wall (2514) and the disk shaped outer bottom wall (2518). Preferably, the layer of thermal insulation (2512) is constructed to ensure that surfaces of the outer cylindrical side wall (2514) and the disk shaped outer bottom wall (2518) remain within operational parameters, e.g. the layer of thermal insulation (2512) is configured to prevent the temperature of the outer cylindrical side wall (2514) and the disk shaped outer bottom wall (2518) from reaching more than about 110° C. Thus, according to one aspect of the present disclosure the outer enclosure walls (2514, 2518, and 2516) are formed as a third thermally conductive pathway.

A plurality of tubular fuel cells (2080) also known as fuel rods or rods are longitudinally supported inside the cathode chamber (2010) between disk shaped top tube support wall (2082) and opposing disk shaped bottom tube support wall (2084). Each tubular fuel cell (2080) comprises a solid oxide anode electrode support structure that forms the inside diameter of the tube. A solid ceramic electrolyte layer is formed over the outside diameter of the solid oxide anode electrode support layer and a solid oxide cathode electrode layer is formed over the outside diameter of the solid electrolyte layer. Each tubular fuel cell (2080) is open at both ends thereof and provides a cylindrical fluid conduit for anode gas, also referred to herein as reformed fuel or syngas, to flow through. A plurality of tube holding flanges (2086) are optionally provided to support tube ends with respect to the top tube support walls (2082) and the bottom tubular support wall (2084). Each tube holding flange (2086) also includes an electrically conductive terminal electrically interfaced to the DC power output module (140).

The solid anode electrode used to form the support layer of each tubular fuel cell (2080) may comprise a cermet material such as nickel and doped zirconia, nickel and doped ceria, or copper and ceria. Alternately the solid anode electrode may comprise a perovskite such as Sr2Mg1-xMnxMoO6-δ or La 0.75Sr0.25Cr0.5Mn0.5O3-δ. In either case the inside surface of each of the tubular fuel cells (2080) comprises the solid oxide anode electrode and anode gas flow (2115) passes through each disk shaped top tube support wall (2082) such that only anode gas flow (2115) enters each of the tubular fuel cells (2080) through a fuel inlet manifold (2055) to react with the solid anode electrode.

The solid oxide cathode electrode may comprise any one of Lanthanum Strontium Cobalt Oxide (LSC), Lanthanum Strontium Cobalt Iron Oxide (LSCF), or Lanthanum Strontium Manganite (LSM). The solid oxide cathode electrode forms an outside surface of each tubular fuel cell (2080). As the cathode chamber (2010) is filled with the incoming air (2200) (i.e. cathode gas), the cathode gas reacts with the solid oxide cathode electrode formed on the outside surface of each tubular fuel cell (2080).

The electrolyte layer is disposed between the anode layer and the cathode layer. The preferred electrolyte layer comprises an ion conducting ceramic medium and preferably comprises an oxygen ion conductor such as yttrian doped zirconia or gadolinium doped ceria. Alternately, the electrolyte layer is a proton conducting ceramic such as barium cerates or barium zirconates. Ideally, the electrolyte layer is formed with sufficient thickness so as to provide a near hermetic barrier between the anode electrode and the cathode electrode to prevent anode and cathode gas from crossing the electrolyte layer.

The improved SOFC fuel cell stack assembly (2000) optionally includes a cold start combustion chamber (2300). The cold start combustion chamber (2300) is housed within the intermediate chamber walls and is bounded by the intermediate longitudinal cylindrical side wall (2510), the intermediate top wall (2513) and the disk shaped top end wall (2017) of the cathode chamber. The cold start combustion chamber (2300) forms an annular chamber volume that partly surrounds the fuel reformer module (2020). When starting the SOFC system from a cold start, a portion of the incoming fuel air mixture (2025) is diverted to the cold start chamber (2300) through a fuel inlet (2304) and ignited by an igniter (2306). Thus, during a cold start a portion of the incoming fuel air mixture (2025) is combusted in the cold start combustion chamber (2300). The thermal energy generated by combustion in the cold start combustion chamber (2300) is radiated into the surrounding walls thereof, which includes the disk shaped top end wall (2017), that is specifically configured with a copper core provided to rapidly absorb thermal energy. Moreover, the disk shaped top end wall (2017) is part of the hot zone enclosure walls surrounding the cathode chamber (2010) which form the first thermally conductive pathway. Once absorbed by the disk shaped top end wall (2017) thermal energy is rapidly conducted through the hot zone enclosure walls which all comprise highly thermally conductive materials. Exhaust from combustion taking place inside the cold start chamber (2300) exits the chamber through exhaust ports (2302) and passes through the air gap (2155) to the system exit port (2165). During the passage through the air gap (2155) the combustion exhaust transfers thermal energy to the hot zone enclosure walls (2015) and (2016) by radiation and convection to further aid in heating the hot zone enclosure walls to a desired steady state operating temperature.

The incoming fuel air mixture (2025) enters the improved SOFC fuel cell stack assembly (2000) through a fuel reformer module (2020). In the present preferred embodiment, the fuel reformer is a Catalytic Partial Oxidation (CPOX) reactor. The fuel reformer module (2020) receives the incoming fuel air mixture (2025) through the fuel input conduit (2045) and reforms the incoming fuel air mixture (2025) to provide reformed fuel or syngas (2027) which is used as the anode gas to react with the solid oxide anode electrode formed on the inside wall of each of the tubular fuel cells (2080). The reformed fuel or syngas (2027) exits from the fuel reformer module (2020) and enters a fuel inlet manifold (2055). The fuel inlet manifold (2055) is configured to distribute anode gas into a top or input end of each of the plurality of tubular fuel cells (2080). At the bottom or output end of each tubular fuel cell (2080), spent fuel (2028) comprising hydrogen depleted anode gas exits the tubular fuel cell to the combustion chamber (2135) where is it mixed with spent cathode gas (2026) or oxygen depleted air and combusted.

Incoming air (2200), or cathode gas, shown by dashed lines, enters the improved SOFC fuel cell stack assembly (2000) through the cathode feed tube (2145), passes through the recuperator chamber (2210) where it is heated by surfaces thereof and then reenters the cathode feed tube through recuperator output ports (2235). The heated air then passes through the combustion chamber (2135) while flowing through the cathode feed tube (2145) where the air is further heated by thermal energy being generated by combustion and being transferred to and through the wall of the cathode feed tube (2145) before entering the cathode chamber (2010). A plurality of air exit ports (2240) pass through the cathode feed tube (2145), inside the cathode chamber (2010) and the heated air enters the cathode chamber (2010) through the air exit ports (2240). Once inside the cathode chamber, the heated air or cathode gas reacts with the solid oxide cathode electrode formed on the outside surface of each tubular fuel cell (2080). Spent cathode gas (2026) exits the cathode chamber through cathode chamber exit ports (2245) to the combustion chamber (2135) where it is mixed with spent anode gas (2028) and combusted. Exhaust gas exits from the combustion chamber (2135) to the air gap (2155) through the combustor exit ports (2150) to heat the walls of the recuperator chamber (2210) as the exhaust gas flows toward the system exit port (2165).

8.3 Solid Oxide Fuel Cell Stack Top Section View

The schematic diagram of FIG. 2 depicts a schematic side section view of an improved SOFC fuel cell stack assembly (2000) that shows only two tubular fuel cells (2080) to simplicity the description. However, a preferred stack comprises more than two tubular fuel cells (2080) with the fuel cells arranged within the cathode chamber (2005) in a manner that provides efficient use of space, promotes efficient gas flow patterns and provides the desired power output at the desired voltage.

Figure 5:
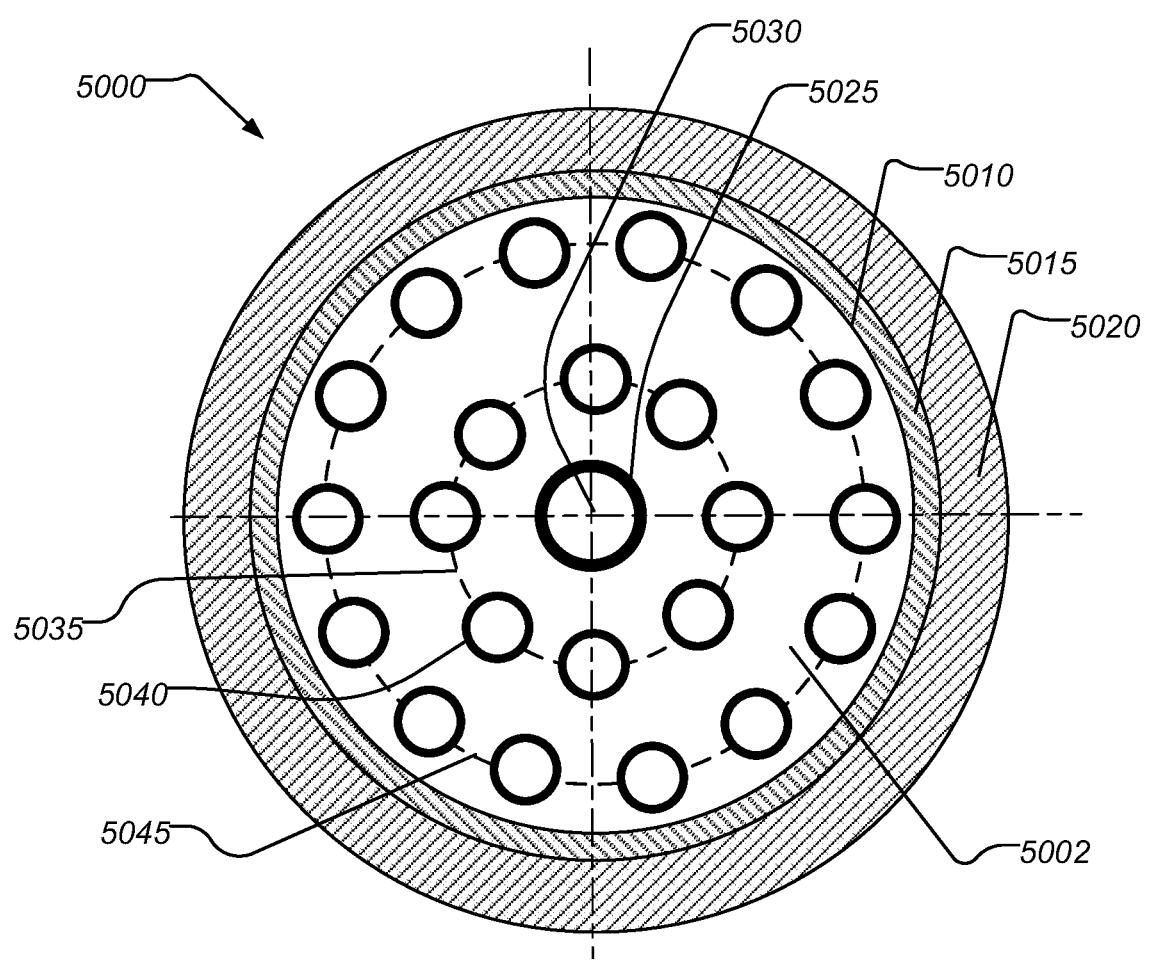
FIG. 5 depicts a schematic top section view taken through a non-limiting exemplary cathode chamber according to the disclosure.

Referring now to FIG. 5 the figure depicts a non-limiting exemplary schematic top section view taken through a non-limiting exemplary cathode chamber of an improved SOFC stack (5000) of one example of the present disclosure. The cathode chamber (5002) is bounded by an open ended longitudinal cylindrical side wall, e.g. longitudinal cylindrical side wall (2015) shown in FIG. 2 which defines a circumferential edge (5010). The inner shaded area (5015) represents the longitudinal intermediate cylindrical side wall (2510) and the air gap (2155) shown in FIG. 2. The outer shaded area (5020) represents the layer of thermal insulation (2512) and the outer cylindrical side wall (2514) shown in FIG. 2.

A cathode feed tube (5025) is positioned at the center of the cathode chamber (5002) to distribute cathode gas into the cathode chamber through a plurality of radially disposed air exit ports, e.g. (2240) shown in FIG. 2. A longitudinal central axis (5030) centers the cathode feed tube (5025) and the circumferential edge (5010).

The improved SOFC stack (5000) includes a plurality of substantially identical tubular fuel cells (5040) each comprising a solid oxide anode electrode that structurally forms the inside diameter of each tubular fuel cell (5040) and with a solid oxide cathode electrode formed on the outside diameter of each tubular fuel cell (5040). A first plurality of tubular fuels is arranged in an inner circular pattern (5035) with the center of each of the first plurality of tubular fuels at the same radial distance from the longitudinal central axis (5030) as shown by the inner circular pattern (5035). The inner circular pattern (5035) may be a symmetrical circular pattern wherein the inner tubular fuel cells are equally spaced apart around the inner circular pattern (5035) or the first plurality of tubular fuel cells may be positioned around the inner circular pattern (5035) with unequal angular distribution or angular separation.

A second plurality of tubular fuel cells is arranged in an outer circular pattern (5045) with the center of each of the second plurality of tubular fuel cells at the same radial distance from the longitudinal central axis (5030) as shown by the outer circular pattern (5045). The outer circular pattern (5045) may be a symmetrical circular pattern wherein the second plurality of fuel cells is equally spaced apart around the outer circular pattern (5045) or the second plurality of fuel cells may be positioned around the outer circular pattern (5045) with unequal angular distribution of angular separation. In the present example embodiment, the total number of fuel cells is twenty-two (22). Other patterns of fuel cell distribution with other total number of fuel cells are usable without deviating from the present disclosure.

8.4 Improved CPOX Fuel Reformer

Figure 3:
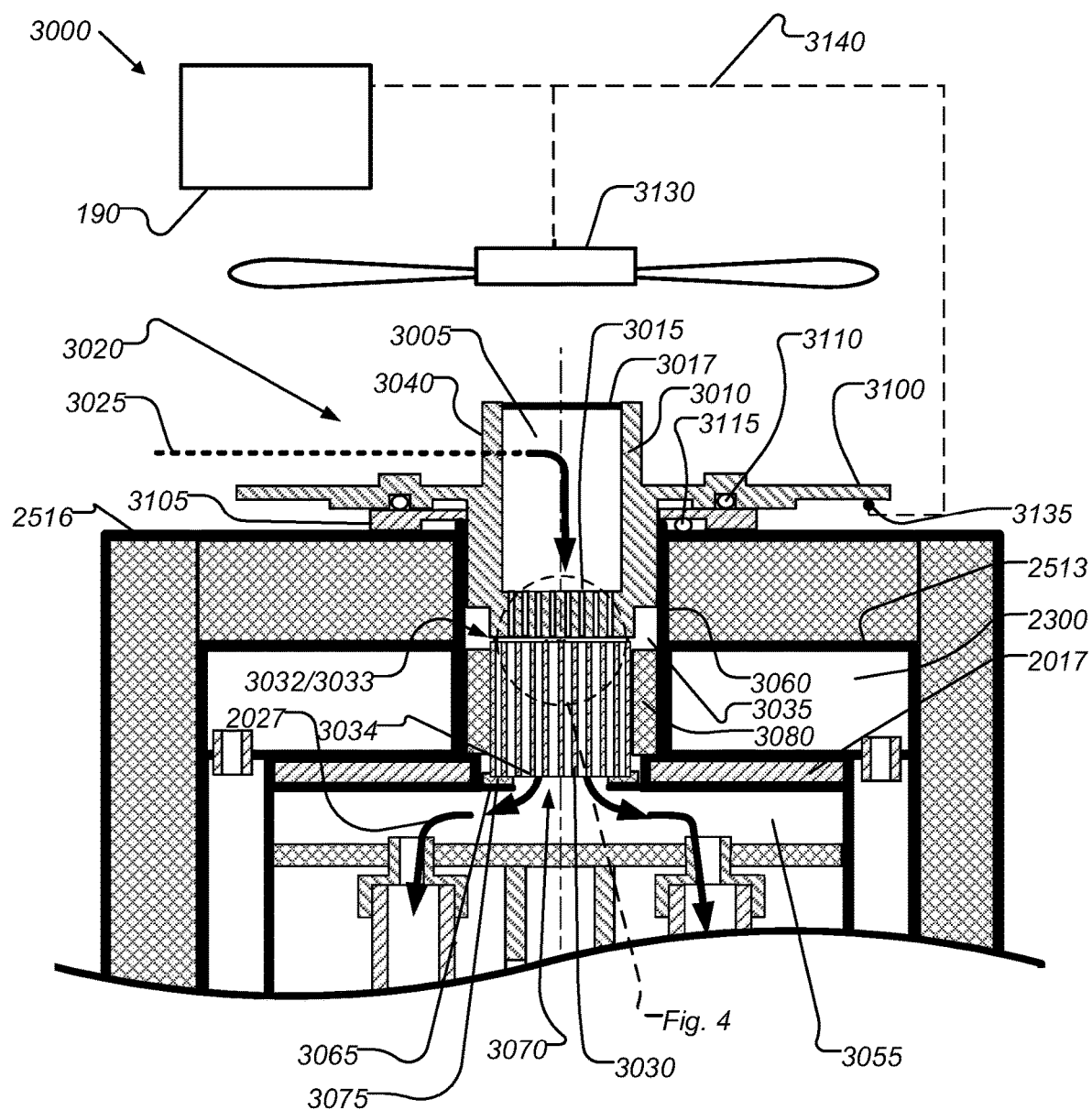
FIG. 3 depicts a schematic side section view taken through a non-limiting exemplary fuel reformer module according to the disclosure.
Figure 4:
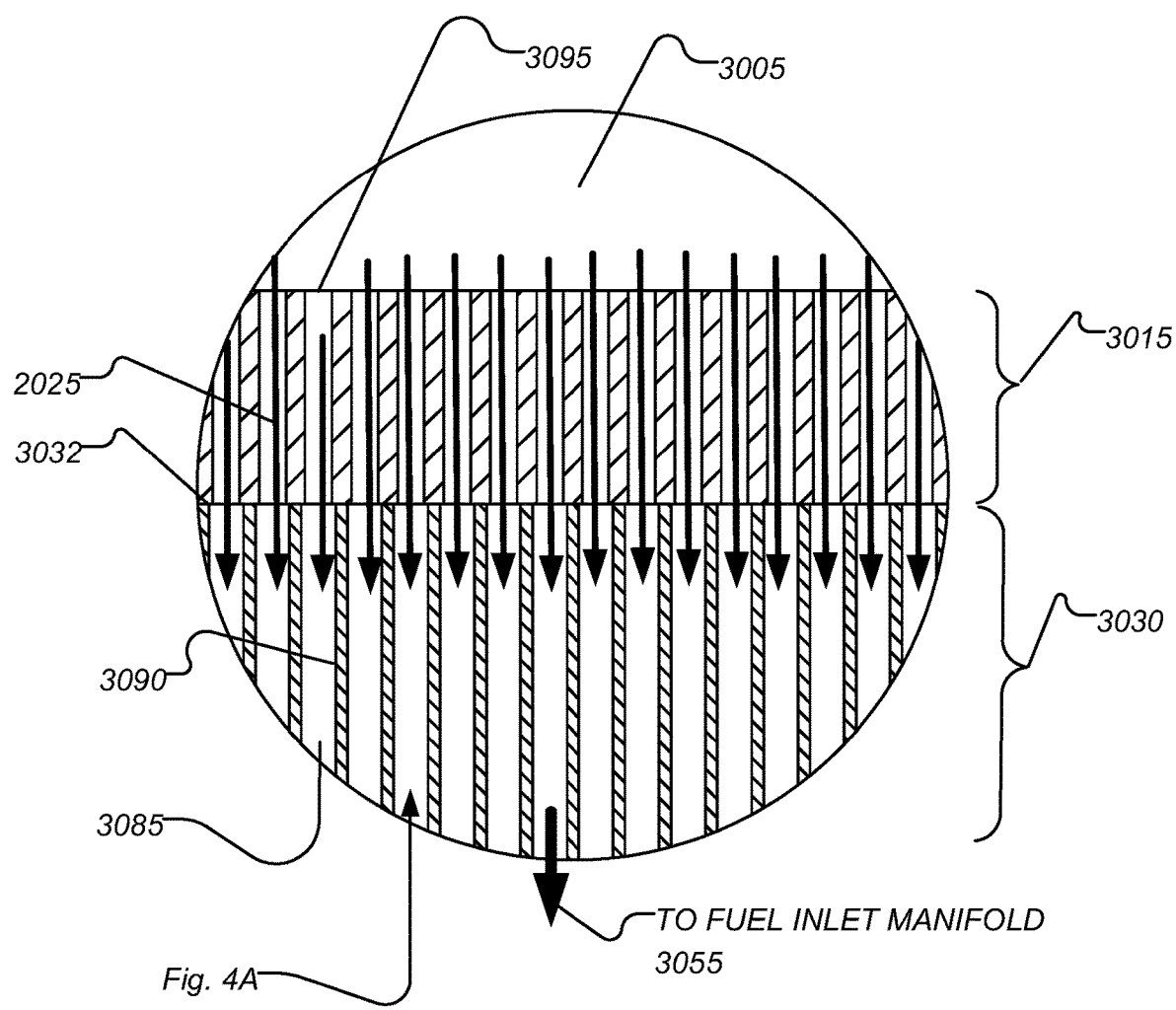
FIG. 4 depicts a schematic side section view of a non-limiting exemplary catalyzing body embodiment of a SOFC system according to the disclosure.
Figure 4A:
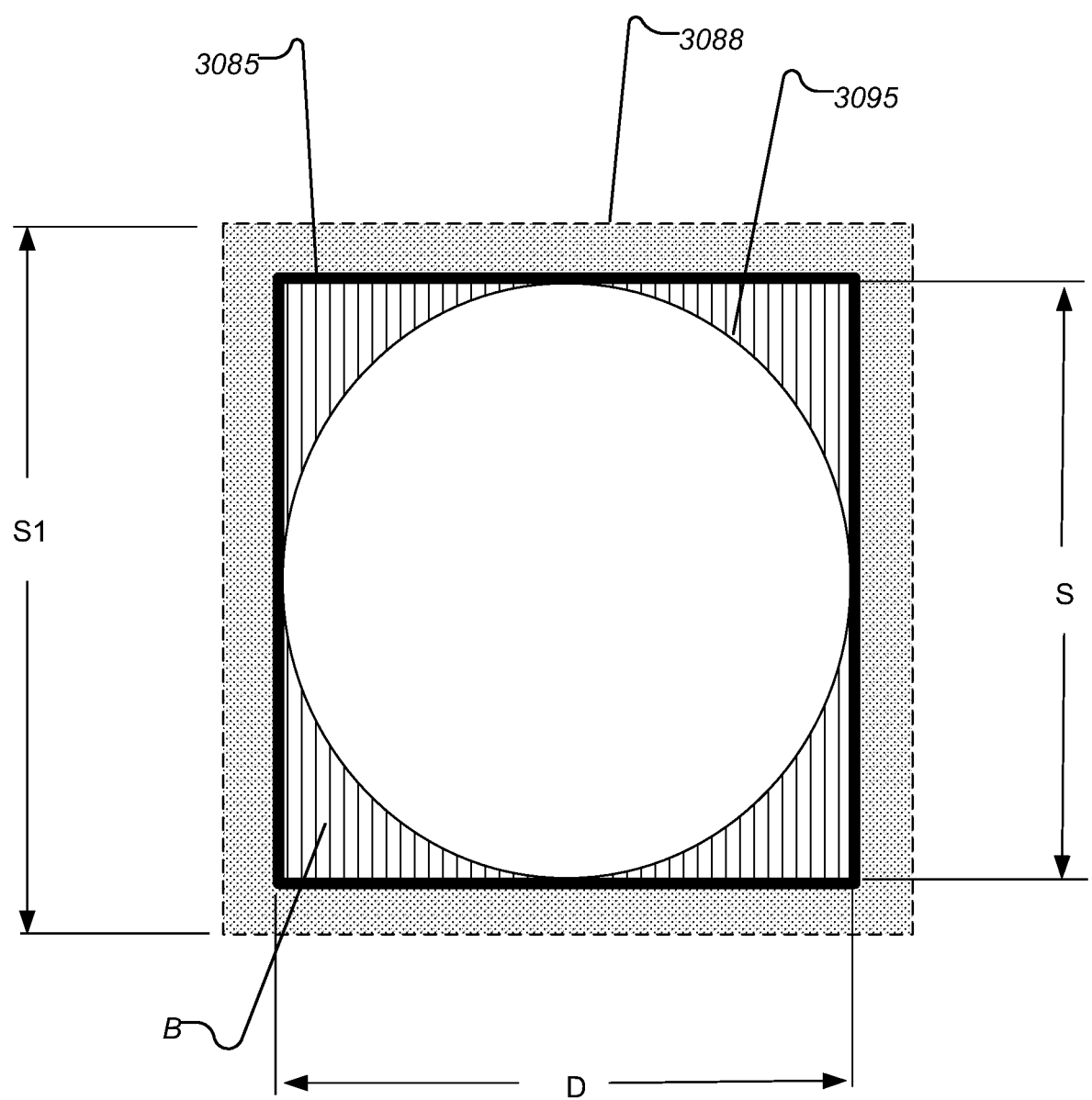
FIG. 4A is a schematic diagram depicting surface area of the reactor base wall that is available to absorb thermal energy being radiated from catalyst fuel passages according to the present disclosure.

Referring now to FIGS. 2-4 a fuel reformer system (3000) according to the present disclosure is shown in a schematic side section view in FIG. 3 and partially in exploded side section view in FIGS. 4 and 4A. The fuel reformer system (3000) comprises a fuel reformer module (3020) mounted above a fuel inlet manifold (3055). The fuel reformer module (3020) includes a fuel reactor body (3040) configured to receive an incoming fuel air mixture (3025), i.e. unreformed fuel, into a cylindrical fuel chamber (3005) which is bounded by an annular perimeter wall (3010), by a reactor shield base wall (3015) and a by a fuel chamber cap (3017). In a preferred embodiment, fuel chamber cap (3017) is welded to the annular side wall (3010). The fuel reformer system (3000) further includes a cylindrical catalyzing body (3030). Each of the fuel reactor body (3040) and the cylindrical catalyzing body (3030) is installed into a cylindrical catalyzing cavity (3035) with the cylindrical catalyzing body (3030) positioned just above the fuel inlet manifold (3055) and the fuel reactor body (3040) position just above the cylindrical catalyzing body (3030). Each of the fuel reactor body (3040) and the cylindrical catalyzing body (3030) is configured to provide fluid communication between the cylindrical fuel chamber (3005) and the fuel inlet manifold (3055).

A preferred reactor body material has a coefficient of thermal conductivity greater than 100 W/m° K and sufficient thermal mass or material volume to rapidly conduct thermal energy away from the interface between the fuel reactor body (3040) and the catalyzing body (3030). A preferred catalyzing body material comprises a ceramic substrate configured to provide reliable operation in the elevated temperature, and chemically harsh environment of the CPOX reaction. Typically ceramic materials have a coefficient of thermal conductivity of less than about 40 W/m° K but often less than about 10 W/m° K which reduces the rate of thermal conduction from one region of the catalyzing body to another.

In the present non-limiting exemplary embodiment, the cylindrical catalyzing cavity (3035) has a side wall formed by an inside diameter of the annular enclosure wall (3060) which is formed with its longitudinal central axis coaxial with the central longitudinal axis (2060), shown in FIG. 2. The cylindrical catalyzing cavity (3035) includes two open ends each forming a circular aperture with one circular aperture passing through the disk shaped outer top wall (2516) of the outer enclosure and the other circular aperture passing through the disk shaped top end wall (2017) of the hot zone enclosure.

In a preferred embodiment the annular enclosure wall (3060) is formed to be less thermally conductive that the fuel reactor body (3040) to discourage thermal conduction between the annular enclosure wall (3060) and the fuel reactor body (3040). In a preferred embodiment, the annular enclosure wall (3060) comprises Hastelloy or Monel which each have a high nickel content to resist oxidation damage and which each have suitable service temperatures ratings, e.g. exceeding 400° C., and which each have a coefficient of thermal conductivity of less than about 25.0 W/m° K. Additionally, the annular enclosure wall (3060) is thin walled, e.g. between 0.02 and 0.1 inches thick to further disclosure thermal conduction there through.

The annular enclosure wall (3060) is thermally conductively connected to the disk shaped top end wall (2017) at its lower open end which is part of the hot zone enclosure walls defined above as the first thermally conductive pathway. The annular enclosure wall is thermally conductively connected to the disk shaped outer top wall (2516) at its top open end which is part of the outer enclosure walls defined above as the third thermally conductive pathway. The annular enclosure wall (3060) is thermally conductively connected to the intermediate top wall (2513) between its top and bottom open ends and the intermediate top wall is part of the intermediate enclosure walls defined above as the second thermally conductive pathway. Thus, according to one aspect of the present disclosure the annular enclosure wall (3060) is formed as a fourth thermally conductive pathway that is thermally conductively connected with each of the first thermally conductive pathway, the second thermally conductive pathway and the third thermally conductive pathway.

A catalyzing body support flange (3065) extends from or is formed by the disk shaped top end wall (2017). The catalyzing body support flange (3065) is sized to define a diameter of a circular aperture (3070) which is small enough to prevent the cylindrical catalyzing body (3030) from passing through the circular aperture (3070). A first annular washer (3075) is disposed between the catalyzing body support flange (3065) and a bottom surface of the cylindrical catalyzing body (3030). The first annular washer (3075) provides a gas seal between the cylindrical catalyzing cavity (3035) when a longitudinal downward pressure is applied to the cylindrical catalyzing body (3030). Additionally, the first annular washer (3075) is configured as a thermal insulator to thermally isolate the catalyzing body support flange (3065) from the disk shaped top end wall (2017). Preferably, first annular washer (3075) comprises alumina formed with sufficient thickness and with appropriate outer edge diameter dimension to provide the desired gas sealing and thermal insulating properties. More generally, the first annular washer (3075) preferably comprises a very low thermal conductivity non-porous material, e.g. having a coefficient of thermal conductivity of less than 40 W/m° K, which includes most ceramic materials.

A diameter of the cylindrical catalyzing cavity (3035) is sized to receive an annular thermally insulating element (3080) into the cylindrical catalyzing cavity (3035) surrounding the cylindrical catalyzing body (3030). The annular thermally insulating element (3080) is provided to thermally isolate the cylindrical catalyzing body (3030) from the annular enclosure wall (3060). Additionally, the annular insulating element (3080) is configured to precisely center the cylindrical catalyzing body (3030) with respect to a central longitudinal axis of the cylindrical catalyzing cavity (3035) and may be further configured to angularly orient the cylindrical catalyzing body (3030) for precise angular alignment with one or more features of the fuel reactor body (3040). Both the first annular washer (3075) and the annular insulating element (3080) are provided to prevent thermal conduction from the enclosure walls, e.g. the annular enclosure wall (3060) and the top end wall (2017), to the catalyzing body (3030) which is preferably operating with a higher temperature than the cylindrical catalyzing body.

The cylindrical catalyzing body (3030) comprises a solid non-porous ceramic substrate formed to include a plurality of longitudinally disposed catalyst fuel passages (3085) each passing completely through the cylindrical catalyzing body (3030). Each catalyst fuel passage (3085) provides an individual fuel conduit that extends longitudinally through the cylindrical catalyzing body (3030). Accordingly, each catalyst fuel passage provides fluid communication between the cylindrical catalyzing cavity (3035) and the fuel inlet manifold (3055). Additionally, inside surfaces of each of the catalyst fuel passage (3085) are formed with a catalyst layer (3090) coated thereon. The catalyst layer (3090) comprises a catalyst material usable to reform the incoming fuel air mixture (3025) by catalytic partial oxidation, which is an exothermic reaction that causes partial combustion of the fuel air mixture (3025). In the present non-limiting exemplary embodiment, a preferred catalyst layer (3090) comprises a metallic or oxide phase of rhodium (Rh). Other suitable catalyzers usable for the catalyst layer (3090) include Pt, Pd, Cu, Ni, Ru, and Ce. The solid non-porous ceramic substrate used to form the cylindrical catalyzing body (3030) preferably comprises alumina or any other non-porous material having a relatively low coefficient of thermal conductive as compared to the coefficient of thermal conductive of the fuel reactor body (3040). In the present non-limiting embodiment wherein, a ceramic substrate is used the coefficient of thermal conductive of the catalyzing body is less than 40 W/m° K.

As will be described further below the incoming fuel air mixture (3025) enters the cylindrical fuel chamber (3005), passes through the reactor shield base wall (3015), enters each of the catalyst fuel passages (3085), where it reacts with the catalyst layer (3090), and then enters the fuel inlet manifold (3055) where it is distributed into each of the tubular fuel cells (2080).

8.5 Fuel Reactor Body

Referring now to FIGS. 2, 3, 4, and 4A, the fuel reactor body (3040) is disposed partially within the cylindrical catalyzing cavity (3035) and partially extending through the disk shaped outer top wall (2516) into the cold zone such that at least a portion of the fuel reactor body (3040) is exposed to ambient air. The annular perimeter wall (3010) provides a cylindrical side wall of the cylindrical fuel chamber (3005). The fuel input conduit (2025) passes through the annular perimeter wall (3010) to deliver incoming air fuel mixture (2025/3025) into the cylindrical fuel chamber (3005). As will be recognized, other geometries are usable to form the annular perimeter wall (3010) and fuel chamber (3005) which can have a square, rectangular or other cross-section in transverse planes thereof.

The reactor shield base wall (3015) comprises a circular bottom wall of the cylindrical fuel chamber (3005) that is preferably integrally formed with the annular perimeter wall (3010). However, the reactor shield base wall (3015) and annular perimeter wall can be formed as separate parts and joined together, for example by welding, soldering, mechanical fasteners, and or other suitable joining techniques. A plurality of base wall fuel passages (3095) each passes completely through the reactor shield base wall (3015) along a longitudinal axis, e.g. with each base wall fuel passage parallel with the central longitudinal axis (2060). Each base wall fuel passage (3095) provides a fuel conduit that extends longitudinally through the reactor shield base wall (3015). Moreover, each base wall fuel passage (3095) is longitudinally aligned with and in fluid communication with a corresponding one of the plurality of catalyst fuel passages (3085) that pass through the cylindrical catalyzing body (3030).

As shown in FIGS. 4 and 4A, an interface (3032) is defined by a bottom external surface of the reactor shield base wall (3015) and a top or input surface of the cylindrical catalyzing body (3030). In a non-limiting exemplary embodiment one or the other or both of the two surfaces that form the interface (3032) includes a raised feature or features (3033). The raised features may include a circular ring or a plurality of discreet raised bumps, preferably three, formed at one more locations extending from the bottom surface of the reactor shield base wall (3015) in a position that causes the raised features to contact the opposing surface at the interface (3032) in order to provide a small gap between the two opposing surfaces. More generally the interface (3032) is formed with a gap between the bottom surface of the reactor shield base wall (3115) and the top surface of the cylindrical catalyzing body (3030). The gap is provided to all allow radiant thermal energy exiting from each of the catalyst fuel passages to impinge onto the bottom surface of the reactor shield base wall (3015) so that substantially all of the bottom surface of the reactor shield base wall (3015) is available to absorb thermal radiation impinging thereon.

At the interface (3032) each base wall fuel passage (3095) is aligned with its corresponding catalyst fuel passages (3085) along a substantially coaxial longitudinal axis. In this arrangement the fuel air mixture (2025) being delivered into the cylindrical fuel chamber (3005) passes out of the cylindrical fuel chamber (3005) through each of the plurality of base wall fuel passages (3095) flows across the gap provided between the surfaces of the interface (3032) and enters each of the corresponding catalyst fuel passage (3085). Once inside the catalyst fuel passages (3085) the fuel air mixture begins to react with the catalyst coated sidewall surfaces (3090) and the fuel air mixture begins the catalyzed partial oxidation reaction used to convert the fuel air mixture into reformed fuel or syngas. According to an aspect of the present disclosure, thermal energy generated by the CPOX reaction taking place inside the catalyst fuel passages (3085) is radiated onto the bottom surface of the reactor shield base wall (3115) for partial absorption thereby. Additionally, thermal energy generated by the CPOX reaction taking place inside the catalyst fuel passages (3085) is radiated onto inside surfaces of the base wall fuel passages (3095) for partial absorption thereby.

The fuel reactor body (3040) is formed from materials having a relatively high thermal conductivity as compared to the thermal conductivity of the ceramic material used to form the cylindrical catalyzing body (3030). A preferred reactor body material has a coefficient of thermal conductivity greater than 100 W/m° K. Thus, in one non-limiting example embodiment the entire fuel reactor body (3040) is formed from a unitary piece of copper or a copper alloy, from a unitary piece of beryllium or a beryllium alloy, from an unitary piece of aluminum or an aluminum alloy, of a unitary piece of brass or a brass alloy, of a unitary piece of tungsten or a tungsten alloy, wherein the alloys may include molybdenum, nickel, chromium, brass, tungsten, or the like. In the present example, unitary means the entire fuel reactor body (3040) is formed from a single piece of metal, e.g. cast or machined. In alternate embodiments the fuel reactor body (3040) can be formed from a plurality of cast or machined elements that assembled together, e.g. welding, brazing, or mechanically fastening in a manner that provides a continuous thermally conductive path. In any case a desired material has a coefficient of thermal conductivity that is at least greater than 100 W/m° K with some embodiments using materials having a coefficient of thermal conductivity in excess of 300 W/m° K. Additionally, the wall thicknesses and or thermal mass of the fuel reactor body (3040) is sufficient to promote rapid thermal conduction from a high temperature region of the reactor body (3040) proximate to the interface (3032) to a low temperature region of the reactor body (3040), e.g. the region disposed outside the hot zone, and to minimize temperature gradients between the interface (3032) and the elements of the reactor body that are disposed outside the hot zone. An additional characteristic of the reactor body material is that it preferably has a service temperature at least exceeding 200° C. and preferably up to 1000° C.

In the present non-limiting exemplary embodiment, the fuel reactor body (3040) is formed from aluminum, preferably the Aluminum 6061 alloy, with a coefficient of thermal conductivity of approximately 167 W/m° K. Aluminum and aluminum alloys are preferred because they spontaneously form a stable oxide layer that protects the bulk structure from corrosive oxidative damage and can be used without an additional applied protective coating. Additionally, the aluminum and aluminum alloys can be anodized to prevent or reduce surface oxidation. In a preferred embodiment the entire fuel reactor body (3040) comprises a solid element comprising a single piece of aluminum 6061 alloy; however, the fuel reactor body (3040) may comprise an assembly formed by assembling a plurality of individual subassembly elements together using mechanical fasteners, welding or brazing, or using interlocking mechanical features, or the like, without deviating from the present disclosure.

More specifically according to an important aspect of the present disclosure the relative thermal conductivity of each of the cylindrical catalyzing body (3030), the annular enclosure wall (3060) and the fuel reactor body (3040) is selected to promote thermal conduction from the interface (3032) to a heat dissipating flange (3100), disposed outside the hot zone, and to promote absorption of thermal radiation impinging on surfaces of the reactor shield base wall (2015). This is accomplished by configuring the fuel reactor body (3040) as the most thermally conductive element local to the interface (3032) and by configuring the fuel reactor body (3040) to extend outside the hot zone where it is either actively cooled e.g. by moving air passing over the surfaces of the fuel reactor body or passively cooled, e.g. by simply exposing surfaces to the fuel reactor body (3040) to ambient air. Thus, the configuration of the fuel reactor body (3040) establishes and maintains a temperature gradient between the interface (3032) and external ambient air, outside the hot zone, by providing a thermally conductive path between the interface (3032) and a cooler portion of the fuel reactor body which are provided by exposing a portion of the fuel reactor body to ambient air. The resulting temperature gradient between the portion of the fuel reactor body exposed to ambient air and the portion of the reactor body proximate to interface (3032) tends to promote substantially continuous thermal energy conduction through the fuel reactor body (3040) from the interface (3032) to the portion of the fuel reactor body that is exposed to ambient air.

The fuel reactor body (3040) includes a heat dissipating flange (3100), e.g. a disk shaped flange radially extending from the annular perimeter wall (3010). The heat dissipating flange (3100) is supported above the disk shaped outer top wall (2516) external to the outer enclosure and exposed to surrounding air. Preferably the heat dissipating flange (3100) is integrally formed with the annular perimeter wall (3010) but the heat dissipating flange (3100) may comprise a separate element attached to the annular perimeter wall (3010) by welding, soldering, mechanical fasteners, or other attaching means.

An annular seal plate (3105) is disposed between the disk shaped outer top wall (2516) and the heat dissipating flange (3100) to provide a mechanical interface between a top surface of the disk shaped outer top wall (2516) and a bottom surface of the heat dissipating flange (3100). The annular seal plate (3105) includes a centered through hole sized to receive the annular perimeter wall (3010) there through. An O-ring seal element (3110), or the like, is disposed between the annular seal plate (3105) and the heat dissipating flange (3100), e.g. in an O-ring groove, and serves to gas seal a top portion of the cylindrical catalyzing cavity (3035). A second O-ring seal element (3115), or the like, may be provided between a top surface of the disk shaped outer top wall (2516) and a bottom surface of the annular seal plate (3105).

Both the annular seal plate (3105) and the heat dissipating flange (3100) are attached to the disk shaped outer top wall (2516) by fasteners, or the like, in a manner that applies a downward force against the fuel reactor body (3040) in order to seat the bottom surface of the reactor shield base wall (3015) against the top surface of the cylindrical catalyzing body (3030) at the interface (3032), or the raised surfaces (3033) formed thereon, and further in order to compress the O-ring seal element (3110).

Figure 6:
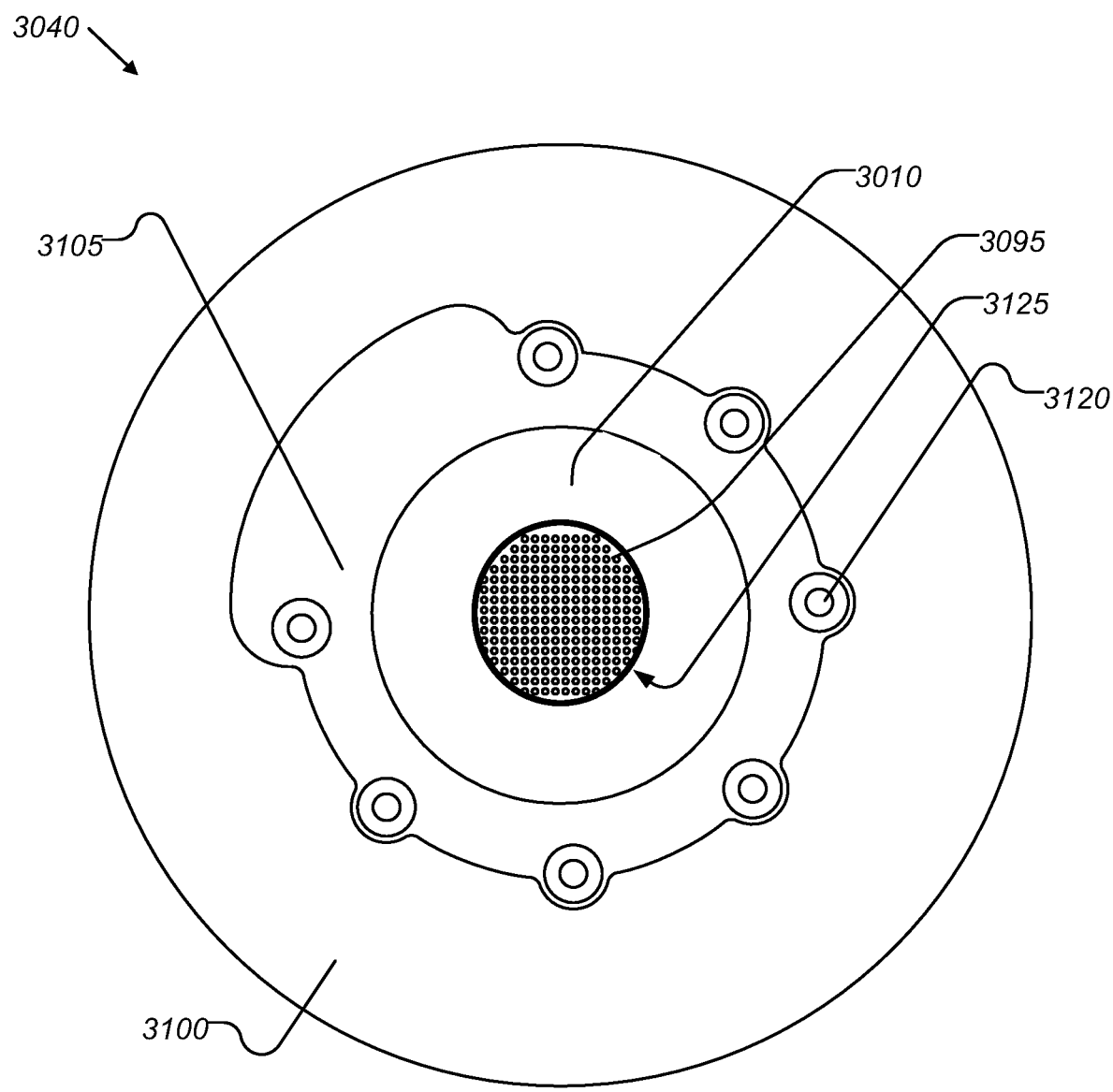
FIG. 6 depicts a bottom schematic section view taken through a non-limiting exemplary fuel reformer module according to the disclosure.

Referring now to FIG. 6, a schematic top section view of the fuel reactor body (3040) depicts the heat dissipating flange (3100) radially extending from the annular perimeter wall (3010). Fasteners (3120) extend through the dissipating flange (3100) and the annular seal plate (3105) to attach the heat dissipating flange (3100) and the annular seal plate (3105) to the disk shaped outer top wall (2516). The annular perimeter wall (3010) extends radially outside the annular enclosure wall (3060) such that the seal plate (3105) seals the cylindrical catalyzing cavity (3035). An array (3125) of base wall fuel passages (3095) is depicted passing through the reactor shield base wall (3015).

Referring now to FIG. 3, the fuel reformer system (3000) may include external cooling and temperature sensing elements readable by the electronic controller (190). In one non-limiting example embodiment, an air moving element (3130), such as a rotary fan blade attached to a rotary motor, operable by the electronic controller (190), is disposed to direct air flow over the heat dissipating flange (3100), thereby increasing convective thermal energy transfer from the flange (3100) to the surrounding ambient air. Additionally, a temperature sensing element (3135) in contact with a surface of the heat dissipating flange (3100), or one or more other surfaces of the fuel reactor body (3040) is usable to deliver a temperature signal to the electronic controller (190) over a communication path (3140). Operation of air moving element (3130) may be constant or may be variably triggered by changes in the temperature signal emitted by the temperature sensing element (3135). In one non-limiting operating mode the air moving element (3130) is activated when the temperature sensing element (3135) reports a temperature that is above a desired high temperature limit, e.g. above 50° C., and the air moving element (3130) is deactivated when the temperature sensing element (3135) reports a temperature that is below a desired high temperature limit, e.g. below 45° C.

Additionally, the temperature signal emitted by the temperature sensing element (3135) is usable to control operation of the cold start combustion chamber (2300) such as to stop fuel flow to the cold start combustion chamber (2300) when the temperature of the heat dissipating flange (3100) reaches a desired steady state temperature range.

In an example operating mode, the electronic controller (190) receives temperature signals from the temperature sensing element (3135) over communication pathway (3140) and determines an instantaneous flange temperature based thereon. The electronic controller (190) then determines whether the flange temperature is within one or more desired temperature ranges and if not carries out various commands such as to operate or stop operating the air moving element (3130) and or to start or stop fuel flow to the cold start combustion chamber (2300) or to cease fuel delivery to the fuel reformer system (3000) by commanding the fuel delivery module (197) to close a gas flow actuator valve, or the like, when the instantaneous temperature indicated by the temperature sensing element (3135) exceeds a safe operating limit. In one non-limiting operating mode the electronic controller (190) is configured to activate the air moving element (3130) when the temperature of the heat dissipating flange (3100) exceeds 50° C. In other example embodiments the air moving element (3130) may have multiple operating modes usable to move more or less air depending on need based on different temperature thresholds.

8.6 The Interface Configuration

Referring now to FIG. 4 an exploded side section view of the interface (3032) between corresponding pairs of base wall fuel passages (3095) and catalyst fuel passages (3085), shows that each corresponding pair of reactor shield base wall fuel passages (3095) and catalyst fuel passages (3085) is aligned along a common longitudinal axis. Thus, each corresponding pair of base wall fuel passages and catalyst fuel passages provides a vertical flow path through which the fuel air mixture passes from the cylindrical fuel chamber (3005) to the fuel inlet manifold (3055). As noted above a gap may be provided between the mating surface of the interface (3032) to expose surfaces of the reactor shield base wall (3015) to thermal radiation being emitted by the CPOX reaction but the gap is not shown in FIG. 4 to simplify the disclosure. As indicated by the reference number (3090) a catalyst layer is formed on the sidewall of each catalyst fuel passage (3090). As is further shown in FIG. 4, a pointer referring to FIG. 4A indicates that FIG. 4A depicts a schematic view of the interface (3032) as viewed from inside a catalyst fuel passage (3085) looking toward its fuel input end. In the present non-limiting example embodiment, the diameter (D) of each of the circular base wall fuel passages (3095) is 1.3 mm and the thickness of the reactor shield base wall is 13 mm such that each fuel passage (3095) is 13 mm long. In a preferred embodiment the ratio of fuel passage longitudinal length to its diameter is at least 5, preferably 10 and up to 20. The side wall dimension of each of the square catalyst fuel passages (3085) is 1.3 mm and the thickness of the cylindrical catalyzing body (3030) is about 25.4 mm such that each catalyst fuel passage (3085) is 25.4 mm long. In a preferred embodiment the ratio of catalyzing passage longitudinal length to its square side dimension is at least 10, preferably 15-25 and up to 40.

The cylindrical catalyzing body (3030) has a circular cross-section and an array of catalyzing fuel passages (3085) is formed within the circular cross-section over a circular region having a diameter of 25.4 mm (1.0 in.) Each of the catalyzing fuel passages of the array has a square cross-section and extends completely through the cylindrical catalyzing body (3030). In the present non-limiting exemplary embodiment each square catalyzing fuel passage has a side dimension of 1.3 mm and a length of 25.4 mm. Alternately, the catalyzing body (3030) and the array of fuel passages can have other non-circular cross-sections without deviating from the present disclosure.

The reactor shield base wall (3015) is formed with an array of circular base wall fuel passages (3095) formed within a 25.4 mm (1.0 in.) diameter circular array region opposed to the circular array region of the cylindrical catalyzing body (3030). In the present non-limiting exemplary embodiment each circular base wall fuel passage (3095) has a diameter of 1.3 mm and a length of 13.0 mm. Alternately, the reactor shield base wall (3015) and the array region formed thereon can have other non-circular cross-sections without deviating from the present disclosure. As described above each circular base wall fuel passage (3095) in the array of base wall fuel passages is coaxial with one of the square catalyst fuel passages (3088) in the array of catalyst fuel passages such that a central longitudinal axis of each base wall fuel passage (3095) is coaxial with a central longitudinal axis of a corresponding catalyst fuel passage (3085).

Solid material of the reactor shield base wall (3015) surrounds each circular base wall fuel passage and solid material of the cylindrical catalyzing body (3030) surrounds each square catalyst fuel passage. In a non-limiting exemplary array pattern, all the passages are arranged in a plurality of parallel linear arrays. Each linear array is offset from an adjacent linear array by the same pitch dimension of 1.2 times the circular passage diameter. In the present example the pitch dimension is 1.56 mm. Based on this non-limiting exemplary array disposed over a 25.4 mm diameter circle, the total number or circular passages (3095) in the circular array area is approximately 208.

The combined area of the 208 passages each having a 1.3 mm diameter is 276 mm². The total area of the 25.4 mm diameter array area is 507 mm². Thus, the area of solid material in the circular array area is approximately 231 mm² such that the bottom surface of the reactor shield base wall (3015) provides about 231 mm² of surface area facing the interface (3032) that is available to absorb radiant thermal energy impinging thereon. In the present example embodiment, the ratio of solid surface area to hole diameter area is 0.84. As a percentage of the total area of the circular array about 54% of the total area is circular passage area and about 46% of the total area is solid material area. As will be recognized by those skilled in the art the ratio of surface area to hole diameter area can be increased by decreasing the diameter of the circular base wall fuel passages. Since the surface area at the interface (3032) is impinged by radiant thermal energy emitted by the CPOX reaction, increasing the solid surface area, without a change in temperature, increases thermal energy absorption into the reactor shield base wall (3015). In a preferred embodiment the ratio of solid surface area to hole diameter area ranges between 0.75 to 0.9.

As noted above radiant thermal energy emitted by the CPOX reaction also enters the circular base wall fuel passages (3095) and at least a portion of the radiant thermal energy impinges onto inside surfaces thereof. While the incident angle of radiant thermal energy impinging on the inside surfaces of circular base wall fuel passages (3095) is nearly grazing, the passages are long compared to the passage diameter and reflected energy, even when reflected at near grazing incidence is scattered and ultimately impinges onto and reflects from the inside surfaces over many reflection cycles as it traverses a fuel passage (3095). The total surface area of inside surfaces of all 208 circular passages is about 11043 mm².

Referring now to FIG. 4A the figure depicts the interface (3032) of a single circular fuel passage (3095) and a single square catalyst fuel passage (3085) as viewed from the fuel inlet manifold (3055). As further shown, according to the present disclosure, each base wall passage (3095) has a circular cross-section having a diameter (D) along its entire longitudinal length and each catalyst fuel passage (3085) has a square cross-section having a side dimension (S) along its entire longitudinal length. In the non-limiting exemplary embodiment of FIG. 4A, the diameter (D) and the side length (S) are equal and an area (B), shown filled with vertical lines, is an exposed surface area of the bottom surface of the reactor shield base wall (3015). The surface area (B) is located at the interface (3032) proximate to the input end of each catalyst fuel passage (3085) and is specifically provided to absorb thermal radiation being radiated from the catalyzing surface (3090). Additionally, when a gap between the opposing surfaces of the interface (3032) is provided, thermal radiation enters the gap in part by reflecting from surface area (B).

Equation (1) below provides the area of surface area (B):

$$A_s - A_c = S^2 - \pi(D/2)^2 \qquad \text{EQU: 1}$$

where $A_s$ is the area of a square (3085) having side length (S)

$A_c$ is the area of a circle (3095) having diameter (D).

In the case where S=D the surface area AB of the surface area (B) is:

$$(A_B) = S^2(1 - \pi/4) = 0.2146 S^2 \qquad \text{EQU: 2}$$

In other words, the area of surface (B) is about 21% of the area of the square (3085). As will be recognized, the area AB can be increased to increase exposure of the surface (B) to thermal radiation being generated inside the catalyzing fuel passages e.g. by increasing the square side dimension from (S) to (S1), or by decreasing the diameter (D) of the circular passages (3095). When the side dimension of a catalyst fuel passage is increased from (S) to (S1) the area SB can be increased to 50% of the area of the square of dimension (S1) when the ratio S1/D is equal to about 1.253.

The surface area (B) is directly exposed to the CPOX reaction taking place inside the square catalyst fuel passages (3085) and is in the best position to absorb thermal energy radiating out of the catalyst fuel passages. In a non-limiting exemplary embodiment of the present disclosure even when there is no gap at the interface (3032) the surface (B) as well as the inside surfaces of the base wall fuel passages (3095) provide sufficient surface area of the cooler reactor shield base wall (3015) to absorb sufficient radiant thermal energy emitted by the CPOX reaction to prevent catalyst layer burn through. However, as will be recognized by those skilled in the art, when the gap is provided, additional radiant thermal energy enters the gap and may impinge onto and be reflected from the cooler solid material surface areas of the reactor shield base wall (3015) over many cycles to absorb additional thermal energy emitted by the CPOX reaction.

8.7 Thermal Energy Transfer

Without wishing to be bound by theory, Applicants believe that the exothermic catalyzed partial oxidation reaction is initiated immediately upon contacting the catalyst layer (3090) proximate to the interface (3032) when the fuel air mixture (2025, 3025) is heated to a suitable reaction temperature. Additionally, Applicants believe that the exothermic catalyzed partial oxidation reaction reaches its maximum temperature proximate to the interface (3032), with the maximum temperature approximately between 900 and 1000° C. In response to the rapid heating proximate to the interface (3032), the temperature of the fuel air mixture entering the catalyst fuel passages (3085) and of the catalyst layers (3090) rapidly increases as thermal energy is absorbed by the fuel air mixture as well as by the catalyst layers (3090). In response to the temperature increase, the fuel air mixture rapidly expands in volume to fill the catalyst fuel passages (3085) and exit from catalyst fuel passages to fill the cylindrical catalyzing cavity (3035) and the fuel inlet manifold (3055). During the gas expansion more of the fuel air mixture comes into contact with the catalyzing layer (3090) distal from the interface (3032) to participate in the exothermic catalyzed partial oxidation reaction, thereby further heating and expanding the fuel/air mixture. Thus, most of the thermal energy generated by the catalyzed partial oxidation reaction is absorbed by the fuel/air mixture and carried out of the catalyst fuel passage to the fuel inlet manifold (2055). In an example operating mode, the volume of fuel/air mixture delivered into the CPOX reactor is believed to generate about 300 watts during the CPOX reaction.

A portion of the thermal energy generated by the catalyzed partial oxidation reaction is absorbed by the catalyzing layer (3090). In the present example the catalyst layer is metallic (e.g. Rh), with a coefficient of thermal conductivity of about 150 W/m° K. Thus, thermal energy absorbed by the catalyzing layer (3090) is thermally conducted through the catalyzing layer thickness to reach the ceramic catalyzing body (3030) and is further conducted along the longitudinal length of the catalyzing layer (3090. However, since the catalyst body (3030) is a ceramic material with a coefficient of thermal conductivity of about 45 W/m° K, the heat flux density (W/m²) entering the ceramic material is low resulting in thermal energy absorbed by the catalyzing layer being reemitted into the catalyzing fuel passages instead of being thermally conducted into the ceramic material. However this result is desirable since the low heat flux density along the radial axis of the ceramic catalyzing body prevents thermal energy from being conducted radially away from the catalyzing fuel passages to the extent that thermal energy is either a) transferred to the fuel air mixture inside the fuel passages, or b) radiated out of the ends of the fuel passages either to the fuel inlet manifold or onto the surface area (B) described above, or c) radiated onto other exposed solid material surfaces of the reactor shield base wall, e.g. by entering the gap provided at the interface, or d) radiated into the circular base wall fuel passages to either be transferred to the incoming gas air mixture by convective heat transfer, or e) radiated onto inside surfaces of the base wall fuel passages (3095) to be absorbed thereby.

Thus, thermal energy absorbed by the catalyzing layer is not readily dissipated to the ceramic catalyzing body (3030). Instead the thermal energy is reemitted into the catalyzing fuel passage to further heat the fuel air mixture. Additionally, thermal energy emitted or reflected by the catalyzing layer impinges onto other surfaces of the catalyzing layer and is partially absorbed and partially reflected thereby. However, without at least one outlet for thermal radiation to exit the catalyst fuel passage the energy absorption rate of the catalyzing layer (3090) may exceed the energy reemission rate thereby causing the temperature of the catalyzing layer to continue to increase until it reaches a temperature that causes the catalyzing layer to burn off causing permanent damage to catalyzing fuel passages.

As described above Applicants believe that the total power generated by the CPOX reaction is 300 W. Using the Stefan Boltzmann equation listed below as Equation 3 the total power that can be absorbed by the collective surface area (B) shown in FIG. 4A, i.e. based on 208 base wall passages (3095) can be estimated given the surface area and temperature.

$$P = e\sigma A S_f (T_C^4 - T_b^4)$$    EQU. 3 where: P=net absorbed power (watts); e=surface emissivity; $\sigma = 5.6703 \times 10^{-8}$ (W/m²K⁴) the Stefan Boltzmann constant; A=area onto which radiation is radiated (m²); Sf—a form factor related to the incidence angle at which the radiation impinges on the surface area A; $T_c$=temperature of radiation source (° K); and $T_b$=temperature of the surface area A (° K).

Of particular importance is the fact that when Tc and Tb are equal. Equation 3 shows that the net radiated power absorbed by the reactor shield base wall (3015) is zero. Thus, without cooler surface areas provided by the reactor shield base wall (3015) the surface temperatures inside the catalyst fuel passages can continue to increase until the catalyst layer overheats and burns through.

In a non-limiting example embodiment wherein, each square catalyst fuel passage (3085) has a side dimension (S) equal to 1.3 mm (0.0013 m) and each circular base wall passage (3095) has a diameter of 1.3 mm, the collective area of all the surface areas (B), denoted ABt for an array of 208 passages is 7.38×10-5 m². Assuming that the CPOX reaction temperature is 1000° C. (1273° K) and the temperature of each surface area AB is 100° C. (373° K) and using the simplified case where the emissivity e=1.0, Equation 3 predicts that the combined surface area ABt can absorb about 11 W or about 3.6% of the power generated by the CPOX reaction.

If a gap is provided at the interface (3032) such that the entire solid surface area of the bottom surface of the reactor shield base wall (3015), denoted AS is potentially available to absorb thermal energy, the available solid material surface area AS is $2.31 \times 10^{-4}$ m² and Equation 3 predicts that the area AS can absorb about 34 W or about 11.3% of the power generated by the CPOX reaction.

If in addition the surface area of the inside surfaces of all 208 circular fuel passages (3095) is potentially available to absorb thermal energy, the available surface area of all the circular fuel passages, denoted AP is $1.1043 \times 10^{-2}$ m² and Equation 3 predicts that the surface area AP can absorb about 1632 W or about 211% of the power generated by the CPOX reaction.

As a practical matter, the above listed thermal energy absorption power values are calculated using a form factor Sf=1 which is the case when the thermal radiation impinges the surface at normal incidence. While this may be the case for the surface area ABt, a value of Sf=1 is not realistic for the surfaces areas AS and AP. Additionally as a practical matter the surface emissivity (e) of a heavily oxidized aluminum surface is not 1.0 but instead is about 0.25 or less. Accordingly, the energy absorption values are more realistically represented when Equation 3 is used with surface emissivity e=0.25 for all three surfaces areas ABt, AS, and AP and with the form factor Sf=1 for the surface area ABt, and Sf=0.1 for the surface areas AS and AP. In this case, Equation 3 predicts that the surface area ABt potentially absorbs about 2.75 W, the surface area AS potentially absorbs about 0.85 W and the surface area AP potentially absorbs about 44.6 W. Thus, the reactor shield base wall (3015) when maintained at about 100° C. potentially absorbs about 16% of the total power emitted by the CPOX reaction.

Those skilled in the art will recognize that additional thermal energy can absorbed by increasing the available surface area or by lowering the temperature of the reactor shield base wall (3015). As noted above according to the present disclosure the surface temperature of the heat dissipating flange (3100) is preferably maintained in a range of 50-100° C. which due to the high thermal conductivity of the fuel reactor body (3040) likely maintains the temperature of the entire reactor shield body (3040) at nearly the same temperature but provides a thermal gradient between the fuel reactor base wall (3015) and the heat dissipating flange (3100). As noted above this allows thermal energy to be absorbed from the CPOX reaction and prevents the unprocessed fuel passing through the fuel reactor body (3040) from reaching its auto ignition temperature of 295 to 580° C., depending on which fuels are in use.

Thus, maintaining the reactor shield base wall (3015) described above at a temperature of 100° C. during operation and providing a small gap, e.g. about 1 mm at the interface (3032) has the potential of absorbing about 43 W of thermal energy or about 14% of the total energy being radiated by the CPOX reaction at a temperature of 1000° C. However, those skilled in the art will recognize that increasing the shape factor, increasing the surface area and decreasing the temperature of the fuel reactor body (3040) can remove additional thermal energy from each of the catalyst fuel passage (3085).

8.8 Operating Mode 8.8.1 Cold Start

Referring to FIGS. 1-3, from a cold start, the fuel input module (197) is operated by the electronic controller (190) to deliver a fuel air mixture into the cold start combustion chamber (2300) through a fuel input inlet (2304) and to ignite the fuel air mixture inside the cold start combustion chamber (2300) with an electric igniter (2306) operable by the electronic controller (190). At the same time or shortly thereafter the fuel input module (197) also operates to deliver fuel/air mixture into the fuel reformer module (3020) through the fuel input conduit (2045) and the fuel air mixture passes through the fuel reformer module (3020) to the fuel input manifold (2055). Preferably the initial flow rate of the fuel air mixture being delivered through the fuel reformer module is very low and is intended to merely fill the SOFC system with a nearly stationary volume of fuel air mixture.

The ignited fuel inside the cold start combustion chamber (2300) heats walls of the cold start combustion chamber (2300) but the top end wall (2017) is configured to absorb more thermal energy than the other walls of the cold start combustion chamber. As the temperature of the top end wall (2017) increases, thermal energy is thermally conducted from the top end wall (2017) to other regions of the hot zone enclosure walls (115). Additionally, the top end wall (2017) and other walls of the hot zone enclosure (115) begin to emit thermal radiation into the fuel inlet module (2055) which is absorbed by the fuel air mixture contained therein, increasing its temperature. Exhaust gas generated by combusting the fuel air mixture inside the cold start combustion chamber (2300) exits from the cold start combustion chamber (2300) through cold start exit ports (2302) and flows through the air gap (2155) to a system exit port (2165). As the hot exhaust gas flows through the air gap (2010) it radiates thermal energy to outside surfaces of the longitudinal cylindrical side wall (2015) which increase in temperature.

The top end wall (2017) is attached to the longitudinal cylindrical side wall (2015) which is further attached to disk shaped bottom tube support wall (2084) and disk shaped separator wall (2214). Each of the top end wall (2017), the longitudinal cylindrical side wall (2015), the disk shaped bottom tube support wall (2084) and the disk shaped separator wall (2114), collectively form the hot zone enclosure walls (115). As noted above, each of the hot zone enclosure walls is fabricated from one or more of copper, molybdenum, aluminum copper, copper nickel alloys, or a combination thereof such that the entire hot zone enclosure wall structure (115) forms a continuous thermally conductive path having a coefficient of thermal conductivity between about 100 and 300 W/m° K, and preferably above 200 W/m° K. Additionally, where surfaces of any of the hot zone enclosure walls are exposed to an oxygen rich environment the wall surfaces are preferably nickel coated to prevent oxidation.

In the case of the three disk-shaped walls, (2017, 2084, and 2214), each of these walls is configured to provide a thermal mass that is capable of absorbing and redistributing thermal energy to other regions of the hot zone enclosure walls by thermal conduction and by reemitting the absorbed thermal energy to cooler areas surrounding each disk-shaped wall such as into the fuel inlet manifold (2055), the cathode chamber (2010), the combustion chamber (2135) and the recuperator chamber (2210). Thus, as the top end wall (2017) is heated by combustion inside cold start combustion chamber (2300) thermal energy is absorbed by the top end wall and rapidly conducted to all regions of the hot zone enclosure walls (2017), 2015, 2084, and 2214) until the entire hot zone enclosure wall assembly reaches an equilibrium temperature. Moreover, as thermal energy is absorbed or emitted by the hot zone enclosure walls its equilibrium temperature varies substantially uniformly across all regions of the hot zone enclosure walls due to its high thermal conductivity.

Thus, during the startup period at least a portion of the thermal energy generated by combustion of fuel in the cold start combustion chamber (2300) is absorbed by top end wall (2017). A further portion is absorbed by the longitudinal cylindrical sidewall (2015) as the hot exhaust gas flows through the air gap (2155) to the system exit port (2165). As the temperature of the top end wall (2017) increases, the top end wall (2017) begins to reemit thermal energy into the cooler fuel inlet manifold (2055) which serves to increase the temperature of whatever fuel air mixture is contained therein and or flowing there through.

Eventually, the temperature of the fuel air mixture inside the fuel inlet manifold (2055) reaches a reaction temperature suitable for initiating a CPOX reaction. The initial CPOX reaction occurs when the fuel air mixture having been heated to the reaction temperature makes contact with the catalyst layers (3090) proximate to the catalyzing body input or top surface located at the interface (3032) where the catalyzing body interfaces with the back end or bottom surface of the fuel reformer module (3020). Once the CPOX reaction is initiated at the output ends of some or all of the catalyst fuel passages (3085) the temperature inside each catalyst fuel passage (3085) rapidly increases along its longitudinal length spreading the CPOX reaction to the interface (3032) and the CPOX reaction becomes self-sustaining.

Once a self-sustaining CPOX reaction is achieved, the fuel input module (197) is operated to discontinue the flow of fuel air mixture to the cold start combustion chamber (2300) and to adjust the input rate of the fuel air mixture being delivered though the fuel reformer module (3020) as required to maintain the self-sustaining CPOX reaction and generate electrical power. However, combustion inside the cold start combustion chamber (2300) may be continued until full power DC power output is also self-sustaining. The electronic controller (190) can become aware of the self-sustaining CPOX reaction by various sensors including temperature sensors provided on a wall of the hot zone enclosure, by the temperature sensor (3135) provided on the heat dissipating flange (3100), by a temperature sensor provided proximate to the system exhaust port (2165), by detecting a DC power signal at the DC power output module (140) and by various other sensing means.

To heat the cathode gas, the electronic controller (190) operates the air input module (198) to deliver a flow of air/cathode gas, into the air input port (2205). While this step can be taken simultaneously with igniting the cold start chamber or even before igniting the cold start chamber, it can also be delayed until a self-sustaining CPOX reaction is achieved. Preferably the initial flow rate of the incoming air being delivered through the recuperator chamber (2210) is very low and is intended to merely fill the SOFC system with a nearly stationary volume of air.

The flow of incoming air exits the cathode feed tube (2145) through the recuperator input port (2235), passes through the recuperator chamber (2210) to the recuperator output port (2235) and the exits the cathode feed tube (2145)

to the cathode chamber (2010) through the plurality of air exit ports (2240). After reacting with the solid oxide cathode electrode formed on outside surfaces of each tubular fuel cell (2080) the air/cathode gas, exits the combustion chamber (2135), passing through the cathode chamber exit ports (2245) to the combustion chamber (2135) where it mixes with spent fuel air mixture and for combustion. Thereafter the combustion byproducts exit the combustion chamber through combustor exit ports (2150) to the air gap (2155) and out of the system through the system exit port (2165).

The main air heating element is the disk-shaped separator wall (2214) provided inside the recuperator chamber (2210). As described above, the disk-shaped separator wall (2214) is part of the hot zone enclosure and therefore begins to increase in temperature during the start-up phase almost concurrently with increases in temperature of the disk-shape top end wall (2017) that forms the base wall of the cold start combustion chamber (2300). Additionally, the disk-shaped separator wall (2214) is thermally conductively coupled to the disk-shaped bottom tube support wall (2084) and both walls are heated by combusting the mixture of spent fuel and spent air inside the combustion chamber (2135). Thus, at about the same time that the disk-shape top end wall (2017) begins to radiate enough thermal energy into the fuel input manifold (2055) to raise fuel temperature, the disk-shaped separator wall (2214) begins to radiate enough thermal energy into the recuperator chamber (2210) to raise the temperature of the incoming air. At the same time the hot zone enclosure walls are radiating thermal energy into the cathode chamber (2010) which serves to heat the air contained therein and to heat the walls of the tube shaped fuel cells of the fuel cell stack (2005). Once the CPOX reaction becomes self-sustaining the flow rate of both the incoming air and the fuel air mixture may be adjusted as required to maintain the self-sustaining CPOX reaction and to generate electrical power at desired power output amplitude.

8.8.2 Initiating an SOFC Reaction

As described above, the fuel air mixture and the incoming air/cathode gas are heated by the hot zone enclosure walls which are heated by combustion taking place inside the cold start combustion chamber (2300). Eventually a self-sustaining CPOX reaction is initiated inside the catalyst fuel passages (3085) which heats the fuel air mixture to a higher temperature and the fuel is reformed into a syngas which is capable of reacting with the solid oxide anode electrodes formed on the inside surfaces of each of the tubular fuel cells (2080). The higher temperature syngas also radiates thermal energy onto the anode electrode electrodes as it passes through the tubular fuel cells (2080). As the temperature of the anode electrode increases the cathode electrode is heated by thermal energy being radiated into the cathode chamber (2010) by the longitudinal cylindrical sidewall (2015) and heated air/cathode gas entering the cathode chamber (2010) from the recuperator chamber (2210).

Eventually the anode and cathode electrodes, the syngas and the air/cathode gas inside the cathode chamber reach a reaction temperature where DC power begins to be generated and output to the DC power terminals. Eventually the gas temperature inside the combustion chamber (2135) reaches a combustion temperature and the thermal energy generated by the combustion occurring inside the combustion chamber increases the incoming air temperature to a steady state operating temperature. In one non-limiting example operating mode, the syngas, the incoming air and the tubular fuel cells (2080) have a steady state operating temperature of between 350 and 1200° C. with a preferred operating temperature range of 800-1000° C. Meanwhile the hot zone enclosure walls (115) constantly redistribute thermal energy by thermal conduction such that the hot zone enclosure wall temperature increases and decreases substantially uniformly over all regions thereof until a steady state operating temperature is reached and then maintained.

8.8.3 Fuel Reformer Operating Mode

Referring now to FIGS. 3-4A, as described above, the fuel reformer module (3020) is at least partially thermally isolated from the cold start combustion chamber (2300) and the hot zone enclosure walls in order to prevent the fuel air mixture inside the fuel chamber (3005) from reaching its auto ignition temperature prior to entering the cylindrical catalyzing body (3030). More specifically depending on the fuel being used the fuel auto ignition temperature range is approximately 295 to 580° C. By comparison the operating temperature range of the SOFC system, again depending on fuel and electrode layer materials, is 350 to 1200° C. Additionally, as pointed out above the CPOX reaction temperature range is estimated to be 900 to 1000° C.

During a cold start, the fuel air mixture (3020) enters the cylindrical fuel chamber (3005) and passes through the reactor shield base wall (3015) and then through the cylindrical catalyzing body (3032) to the fuel input manifold (3055). The fuel air mixture then flows through the tubular fuel cells and eventually out of the system. As described above, the present disclosure manages thermal energy generated by combustion inside the cold start combustion chamber (2300) in a manner that facilitates a greater transfer of thermal energy to the disk shaped top end wall (2017) of the hot zone enclosure than is transferred to the other cold start combustion chamber walls (2510 and 2511) and (2513). This is managed by configuring the disk shaped top end wall (2017) with a greater thermal mass than the combined thermal mass of the other walls (2510 and 2513).

More specifically, thermal energy transfer (Q) is governed by Equation 4:

$$Q=Q=C_{th}\Delta TQ \qquad \text{EQU. 4}$$

where: Q=thermal energy transfer (J); $C_{th}$=thermal mass of wall (J/° C.); and $\Delta T$=temperature difference between the hot gas and the wall.

In the present example. $\Delta T$ is approximately the same for each wall; however, the thermal mass of each wall is different. The thermal mass $C_{th}$ is defined as the product of wall material mass (m) in units of (g) and the specific heat capacity (μ) in units of (J/g° C.) of the material, where mass (m) is the product of wall material volume V, in units of (cm³), and the material density (ρ), in units of (g/cm³).

$$C_{th}=\rho V\mu \qquad \text{EQU. 5}$$

where: ρ=material density (g/cm³); V=material volume (cm³); and μ=material specific heat capacity of the material (J/g° C.).

In a non-limiting example embodiment, the disk shaped top end wall (2017) of the hot zone enclosure comprises mostly copper and the other walls (2510), (2511) and (2513), of the intermediate enclosure surrounding the cold start combustion chamber (2300) and further surrounding the hot zone enclosure each comprises mostly Hastelloy. For copper, the specific heat capacity (μ) is 0.385 J/g° C. For Hastelloy, which is a Cobalt-Nickel-Chromium-Tungsten alloy that combines excellent high temperature strength with very good resistance to oxidizing environments up to 2000° F. (1095° C.), the specific heat capacity GO is 0.450 J/g° C. For copper, the density (p) is 8.96 g/cm³ and for Hastelloy the density (p) is 8.22 g/cm³. Ensuring that the top end wall (2017) absorbs more thermal energy that the other walls, proximate to the cold start chamber (2300), combined is accomplished when ($Q_t$) of the disk shaped top end wall (2017) is greater that ($Q_o$) of all the other walls combined which when expressed in terms of Equation 4 when the term ΔT is the same for each wall simplifies to:

$$C_{th}t > C_{th}o \text{ or } (\rho_c V t \mu_c) > (\rho_h V o \mu_h)$$

where: $C_{th}t$=thermal mass of the top end wall; $C_{th}o$=thermal mass of the other walls combined; Vt=volume of the top end wall; Vo=volume of the other walls combined; $\rho_c$=density of copper and $\rho_h$=density of Hastelloy; and $\mu_c$=specific heat of copper and $\mu_h$=specific heat Hastelloy; with the result of the present example that:

$$V_t > 1.07 V_o$$

In other words, the thermal mass of the top disk shaped top end wall (2017) exceeds the thermal mass of other cold start combustion chamber walls (2510 and 2513) when the volume (Vt) of the disk shaped top end wall (2017) exceeds 1.07 times the combined volume (Vo) of the other walls (2510 and 2513). Thus, according to the present disclosure, the thermal mass of the top disk shaped top end wall (2017) exceeds the thermal mass of the intermediate enclosure walls (2510 and 2513) and preferably by 100% or more. More practically only the walls actually surrounding cold start chamber (2300) are taken into account to calculate (Vo) above. In the above example, (Vo) includes the entire volume of wall (2513) and only that portion of the wall (2510) that actually encloses the cold start chamber (2300). Using this model, the thermal mass of the wall (2513) and the portion of the wall (2510) that surrounds the cold start chamber, is exceeded by 100% when the volume of the disk shaped top end wall (2017) (Vt), is 2.14 times the volume (Vo).

As a result, more thermal energy is absorbed by the top end wall (2017) than is absorbed by all the other cold start combustion chamber walls combined. A primary advantage of this embodiment is absorbing the majority of thermal energy generated by the fuel air mixture being combusted inside the cold start combustion chamber (2300) into the top end wall (2017). Since the top end wall and the other hot zone enclosure walls are more thermally conductive than the walls (2510 and 2513) thermal energy absorbed by the top end wall is rapidly conducted by the thermally conductive path formed by hot zone enclosure walls. This is further facilitated by forming the intermediate enclosure walls (2510, 2511, and 2513) and the annular enclosure wall (7060) from Hastelloy or another high nickel content metal having a coefficient of thermal conductivity of less than about 25.0 W/m° K which causes a much slower conductive heat flow rate away from the hot zone enclosure walls than through the hot zone enclosure walls.

During the cold start process combustion energy from the cold start chamber is primarily absorbed by the top end wall (2017) and reemitted into the fuel inlet manifold (2055) to sufficiently heat the fuel air mixture contained therein to a temperature that is high enough to initiate the CPOX reaction at the output end (3034) of the catalyst fuel passages (3085). A secondary advantage of this embodiment is that the majority of thermal energy generated by the fuel air mixture being combusted inside the cold start combustion chamber (2300) is diverted away from the fuel reformer module (3020) by instead providing a higher conductive heat flow rate from the disk shaped top end wall (2017) to the other hot zone enclosure walls (2015 and 2511) as well as to the disk shaped separator wall (2214) and the disk-shaped bottom tube support wall (2084).

Once the CPOX reaction is initiated and self-sustaining the fuel reactor body (3040) provides a thermally conductive path and sufficient thermal mass to rapidly conduct thermal energy from the reactor shield base wall (3015) to the heat dissipating flange (3100). In particular since the interface (3032) is proximate to the CPOX reaction which has a temperature of 900-1000° C., thermal energy reaches the reactor shield base wall (3015) in varying amounts by radiation, thermal conduction, and convection and is absorbed by the exposed surface (B) and the remaining solid material of the bottom surface of the reactor shield base wall (3015), as well as internal surfaces of the circular base wall fuel passages (3095) shown in FIGS. 4 and 4A. As a result, the initial CPOX reaction proximate to the interface (3032) is effectively quenched to prevent auto ignition of the incoming fuel air mixture. The combined surface area (B) denoted ABt potentially absorbs about 1% of the total thermal radiation emitted from all the catalyst fuel passage (3085) and the solid surface area of the reactor shield base wall at the interface, denoted AS above, potentially absorbs about 0.2% of the total thermal radiation emitted from all the catalyst fuel passage (3085) and internal surfaces of the base wall fuel passages (3095) potentially absorb about 13.6% for a combined total of about 15%.

According to the present disclosure the thermal mass of the reactor shield base wall (3015), i.e. its material volume, (see equation 5 above), is formed large enough to provide sufficient energy transfer from the catalyst fuel passages (3085) to prevent over heating therein when the reactor shield base wall can be maintained at or below 100° C. Additionally according to the disclosure the thermal mass of the fuel reactor body (3040), i.e. its material volume, is formed large enough to provide sufficient energy transfer by thermal conduction from the reactor shield base wall (3015) to the heat dissipating flange (3100) to allow the entire fuel reactor body (3040) to be maintained nearly at uniform temperature with a small thermal gradient maintained between the higher temperature reactor shield base wall and the heat dissipating flange (3100). Additionally according to the present disclosure the surface area of the heat dissipating flange (3100) is sufficiently large that thermal energy is dissipated therefrom at a rate equal to the rate of thermal energy being absorbed by the reactor shield base wall (3015), which as noted above is about 44 W. Additionally according to the present disclosure the fuel reactor body (3040) is configured to dissipate sufficient thermal therefrom to prevent the fuel air mixture passing through the cylindrical fuel chamber (3005) from exceeding an auto ignition temperature thereof. More specifically the heat dissipating flange (3100) is configured to dissipate enough thermal energy to the surrounding air to maintain the temperature of the fuel reactor body (3040) below about 295° C., equal to the lowest auto ignition temperature of expected fuel air mixtures, and preferably to maintain the temperature of the entire fuel reactor body (3040) between about 100 and 250° C. during all operating modes. Also according to the present intention, temperature of the heat dissipating flange (3100) is monitored during all operating phases and if the temperature of the heat dissipating flange exceeds a desired high temperature limit, in a range of 100 to 250° C., the input fuel air mixture may be stopped by operable elements of the fuel input module (197) to prevent fuel from entering the reformer (167) until further operation or the air moving element (3130) reduces the temperature the heat dissipating flange (3100) to a safe operating temperature.

8.9 Alternative Fuel Reformer and Outer Enclosure Embodiment

Referring now to FIGS. 2-4 and 7, an exemplary, non-limiting, alternative embodiment of an SOFC system (7000) includes an alternate embodiment of a fuel reformer module (7020) and related elements. The SOFC system (7000) has substantially identical construction and similar operating modes as compared with the systems (2000 and 3000) shown in FIGS. 2-4, both described above, except that additional features and different operating modes of the system (7000) are outlined below. In order to clarify the similarity and differences between the systems the SOFC system embodiments (2000, 3000, and 7000) below, like references numbers are used when the referenced item has substantially the same structure in each of the systems (2000, 3000, and 7000).

Figure 7:
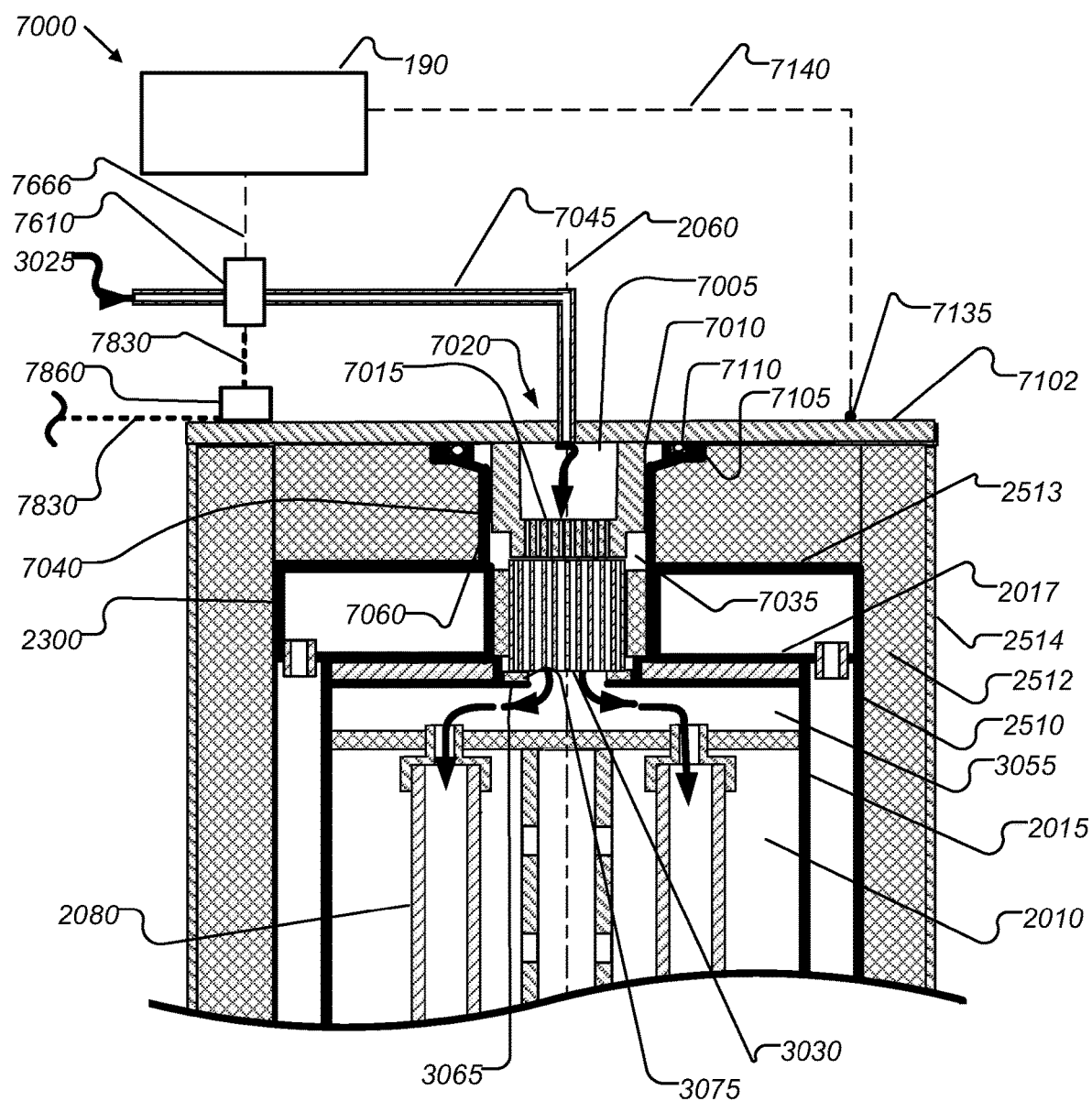
FIG. 7 depicts a schematic side section view taken through a non-limiting exemplary solid oxide fuel cell stack assembly according to the present disclosure.

Referring to FIG. 7 an alternate fuel reformer module (7020) includes a fuel reactor body (7040) comprising an annular perimeter wall (7010) attached to or integrally formed with a reactor shield base wall (7015). The fuel reactor body (7040) is formed to provide a cylindrical fuel chamber (7005) bounded by the annular perimeter wall (7010), the reactor shield base wall (7015) and by a disk shaped outer enclosure top end flange (7102). A fuel inlet conduit (7045) is disposed to pass through the disk shaped outer enclosure top end flange (7102) to fuel chamber (7005).

The fuel reformer module (7020) further includes a cylindrical catalyzing body (3030), described above. Each of the fuel reactor body (7040) and the cylindrical catalyzing body (3030) is installed into a cylindrical catalyzing cavity (7035) with the cylindrical catalyzing body (3030) positioned just above the fuel inlet manifold (3055) and the fuel reactor body (7040) positioned just above the cylindrical catalyzing body (3030). Each of the fuel reactor body (7040) and the cylindrical catalyzing body (3030) is configured to provide fluid communication between the cylindrical fuel chamber (7005) and the fuel inlet manifold (3055) as shown in FIGS. 4 and 4A and described above. The fuel reactor body (7040) is formed using materials that have a coefficient of thermal conductivity of greater than 100 W/m° K and with sufficient thermal mass to rapidly conduct thermal energy away from the interface between the reactor shield base wall (7015) and the catalyzing body (3030).

In the present non-limiting alternate embodiment of the SOFC system (7000) the cylindrical catalyzing cavity (7035) has a side wall formed by an inside diameter of the annular enclosure wall (7060). The inside diameter of the annular enclosure wall (7060) is formed with its longitudinal central axis disposed coaxial with the central longitudinal axis (2060). The cylindrical catalyzing cavity (7035) includes two open ends each forming a circular aperture with a top circular aperture facing the disk shaped outer enclosure top end flange (7102) and a bottom circular aperture facing the fuel inlet manifold (3055). The annular enclosure wall (7060) includes an annular seal plate (7105) surrounding the top circular aperture that mechanically interfaces with the disk shaped outer enclosure top end flange (7102), The annular seal plate (7105) is attached to the disk shaped outer enclosure top end flange (7102) by mechanical fasteners or the like, not shown. An O-ring seal element (7110), or the like, is disposed between the annular seal plate (7105) and the disk shaped outer enclosure top end flange (7102), e.g. in an O-ring groove, and serves to gas seal a top portion of the cylindrical catalyzing cavity (7035).

Disk shaped outer enclosure top end flange (7102) is attached to the outer cylindrical sidewall (2514) and the joint between the two elements provides a continuous thermally conductive path. Like the fuel reactor body (7040) and the other outer enclosure walls (2514) and (2518) the outer enclosure top end flange (7102) is formed from materials that have a coefficient of thermal conductivity of greater than 100 W/m° K and with sufficient thermal mass to rapidly conduct thermal energy from the interface between the reactor shield base wall (7015) and the catalyzing body (3030). As noted above thermal energy absorbed by the outer enclosure top end flange (7102) is rapidly conducted to the outer cylindrical wall (2514) to minimize thermal gradients from one area of the outer enclosure to another. The disk shaped outer enclosure top end flange (7102) is attached to the outer cylindrical wall (2514) by mechanical fasteners (not shown) by welding, soldering, or the like. In any case the joint formed between the top end flange (7102) and the outer cylindrical wall (2514) is gas sealed and provides a substantially continuous thermally conductive pathway.

As described above, the reactor shield based wall (7015) is configured to absorb thermal energy generated within the cylindrical catalyzing body (3030). The entire fuel reactor body (7040) is configured to provide a continuous thermally conductive path to the disk shaped top end flange (7102) in order to rapidly conduct thermal energy generated within the cylindrical catalyzing body (3030) to the disk shaped outer enclosure top end flange (7102) and from it to the cylindrical side wall (2514) and outer bottom wall (2518). Thus, a change in the instantaneous temperature of reactor shield base wall (7015) is rapidly followed by a corresponding change in the temperature of the entire outer enclosure.

8.10 Thermal Energy Transfer from the Hot Zone Enclosure to the Outer Enclosure As detailed above each wall of the outer enclosure (2514), (2518), (7102) comprises materials having a high coefficient of thermal conductivity, e.g. between 100 and 300 W/m° K and preferably above 140 W/m° K. Accordingly, the outer cylindrical side wall (2514), disk shaped outer bottom wall (2518) and disk shaped outer enclosure top end flange (7102) are fabricated from one or more of copper, molybdenum, aluminum copper, copper nickel alloys, or a combination thereof. Each of the walls (2514), (2518) and (7102) preferably comprises aluminum or an aluminum alloy preferably having a coefficient of thermal conductivity above 140 W/m° K and each having sufficient thermal mass, i.e. thickness to rapidly conduct thermal energy throughout its volume and from one adjoining wall to another. In the present non-limiting example embodiment, the outer cylindrical wall (2514) and the disk shaped outer bottom wall (2518) have a material thickness in a range of 0.5-6.5 mm (0.20-0.25 inches) and the outer enclosure top end flange (7102) has a material thickness in a range of 4.0-10.0 mm (0.16-0.39 inches); however, other thickness ranges are usable without deviating from the present disclosure.

Specifically, each of the outer enclosure walls (2514, 2518, 7102) is configured to provide a substantially continuous thermally conductive pathway for rapid conduction of thermal energy by thermal conduction from one area of the outer enclosure to another in order to more rapidly reduce temperature gradients between regions of the outer enclosure such that the entire outer enclosure wall structure remains substantially at the same uniform temperature throughout.

As further described above the hot zone enclosure walls (2015, 2016, and 2017) and (2214 and 2080) form a continuous thermally conductive pathway suitable for rapid thermal conduction from one area of the hot zone enclosure walls to another in order to more rapidly reduce temperature gradients between the hot zone enclosure walls and maintain the entire hot zone enclosure wall structure substantially at the same temperature. The intermediate enclosure walls (2510, 2511, and 2513) are thermally conductively coupled with the hot zone enclosure walls by the disk shaped end wall (2017). As detailed above each of the intermediate enclosure walls comprises a material having a thermal conductivity of less than about 25.0 W/m° K, as compared with the coefficient of thermal conductivity of the hot zone enclosure walls which is 100 W/m° K or higher. Additionally, the disc shaped walls (2017, 2084 and 2214) provide a greater thermal mass as compared with less thermal mass provided by the intermediate enclosure walls. As a result, the hot zone enclosure walls absorb and conduct thermal energy at a faster rate than the intermediate enclosure walls. While the hot zone enclosure walls are thermally conductively connected to the intermediate enclosure walls by the disk shaped wall (2017), the thermal mass of the connection is purposely made small in order to slow a conductive heat flow rate across the thermally conductive path formed by the wall (2017). This provides a thermal gradient between the hot zone enclosure walls and the intermediate enclosure walls. The benefit of the thermal gradient provided between the hot zone enclosure walls and the intermediate enclosure walls is an increase in thermal radiation being emitted from the hot zone enclosure walls to more rapidly heat incoming cathode air in the recuperator chamber (2210) and air present in the cathode chamber (2010).

As further detailed above each wall of the outer enclosure (2514, 2518, and 7102) comprises materials having a high coefficient of thermal conductivity, e.g. between 100 and 300 W/m° K and preferably above 140 W/m° K. Accordingly, the outer cylindrical side wall (2514), disk shaped outer bottom wall (2518) and disk shaped outer enclosure top end flange (7102) are fabricated from one or more of copper, molybdenum, aluminum, nickel or alloys thereof. In one non-limiting embodiment the walls (2514, 2518, 2516 and 7102) preferably comprises aluminum or an aluminum alloy preferably having a coefficient of thermal conductivity above 140 W/m° K. Additionally, each of the walls (2514, 2518, 2516, and 7102) is formed with sufficient thermal mass, i.e. thickness or total volume, to rapidly conduct thermal energy throughout its volume, e.g. from one adjoining outer enclosure wall to another. In the present non-limiting example embodiment shown in FIGS. 3 and 7, the outer enclosure walls (2514 and 2518) have a material thickness in a range of 0.5-6.5 mm (0.02-0.25 inches) and the wall (7102) has a material thickness in a range of 4.0-10.0 mm (0.16-0.39 inches; however other thickness ranges are usable without deviating from the present disclosure. In the present non-limiting example embodiment shown in FIGS. 2 and 7, the hot zone walls (2015) and (2016) have a material thickness in a range of 0.5-13 mm (0.02-0.5 inches), however other thickness ranges are usable without deviating from the present disclosure.

A layer of thermal insulation (2512) is disposed between outside surfaces of the intermediate enclosure walls and the inside surfaces of outer enclosure walls. Preferably, the layer of thermal insulation (2512) is constructed to ensure that surfaces of the outer cylindrical side wall (2514), the disk shaped outer bottom wall (2518), and the disk shaped outer enclosure top end flange (7102) remain within a desired operating temperature range e.g. 95-110° C.

The annular enclosure wall (7060) comprises a high temperature resistant material such as Hastelloy or Monel which each have a high nickel content to resist oxidation damage and which each have suitable service temperatures ratings, e.g. exceeding 400° C. However, both Hastelloy and Monel have a coefficient of thermal conductivity of less than about 25.0 W/m° K. Additionally, the annular enclosure wall (7060) is formed with a wall thickness in the range of 0.02 to 0.1 inches, but in any case, the thickness of the annular enclosure wall (7060) is selected to provide a lower thermal mass than a thermal mass of the thermally conductive walls of the hot zone enclosure in order to reduce the relative thermal mass of the annular enclosure wall (7060) as compared to the thermal mass of the hot zone enclosure walls and the intermediate enclosure walls. Thus, due to its lower thermal conductivity and reduced thermal mass, the annular enclosure wall (7060) resists conductive thermal energy transfer between the hot zone enclosure walls and the outer enclosure walls in order to maintain a thermal gradient between the hot zone enclosure walls and the outer enclosure walls. However, this resistance to conductive thermal energy transfer by the annular enclosure wall (7060) merely reduces the rate of thermal conductance or the heat flow rate from higher temperature hot zone enclosure walls to the lower temperature outer enclosure walls. More specifically the configuration of the annular enclosure wall (7060) provides a thermal gradient between the hot zone enclosure walls and the hot zone enclosure walls.

8.11 Over-Temperature Protection System

Potentially dangerous and harmful over temperature conditions can occur due to excessive heat generation at various locations within the SOFC system (7000). During operation over temperature conditions can occur in the cell stack (2005), within cylindrical catalyzing body (7030) and at other locations such as inside or proximate to the combustion chamber (2135), inside or proximate to the cold start combustion chamber (2300) and or inside the air gap (2155).

Over temperature conditions can escalate rapidly and lead to a catastrophic failure such destruction of the SOFC fuel cells and or an explosion or fire. An over temperature condition often leads to a burn through wherein metal walls are partially melted or otherwise damaged and the insulation layer (2512) is destroyed or rendered permanently less effective. A catastrophic failure may include fuel combustion within the cylindrical fuel chamber (3005) where fuel combustion is not intended to occur. Thus, when an over temperature condition occurs anywhere with the SOFC system it is desirable to stop fuel from entering into to the SOFC system (7000) as quickly as possible before the over temperature condition leads to a catastrophic failure or causes damage to the SOFC system.

Conventional SOFC systems monitor internal temperatures using internal temperature sensors. Temperate sensors are positioned inside the SOFC system proximate to critical areas where an over-temperature or an under-temperature condition can adversely affect the performance of the SOFC system. Each internal temperature sensor is in communication with an electronic controller over a wire communication interface. The electronic controller interprets temperature signals received from internal temperature sensors and runs software or other logical process steps to monitor and log temperature sensor inputs. Generally, the electronic controller (190) stores temperature limit ranges in a memory module wherein each temperature limit range relates to a different operating mode and or a different internal sensor location. One problem with internal temperature sensors is that if they fail they are not easy to replace. Additionally, internal temperature sensors of an SOFC system are in a high temperature and often contaminated environment that can reduce the useful life of the sensors. There is a need in the art to use external temperature sensors to determine SOFC temperature levels and preferably to a single external temperature sensor to determine a single instantaneous SOFC surface temperature that can be used to trigger various SOFC system process controls.

According to the present disclosure process controls can be triggered by changes in a temperature being monitored by a single external temperature sensor. In one example embodiment described above the operation of the air moving device (3130) shown in FIG. 3 is responsive to variations in temperature of an external surface of the SOFC system (3000). In particular, the electronic controller (190) using temperature sensor signals from an external temperature sensor (3135) toggles the air moving device (3130) on or off in response to instantaneous temperature variation as indicated by the external temperature sensor (3135).

Referring to FIG. 7 the SOFC system (7000) includes an external temperature sensor (7135) mounted in contact with an external surface of the disk shaped outer enclosure top end flange (7102). Alternately the external temperature sensor (7135) can be mounted in contact with any external surface of the outer enclosure walls. The external temperature sensing element (7135) is in communication with the electronic controller (190) and delivers a temperature signal to the electronic controller (190) over a communication pathway (7140). In various embodiments the SOFC system (7000) may also be equipped with the air moving element (3130), shown in FIG. 3 and described above, which is operable by the electronic controller (190) to move air over the disk shaped outer enclosure top end flange (7102) in order to reduce its temperature.

In an example operating mode, the electronic controller (190) receives temperature signals from the external temperature sensing element (7135) over communication pathway (7140) and determines an instantaneous temperature of the external surface that the external temperature sensing element is mounted to. If the instantaneous temperature is not within an expected temperature range, the electronic controller is programmed to use software and or other logical operators to carry out various operating procedures in response to out of range instantaneous temperature values.

In a first instance the SOFC system is operating in a normal operating mode generating DC output power and with a steady uniform flow of input fuel air mixture entering the fuel chamber (7005) from the fuel input module (197), shown in FIG. 1.

Fuel input module (197) includes an operable fuel supply valve (7610). The operable fuel supply valve is disposed along the fuel input conduit (7045) between a fuel source and the fuel reformer (7020). The operable fuel supply valve is in communication with the electronic controller (190) over a communication channel (7666) and with an electrical power source, not shown, over a power conduit (7830). The operable fuel supply valve (7610) has a default state wherein the valve is closed, e.g. held closed by a spring force, or the like. The valve is operated by the electronic controller (190) to open by overcoming the spring force when a power signal is applied to an actuator incorporated within or otherwise associated with the valve.

In one non-limiting embodiment the electronic controller (190) causes a power signal to be applied to the valve actuator to overcome the spring force and open the fuel supply valve (7610). Depending on an amplitude of the power signal the valve may be opened slightly, e.g. at a threshold power signal amplitude, the valve may be fully opened, e.g. at a maximum power signal amplitude. In operation, the electronic controller (190) is operable to vary the power signal amplitude in a manner that moves the valve actuator to various open positions ranging between slightly or partially open to fully opened in response to changes in the amplitude of the power signal being delivered to the valve actuator. The electronic controller (190) operates to modulate a mass or volume flow rate of the fuel air mixture (3025) that is passing through the input conduit (7045) into cylindrical fuel chamber (7005) by varying the amplitude of the power signal on the power conduit (7830).

In an operating mode of the present disclosure, the electronic controller (190) monitors the external temperature sensing element (7102) to determine an instantaneous temperature of the disk shaped top end flange (7102). A software program or other logical operators operating on the electronic controller (190) compares the measured instantaneous temperature of the top end flange with a temperature range associated with the current operating mode of the SOFC system. Temperature ranges for different operating modes are stored on a memory associated with the electronic controller (190). Non-limiting example operating modes include a startup operating mode when the cold start combustion chamber (2300) is in use, a steady state operating mode wherein the cold start combustion chamber is not in use and others wherein an input flow rate of incoming fuel is modulated to provide more or less DC power output from the fuel stack.

In each case if the instantaneous temperature sensed by the external temperature sensing element (7102) is within the temperature range expected the electronic controller takes no action. However, if the instantaneous temperature sensed by the external temperature sensing element (7102), i.e. the temperature of the top end flange (7102) is not within the temperature range expected actions may be taken by the electronic controller (190).

As a safety feature the expected temperature range for any of the operating modes has an upper limit called the "controller failsafe temperature". In the present non-limiting example operating mode, the controller failsafe temperature is 140° C. In particular if the instantaneous temperature measured by the external sensor (7135) is 140° C. or higher the electronic controller initiates a safety shut down procedure than at least includes de-energizing the operable fuel supply valve (7610) actuator to prevent any further fuel flow into the SOFC system.

Once the controller failsafe temperature is sensed, the electronic controller initiates software or logically controlled shutdown process that includes commanding the fuel delivery module (197) to close the fuel supply valve (7610) by cutting power thereto. Additionally, the controlled shut down process may include ceasing fuel delivery to the cold start combustion chamber (2300), ceasing air input by the air input module (198) and actuating the air moving device (3210), if the SOFC system is so equipped and if the air moving device is not already operating.

More generally, due to the thermally conductive pathway and relatively high thermal conductivity provided by the improved outer enclosure of the present disclosure a single external temperature sensing element (7135) positioned on any surface of the outer enclosure eccentrically senses an instantaneous temperature of the entire outer enclosure walls (132).

In a further aspect of the present disclosure a thermal fuse (7860) that includes a fusible link is disposed in contact with an outside surface of the disk shaped outer enclosure top end flange (7102), or in contact with any outer surface of the outer enclosure. The thermal fuse (7860) is disposed along the fuel supply power conduit (7830) between the power supply of source and the operable fuel supply valve (7610). The thermal fuse (7860) is a passive device and independent of the electronic controller (190). The thermal fuse is configured to interrupt electrical power passing from the supply valve power source, not shown, to the operable fuel supply valve (7610) when the fusible link melts and causes a short circuit inside the thermal fuse (7860). The fusible link has a specific melting temperature that is equal to a system failsafe temperature. In the present non-limiting example embodiment, the system failsafe temperature is equal to a temperature greater than the controller failsafe temperature. In one non-limiting exemplary operating mode the system failsafe temperature is 180° C. In particular, if the temperature of the fusible link reaches the system failsafe temperature of 180° C. the fusible links melts and this causes a short circuit across the thermal fuse (7860). The short circuit cause a zero power amplitude at the operable valve (7610) which closes. Thus, fuel flow to the fuel chamber (7005) is prevented. In an exemplary, non-limiting embodiment, thermal fuse (7860) includes a commercially available thermal fuse, e.g., any one of Tamura LE series, NEC Sefuse SF series, Microtemp G4A series, and Hosho Elmwood D series thermal fuses wherein the selected fuse is configured with a fusible link that melts at the desired system failsafe temperature.

As set forth above, the system (7000) includes the electronic controller (190) which is operable to carry out a software or logical shut down procedure when the single external temperature sensor (7135) reports an instantaneous temperature equal to the controller failsafe temperature. The software or logical shut down procedure at least includes causing the operable fuel supply valve (7610) to close using logical commands. Meanwhile in the event that the fusible link of thermal fuse (7860) reaches the system fails safe temperature the thermal fuse prevents power from reaching the operable fuel supply valve (7610) such that fuel flow to the fuel chamber is stopped in the event that the fuel flow was not previously stopped by the software or logical shut down procedure.

As noted above because each of the outer enclosure walls (2514, 2518, and 7102) is configured to provide a thermally conductive pathway with a high coefficient of thermal conductivity the entire outer enclosure wall structure rapidly reaches thermal equilibrium at substantially at the same instantaneous temperature. Accordingly, the temperature sensing elements (7135) and the thermal fuse (7860) can be positioned on any outside surface of the outer enclosure including on different outside surfaces of the outer enclosure. Moreover, as detailed above, the instantaneous temperature of the outer enclosure increases and decreases in response to increases and decreases in the temperature of the hot zone enclosure walls which are thermally conductively connected over the annular enclosure wall (7060). Thus, any prolonged increase in instantaneous temperature at any location within the SOFC system (7000) ultimately leads to an increase in temperature of the outer enclosure walls which is then detected by the external temperature sensing element (7135) and monitored by the electronic controller (190).

8.12 Fuel/Oxidant Input Control Module

Figure 8:
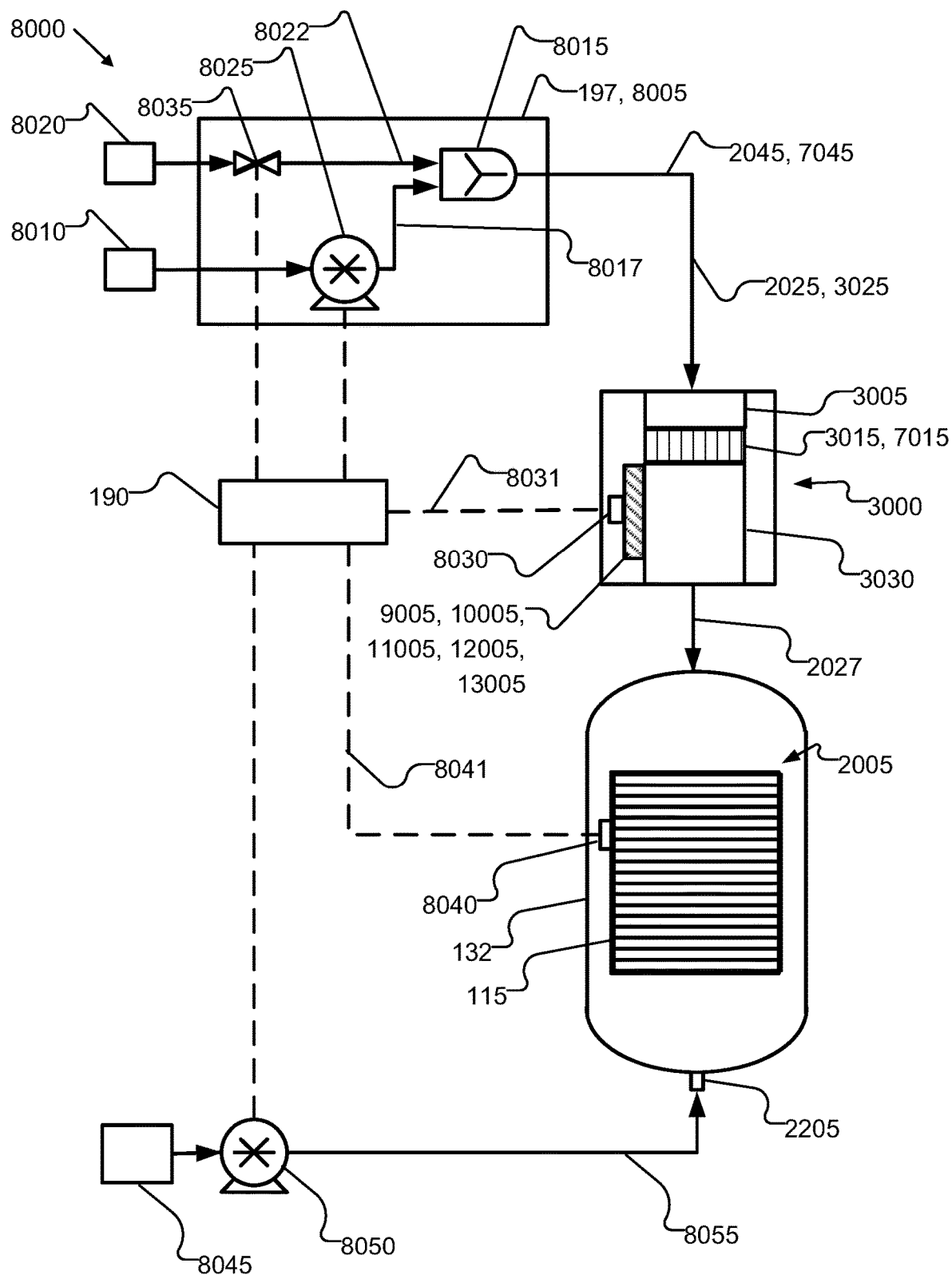
FIG. 8 depicts a schematic representation of a further non-limiting exemplary embodiment of a Solid Oxide Fuel Cell (SOFC) system that includes a fuel and air input system according to the present disclosure.

Referring now to FIG. 8, a schematic representation of a further non-limiting exemplary embodiment of a Solid Oxide Fuel Cell (SOFC) system (8000) according to the present disclosure is illustrated therein. The SOFC system (8000) includes a fuel/oxidant input control module (8005), also shown as the fuel input module (197), in FIG. 1. The fuel/oxidant input control module (8005) includes, or is fluidly coupled with each of, an oxidant supply source (8010) and a hydrocarbon fuel supply source (8020). The oxidant supply source (8010) is in fluid communication with a mixing chamber (8015), e.g. a spiral mixing chamber, by a connecting oxidant input conduit (8017). The fuel supply source (8020) is in fluid communication with the mixing chamber (8015) by a connecting fuel input conduit (8022). An oxidant flow modulator (8025) is disposed along the oxidant input conduit (8017) between the oxidant supply source (8010) and the mixing chamber (8015). A hydrocarbon fuel flow modulator (8035) is disposed along the fuel input conduit (8022) between the hydrocarbon fuel supply source (8020) and the mixing chamber (8015). Each flow modulator (8025, 8035) includes at least one electro-mechanical actuator, not shown, controlled by the electronic controller (190). The electronic controller (190) is configured to independently modulate an input oxidant flow rate and an input hydrocarbon fuel flow rate to the mixing chamber (8015). Each of the input oxidant flow rate and the input hydrocarbon fuel flow rate can be modulated between a substantially zero input flow rate and a maximum input flow rate. In alternate embodiments, the mixing chamber (8015) is eliminated and each of the oxidant input conduit (8017) and the fuel input conduit (8022) is connected between the corresponding supply source and the fuel chamber (3005), that is formed inside the fuel reactor system (3000), shown in FIGS. 3, 4, 4A and 7.

8.12.1 Compressed Gas Container

In one non-limiting exemplary embodiment, one or both of, the oxidant supply source (8010) and the hydrocarbon fuel supply source (8020), is a compressed gas container, e.g. a pressurized oxygen or air container, or a pressurized hydrocarbon fuel container. In either case, the pressurized container includes a passive pressure regulator, not shown. The passive pressure regulator is disposed between the compressed gas container and the mixing chamber (8015) and operates to pressure modulate or regulate a flow of high pressure gas exiting from the compressed gas container. A flow of lower pressure gas is released, by the pressure regulator, into the corresponding input conduit (8017, 8022), wherein the lower pressure gas is released at a much lower gas pressure as compared with the high-pressure gas stored inside the compressed gas container. The passive pressure regulator also acts as a passive gas flow modulator. This occurs when the lower pressure gas exiting from the corresponding input conduit (8017, 8022), to the mixing chamber (8015), causes the gas pressure inside the corresponding conduit to drop. In response to the drop in gas pressure, inside the corresponding conduit, the passive pressure regulator releases gas from the pressurized gas container into the corresponding conduit, until the gas pressure inside the corresponding conduit is restored to a set pressure of the passive gas regulator. Thus, a gas flow rate exiting from either one of the input conduits (8017, 8022), e.g. to the mixing chamber (8015), is replaced by a corresponding gas flow rate being released by the corresponding passive pressure regulator. Accordingly, each gas regulator operates to maintain a constant gas pressure inside the corresponding input conduit (8017, 8022).

8.12.2 Air Pump/Fan

In another non-limiting exemplary embodiment, the oxidant source (8010) is an air pump or a fan that draws air into the oxidant input conduit (8017) from the surrounding environment or from an air intake vent, or the like. In one non-limiting exemplary embodiment, the air pump or a fan is also operated as the oxidant flow modulator (8025) when the air pump or fan includes a controllable electro-mechanical actuator in communication with the electronic controller (190). The controllable electro-mechanical actuator, not shown, operates to rotate or otherwise move the controllable air moving device, e.g. a pump vane, a fan blade, or the like, associated with the air pump or fan. Movement of the air moving device directs or draws the oxidant into the oxidant input conduit (8017) and the oxidant fuel flow rate is varied by varying a velocity of the air move device, e.g. by varying an angular velocity of a rotating pump vane or fan blade. The changes in velocity of the air moving device are driven by control and command signals received from the electronic controller (190). The command and control signals received by the air moving device modulate a velocity of the air moving device which corresponds with modulating a flow rate of the air passing through the oxidant input conduit (8017) to the mixing chamber (8015). The air pump or fan, when operating as the oxidant flow modulator (8025), is controlled by the electronic controller (190) and is operated to modulate a fluid flow rate of the air passing through the oxidant input conduit (8017) to the mixing chamber (8015) between a substantially zero oxidant flow rate and a maximum oxidant flow rate.

In a further non-limiting embodiment, the oxidant source (8010) is an air pump or a fan that draws air into the oxidant input conduit (8017) from the surrounding environment or from an air intake vent, or the like, at a substantially constant air flow rate and the air flow rate modulation is performed by a gas control valve, described below.

8.12.3 Liquid Fuel Supply

In another non-limiting exemplary embodiment, the hydrocarbon fuel supply source (8020) comprises a liquid hydrocarbon fuel, e.g. kerosene, gasoline, or the like. In this embodiment, the hydrocarbon fuel supply source (8020) comprises a liquid fuel container, which may be pressurized, and a vaporizer or atomizer module disposed between the liquid fuel container and the mixing chamber (8105). The liquid fuel is delivered into the vaporizer or atomizer which is configured to convert the liquid fuel into hydrocarbon gas vapor or a mist comprising liquid fuel droplets. The hydrocarbon gas vapor or mist is delivered into the hydrocarbon fuel input conduit (8022) for delivery to the mixing chamber (8015). In the present embodiment, the vaporizer or atomizer may also be operated as the hydrocarbon fuel flow modulator (8035) when the vaporizer or atomizer includes a controllable electro-mechanical actuator, or the like, in communication with the electronic controller (190). The controllable electro-mechanical actuator operates to move or otherwise manipulate an element associated with vaporizing or atomizing the liquid fuel supply to modulate the hydrocarbon fuel flow rate to the mixing chamber (8015).

In a further non-limiting embodiment, the vaporizer or atomizer delivers a liquid hydrocarbon fuel mist or vapor into the hydrocarbon fuel input conduit (8022) from the liquid fuel source at a substantially constant hydrocarbon fuel flow rate and the hydrocarbon fuel flow rate modulation is performed by a gas flow control valve, described below.

8.12.4 Gas Flow Control Valve

In a further non-limiting exemplary embodiment, one or both of the oxidant flow modulator (8025) and the hydrocarbon fuel flow modulator (8035) comprises a gas flow control valve, disposed along the corresponding input conduit (8017, 8022), between the corresponding oxidant supply source (8010) or hydrocarbon fuel supply source (8020) and the mixing chamber (8015). Each gas flow valve includes an electro-mechanical actuator in communication with the electronic controller (190). The electro-mechanical actuator operates to rotate or otherwise move a movable gate, or the like, wherein the movable gate is disposed inside the gas flow control valve or inside the corresponding input conduit (8017, 8022). The movable gate is moved in response to control and command signals received from the electronic controller (190) to independently modulate a flow rate of each of the oxidant and the hydrocarbon fuel passing through the gas control valve to the mixing chamber (8015). Accordingly, each of the gas flow valves operating as either the oxidant flow modulator (8025) or the fuel flow modulator (8035), is operated by the electronic controller (190) and the electronic controller is configured to modulate a fluid flow rate, passing through the movable gate, wherein the fluid flow rate ranges between a substantially zero oxidant or hydrocarbon fuel flow rate, and a maximum oxidant or hydrocarbon fuel flow rate. Preferably, the gas flow valve is operable to provide a plurality of discreet incremental volumetric flow rate levels over the flow rate range with each incrementally volumetric flow rate level varying the flow rate between about 0.1 and 1.0 standard cubic centimeter per minute, (SCCM).

8.12.5 Cathode Air Pump

The fuel cell stack includes a cathode air input port (2205) that leads into the cathode chamber (2010), shown in FIG. 2. A cathode air or other oxidant source (8045) is disposed to deliver a cathode air flow, or other oxidant flow, into a cathode air input conduit (8055) that leads to the air input port (2205). A cathode air flow modulator (8050) is disposed along the cathode air input conduit (8055) between the cathode air source (8045) and the cathode air input port (2205). The cathode air flow modulator (8050) includes at least one controllable electro-mechanical actuator, not shown, that is controlled by the electronic controller (190). In one exemplary embodiment, the cathode air source (8045) is an air pump or a fan that is also operated as the cathode flow modulator (8050). In this example, the air pump or fan includes a controllable electro-mechanical actuator in communication with the electronic controller (190). The controllable electro-mechanical actuator operates to rotate or otherwise move the controllable air moving device, e.g. a pump vane, a fan blade, or the like, associated with the air pump or fan, at different velocities. Movement of the air moving device directs or draws cathode air into the cathode air input conduit (8055) and a volumetric flow rate of the cathode air is varied by varying a velocity of the air move device, e.g. by varying an angular velocity of a pump vane or fan blade. The changes in velocity of the air moving device are driven by control and command signals received from the electronic controller (190). The command and control signals drive changes in velocity of the air moving device to modulate the volumetric flow rate of the cathode air passing through cathode air input conduit (8055) to the cathode air input port (2205). Accordingly, the air pump or fan, operating as the cathode flow modulator (8050), is operated by the electronic controller (190) and the electronic controller is configured to modulate the volumetric fluid flow rate of the cathode air passing through the cathode air input conduit (8055) to the cathode air input port (2205) between a substantially zero cathode air flow rate, and a maximum cathode air flow rate. Preferably, the air moving device used to modulate the volumetric flow rate of the cathode air provides a plurality of discreet incremental volumetric flow rate levels over the volumetric flow rate range with each incrementally volumetric flow rate level varying the flow rate between about 0.5 and 2.0 standard cubic centimeter per minute, (SCCM).

As described above, with respect to the oxidant supply source (8010), the cathode air supply source (8045) may comprise a compressed gas container, e.g. a pressurized oxygen or air tank, that includes a passive pressure regulator. Alternately, the cathode supply source (8045) may comprise an air pump or a fan that draws air into the cathode air input conduit (8055) from the surrounding environment or from a vented conduit, or the like. However, the air pump or fan is not operated as the cathode air flow modulator (8050). Instead, the flow rate of the cathode air that is delivered into the cathode air conduit (8055) by the air pump or fan is substantially constant when the air pump or fan velocity is not modulated by the electronic controller. In this embodiment, the fuel flow modulation is performed by a gas flow control valve disposed along the fuel input conduit (8022), as described above.

8.12.6 Fuel Air Mixture

The mixing chamber (8015) is preferably a spiral chamber used to mix the hydrocarbon fuel flow with the oxidant flow to generate a fuel air mixture (2025, 3025). The fuel air mixture preferably has an oxygen to carbon (O:C) ratio in a range of 1.0 to 2.2 wherein the O:C ratio corresponds with a molar ratio, e.g. the ratio of oxygen atoms to carbon atoms.

The fuel air mixture (2025, 3025) exits from the mixing chamber (8015) to the gas flow conduit (2045 7045), which extends from the fuel/oxidant input control module (8005) to the fuel chamber (3005), that is formed inside the fuel reactor system (3000), shown in FIGS. 3, 4, 4A and 7, and described above. While the preferred hydrocarbon fuel of the present disclosure is methane ($CH_4$), other longer hydrocarbon molecule chains can be used including ethane ($C_2H_6$) propane ($C_3H_8$), butane ($C_4H_{10}$), or the like. Additionally, liquid hydrocarbon fuels having hydrocarbon chains ranging between $C_5H_{12}$ through $C_{18}H_{32}$ can be reformed by the systems and methods of the present disclosure.

8.12.7 CPOX Reaction

The fuel reactor system (3000) is configured to reform the fuel air mixture (2025, 3025) by Catalyst Partial Oxidation (CPOX). The CPOX reaction is an exothermal reaction, (flameless combustion), that converts the fuel air mixture to syngas (2027). The syngas (2027) is a reformate that includes the anode gas that is used to react with the solid oxide anode electrode surfaces formed onto inside surfaces of each tubular fuel cell (2080), of the SOFC stack (135, 2005). The anode gas reactants are $H_2$ and CO, because both reactants are capable of bonding with oxygen atoms that are available on the solid oxide anode electrode surfaces. The bonding of oxygen atoms or ions, available on the anode electrode surface, with the $H_2$ reactant, to form $H_2O$, and with the CO reactant to form $CO_2$, generates the DC current that is output from each of the tubular fuel cells (2080) to the DC power module (140) shown in FIG. 1. In alternate embodiments, the CPOX reactor and fuel reforming methods of the present disclosure are usable to deliver syngas to planar solid oxide anode electrode surfaces without deviating from the present disclosure.

The oxygen atoms, or ions, that are available on the solid oxide anode electrode surfaces are received from oxygen gas $O_2$ available from the cathode air that is pumped into the cathode chamber (2010). The input volumetric flow rate of the cathode air is modulated to keep up with the demand for oxygen atoms or ions on the solid anode electrode surfaces. Oxygen gas from the cathode air reacts with the solid oxide cathode electrode surfaces (155), formed onto outside surfaces of each tubular fuel cell (2080), or onto planar solid oxide cathode electrode surfaces. The oxygen gas $O_2$, is separated in to individual oxygen atoms, or ions, that pass through the solid oxide cathode electrode, through the electrolyte layer disposed between the cathode electrode and the anode electrode, and through the solid oxide anode electrode that is exposed to the anode gas.

Equation 6, listed below, details the CPOX chemical reaction associated with converting the fuel air mixture to syngas (2027). The CPOX chemical reaction of equation 6 is initiated when the fuel air mixture contacts the catalyst layers (3090) coated on inside surfaces of the catalyst fuel passages. The catalyst layers (3090) initiate the CPOX chemical reaction at a CPOX reaction temperature of 600 to 900° C. Without the catalyst layers (3090) the CPOX reaction temperature would be 1000 to 1200° C.

$$C_nH_m+(n/2)O_2 \rightarrow nCO+m/2H_2 \qquad \text{EQU. 6}$$

Based on Equation 6, when the hydrocarbon fuel is methane, ($CH_4$), the fuel air mixture has an O:C ratio equal to 1.0 and an output ratio of $CO:H_2$ of 0.5. When the hydrocarbon fuel is ethane, ($C_2H_6$), the fuel air mixture has an O:C ratio equal to 1.0 and an output ratio of $CO:H_2$ of 0.66. When the hydrocarbon fuel is propane, ($C_3H_8$), the fuel air mixture has an O:C ratio equal to 1.0 and an output ratio of $CO:H_2$ of 0.75.

However, nothing in equation 6 accounts for the use of air as the oxidant, instead of pure oxygen, or for using a non-homogeneous hydrocarbon fuel source that includes a mixture of hydrocarbon molecules of varying chain length, and/or other contaminants. Moreover, Equation 6 assumes exact molar ratios of the reactants, which in practice is difficult to achieve. Without exact molar ratios of the fuel air mixture, the syngas reaction can be incomplete. In one case, when the fuel air mixture has a low O:C ratio, e.g. less than 1.0, i.e., there are more hydrocarbon fuel molecules than there are available oxygen molecules to react with and the syngas may include unreacted hydrocarbon fuel molecules CnHm. When this occurs, the unreacted hydrocarbon fuel is flushed from the fuel cells without having generated any electrical power. In the other case, when the fuel air mixture has a high O:C ratio, greater than 1.0, i.e., there are more oxygen molecules than hydrocarbon fuel molecules, the syngas includes excess oxygen gas ($O_2$) that can bond with the $H_2$ and CO components of the syngas, thereby reducing the anode gas reactants that are available to contribute to electrical power generated. Thus, an important aspect of the present disclosure is to balance the components of the fuel air mixture of Equation 6 to provide an O:C ratio that eliminates unreacted hydrocarbon fuel, e.g. free carbon atoms and excess oxygen gas from the syngas which can react to form methane, ($CH_4$). As described below, the present disclosure uses the eliminating methane from the syngas formed by the CPOX reaction as a control indicator for establishing a desirable O:C ratio.

Other known problems associated with the CPOX chemical reaction include, coke formation, and undesirable reactions with fuel contaminates. Coke formation results when carbon molecules bond with surfaces of the catalyst layers (3090) during the CPOX reaction. Carbon molecules, that are contained in the syngas output, can also contaminate surfaces of the solid oxide anode electrode layers (150), which reduces efficiency of the anode electrode layer. In both instances, coke formation tends to reduce the overall efficiency of the SOFC system. As also noted above, low O:C ratio may further contribute to unreacted hydrocarbon atoms and/or free carbon atoms that can participate in coke formation.

Coke formation is temperature dependent and tends to be more thermodynamically favorable at CPOX reaction temperatures that are below about 800° C. Thus, it is important to maintain a minimum CPOX reaction temperature of about 800° C. and preferability above about 850 to 950° C. to avoid coke formation. As described above, the maximum CPOX reaction temperature occurs proximate to the interface (3032) where the incoming fuel air mixture makes initial contact with the catalyzing layer. However, a portion of the fuel air mixture makes initial contact with the catalyzing layer more distal from the interface layer (3032), and likely reacts at a lower CPOX reaction temperature than the CPOX reaction temperature at the interface. Thus, maintaining a minimum CPOX reaction temperature of about 800° C. proximate to the interface (3032) will not necessarily eliminate coke formation distal from the interface (3032), where the reaction temperature may be less than 800° C. Coke formation is also stimulated by a low O:C ratio, e.g. less than 1.0, however, when the oxidant is air, the actual O:C ratio of the fuel/air mixture exiting the mixing chamber is somewhat uncertain, so it is desirable to provide another indicator, e.g. the lack of or the minimization of methane in the syngas as an indication that a desired O:C ratio is being provided.

A CPOX reaction control method is described and addressed in U.S. Pat. No. 8,337,757 to Roychoubhury et al., entitled Reactor Control Method. Roychoubhury et al. disclose a CPOX reactor control method that includes periodically measuring a CPOX reaction temperature at three separate locations of the CPOX reactor. The reactor control method includes selecting a steady state operating temperature and a maximum safe operating temperature. Based on the CPOX reaction temperature measured in each of the three separate locations, the reactor control method determines a maximum temperature, a minimum temperature and a difference between the maximum and minimum temperature. The reactor control method then varies three control parameters to change the O:C ratio of the incoming fuel air mixture in a manner that will minimize the difference between the maximum and minimum temperature, while preventing the maximum temperature from exceeding the maximum safe operating temperature. The three control parameters that are varied to effectively change the O:C ratio include, only varying the fuel input flow rate, only varying the air input flow rate, and alternating between varying the fuel input flow rate and the air input flow rate.

While Roychoubhury et al. disclose a CPOX reactor control method that addresses the need to vary the O:C ratio to minimize the difference between the maximum and minimum temperature of three separate locations of the CPOX reactor, one problem with the control method disclosed by Roychoubhury et al. is the need to provide three different thermal sensors with one located at each of the three separate locations in the reactor. Another problem with the CPOX reactor control method, disclosed by Roychoubhury et al., is the failure to consider that modifications to the O:C ratio used to modify the CPOX reaction temperature can adversely affect the SOFC reaction temperature to an extent that an overall power conversion efficiency of the SOFC system may be compromised. Specifically, when the CPOX reaction temperature alone is used as a desirable O:C ratio indicator, the system power conversion can be compromised. Fuel contaminants such as tar ($C_{10}H_8$), and other long chain hydrocarbon molecules can participate in coke formation. Sulfur is a fuel contaminate that forms sulfides either in the fuel/air mixture or in the syngas. The sulfides, including carbon disulfide ($CS_2$), hydrogen sulfide ($H_2S$), sulfur dioxide ($SO_2$), or the like, can poison the catalyst layers in the CPOX reactor, and can also compete for oxygen sites at the solid oxide anode electrode layers (150) in the SOFC stack. Accordingly, it is desirable that the hydrocarbon fuel source have a low sulfur content, e.g. less than about 50 parts per million (PPM). Another problem that reduces CPOX conversion efficiency is catalyst layer burn through, which occurs when portions or the catalyst layers are permanently damaged by prolonged exposure to excessive reaction temperatures. For this reason, it is important to prevent a CPOX reaction temperature from exceeding burn through temperatures.

Despite the complexity of syngas generation, when using air as the oxidant, the syngas mainly comprises $N_2$, $H_2$ and CO, in varying major proportions, with a smaller minor proportion of $CO_2$. However, the weight percentage of each of the syngas components, including the weight percentage of the reactants $H_2$ and CO, varies according to variations in the O:C ratio, variations in the CPOX reaction temperature, variations in the hydrocarbon fuel type and variations of the homogeneity and contaminant content of the hydrocarbon fuel. Accordingly, the syngas may include other components in minor proportions such as, unreacted hydrocarbons, oxygen gas, sulfides, water, or the like, and the weight percentage of each of the major proportions of syngas components will vary with variations in the O:C ratio of the fuel air mixture and with variations in the CPOX reaction temperature.

Accordingly, it is an object of one aspect of the present disclosure is to maximize the conversion efficiency of the CPOX reaction by, maximizing a weight percentage of the anode gas reactants $H_2$ and CO, while also minimizing a weight percentage of unreacted hydrocarbons, e.g. methane ($CH_4$), and oxygen gas ($O_2$) in the syngas produced by the CPOX reaction.

8.12.8 First Thermal Sensor and Thermally Conductive Coupling

Turning now to FIGS. 9-12, 13A, 13B and 14, a plurality of different non-limiting exemplary embodiments of a first thermal sensor (8030), mounted to a thermally conductive element (9005, 10005, 11005, 12005, 13005) are illustrated therein. In each of the non-limiting exemplary embodiments the corresponding thermally conductive element is supported in mating contact with a longitudinal surface of the cylindrical catalyzing body (3030) and is formed from a material that has a coefficient of thermal conductivity of 50 W/m° K, or greater, and preferably with a coefficient of thermal conductivity of 100 W/m° K or greater. This compares with a thermal conductivity of the ceramic catalyzing body of about 2-7 W/m° K. Moreover, each of the thermally conductive elements is formed with a large enough contact area between the thermally conductive element and the catalyzing body to promote a high rate of conductive thermal energy transfer from the catalyzing body (3030) to the thermally conductive element across the contact area. When the temperature difference between the catalyzing body and the thermally conductive element is large, e.g. at initial startup, the rate of thermal conduction across the contact area is large. However, as the temperature difference approaches zero, the largest influences on the rate of thermal conduction between the catalyzing body and the thermally conductive element are, the coefficient of the thermal conductivity of the thermally conductive element, the contact area between the thermally conductive element and the catalyzing body and the thermal mass (see EQU. 5 above), of the thermally conductive element. However, for materials such as copper, aluminum and other material having a high coefficient of thermal conductively, which are mainly metals, differences in thermal mass are more simply represented as difference in material volume. Thus, aside from selecting a material having a high coefficient of thermal conductivity, the thermally conductive element of the present disclosure is formed with sufficient contact area, between the catalyzing body and the thermally conductive element, and with material volume to rapidly conduct thermal energy from the catalyzing body (3030) to the thermally conductive element. Preferably, the contact surface area is sized to promote a high enough rate of thermal conductivity between the catalyzing body and the thermally conductive element to cause a temperature of the contact area surface to be substantially matched by a temperature of the thermally conductive element.

Each thermally conductive element is supported in mating contact with either an external or and internal longitudinal surface of the cylindrical catalyzing body (3030). A contact area between the catalyzing body and the thermally conductive element is defined as a product of, a circumferential contact area and a longitudinal contact area, wherein the longitudinal contact area extends along the longitudinal axis of the catalyzing body and the circumferential contact area extends along a circumferential surface of the catalyzing body, which is orthogonal with the longitudinal axis. Other contact area shapes, and orientations are usable without deviating from the present disclosure.

When formed with sufficient thermal mass and contact area, the thermally conductive element is configured to rapidly conduct thermal energy across the contact area until a temperature of the thermally conductive element is substantially equal to an average or bulk surface temperature of the catalyzing body over the contact surface area. Moreover, based on the high rate of thermal conduction provided across the contact surface area changes in the bulk or average temperature of the contact surface area of the catalyzing body are rapidly followed by similar changes in temperature of the thermally conductive element. Accordingly, a temperature sensed by the first thermal sensor (8030) provides a reliable and repeatable indicator of the average or bulk surface temperature of the catalyzing body over the contact area.

The first thermal sensor (8030) generates a first temperature signal (8031) that is sampled by the electronic controller at a sampling frequency that generates a continuous stream of first temperature signal values each corresponding with an instantaneous temperature of as surface of the thermally conductive element that he first thermal sensor is attached to. Because the temperature sensed by the first thermal sensor (8030) provides a reliable and repeatable indicator of the average or bulk surface temperature of the catalyzing body over the contact area, changes in the first temperature signal (8031) correspond with proportional changes the CPOX reaction temperature e.g. when the O:C ratio of the incoming fuel is varied. Viewed another way, changes in the first temperature signal (8031) are proportional to changes in the heat flux density (W/m$^2$) being thermally conducted across the contact area.

As noted above, a temperature of the CPOX reaction likely varies along the longitudinal length of the cylindrical catalyzing body. According to conventional reactor control methods disclosed by Roychoubhury et al., three temperature sensors are disposed at three separate longitudinal positions to sense three different temperatures along the longitudinal length of the catalyzing body. An algorithm determines a maximum and a minimum temperature corresponding with the temperature output by the three sensors and, based on the temperature distribution, the O:C ratio of the incoming fuel air mixture is varied in a manner that minimizes the difference between the maximum and minimum temperatures sensed by the three temperature sensors. However, the present disclosure uses only one temperature sensor coupled with a thermally conductive element supported in contact with the catalyzing body over a contact area that extends along a portion of the longitudinal dimension of the catalyzing body. By sensing only, the first temperature signal (8031), the present disclosure reduces complexity and improves reliability by reducing the number of sensors and eliminating the algorithm for computing the temperature spread. The thermally conductive element of any of the embodiments shown in FIGS. 9-12 and 13A and 13B is formed from any one of copper, aluminum, nickel, brass, beryllium, iridium, magnesium, molybdenum, tungsten and zinc and or alloys thereof. Additionally, for materials that are susceptible to oxidation damage at operating temperatures above about 400° C., external surfaces of the thermally conductive element are coated with an oxidation resistant material, e.g. nickel plating, or the like.

Figure 9:
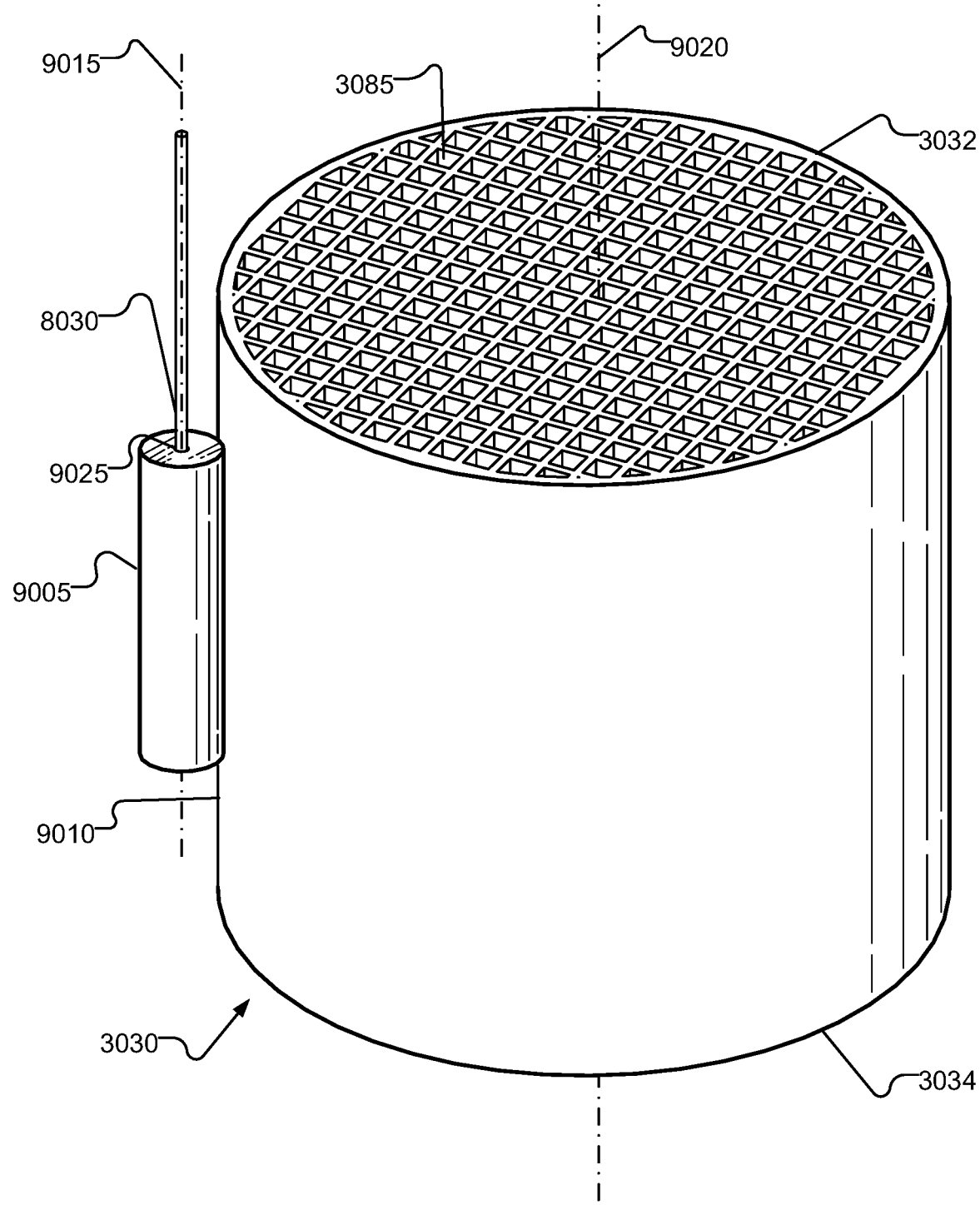
FIG. 9 depicts a first exemplary, non-limiting thermally conductive element embodiment, in thermally conductive contact with a catalyzing body according to the present disclosure.

Referring to FIG. 9 in a first exemplary, non-limiting embodiment, a first thermally conductive element comprises a prismatic rod (9005) disposed in mating contact with an external surface (9010) of the catalyzing body (3030). A longitudinal axis (9015) of the prismatic rod (9005) is oriented substantially parallel with a longitudinal axis (9020) of the catalyzing body (3030). The catalyzing body (3030) is a cylindrical element comprising a ceramic substrate having a diameter of 25.4 mm and a longitudinal length of 25.4 mm. The catalyzing body (3030), when installed into the cylindrical catalyzing cavity (3035), has an input end at the interface (3032) and an output end (3034), that delivers syngas (2027) into the fuel inlet manifold (3055), shown in FIG. 7.

The prismatic rod (9005), of the first thermally conductive element, has a diameter of 3.2 mm, which is about one eighth (⅛) the diameter of the catalyzing body (3030). The prismatic rod (9005) has a longitudinal length of, 6.3 to 12.7 mm, which is about one quarter (¼) to one half (½) of the longitudinal length of the catalyzing body (3030). The prismatic rod (9005) may be longitudinally positioned to contact the external surface (9010) of the catalyzing body (3030) at any longitudinal position between the input or interface end (3032) and the output end (3034). An optimal longitudinal contact position of the prismatic rod (9005) may be determined by experimentation, e.g. during system calibration, or may be determined by support structure, or the like, provided to support the prismatic rod (9005) in mating contact with the contact surface. Other prismatic rods (9005) having different longitudinal dimensions and outside diameter dimensions are usable without deviating from the present disclosure.

The first thermal sensor (8030) is attached to or otherwise supported by the prismatic rod (9005) to provide a thermally conductive coupling between at least one surface of the prismatic rod (9005) and the first thermal sensor (8030). In the example embodiment of FIG. 9, the prismatic rod (9005) includes a through hole or a blind hole (9025) that extends along the longitudinal axis (9015) of the prismatic rod. The first thermal sensor (8030) is installed into the through or blind hole (9025) and held in place. Alternately, the first thermal sensor (8030) is thermally conductively coupled to any external or internal surface of the prismatic rod (9005) by brazing, by a thermally conductive bonding material, by one or more mechanical fasteners or clamps, or the like.

The prismatic rod (9005) is attached to or otherwise supported in mating contact with the external surface (9010) of the catalyzing body (3030) by a radially inward pressure force applied by the thermally insulating element (3080) disposed inside the catalyzing cavity (3035). As best shown in FIG. 3, the thermally insulating element (3080) is formed as an annular ring disposed inside the catalyzing cavity (3035) between the annular enclosure wall (3060) and the cylindrical catalyzing body (3030). By installing the prismatic rod (9005) and first thermal sensor (8030) into the catalyzing cavity (3035) between the thermally insulating element (3080) and the outside surface of the catalyzing body (3030), the thermally insulating element (3080) provides sufficient radially directed compressive force to support the prismatic rode (9005) in mating contact with the cylindrical catalyzing body (3030). The compressive force is sufficient to thermally conductively couple the prismatic rod with the cylindrical catalyzing body (3030) over the entire contact area. Alternately, the prismatic rod (9005) is coupled to the outside surface of the catalyzing body (3030) by brazing, by a thermally conductive bonding material, by one or more fasteners or clamps, or the like. Preferably, the configuration of the prismatic rod (9005), the configurations of the first thermal sensor (8030), the longitudinal position, between the interface (3032) and the output end (3034), and the contact method used to secure the prismatic rod (9005) against the outside surface of the catalyzing body, provide a first temperature signal output from the first thermal sensor (8030) that is repeatable and sufficiently responsive to temperature changes of the bulk or average temperature of the contact area that are primarily related to changes in the oxidant flow rate being delivered into the mixing chamber (8015).

Figure 10:
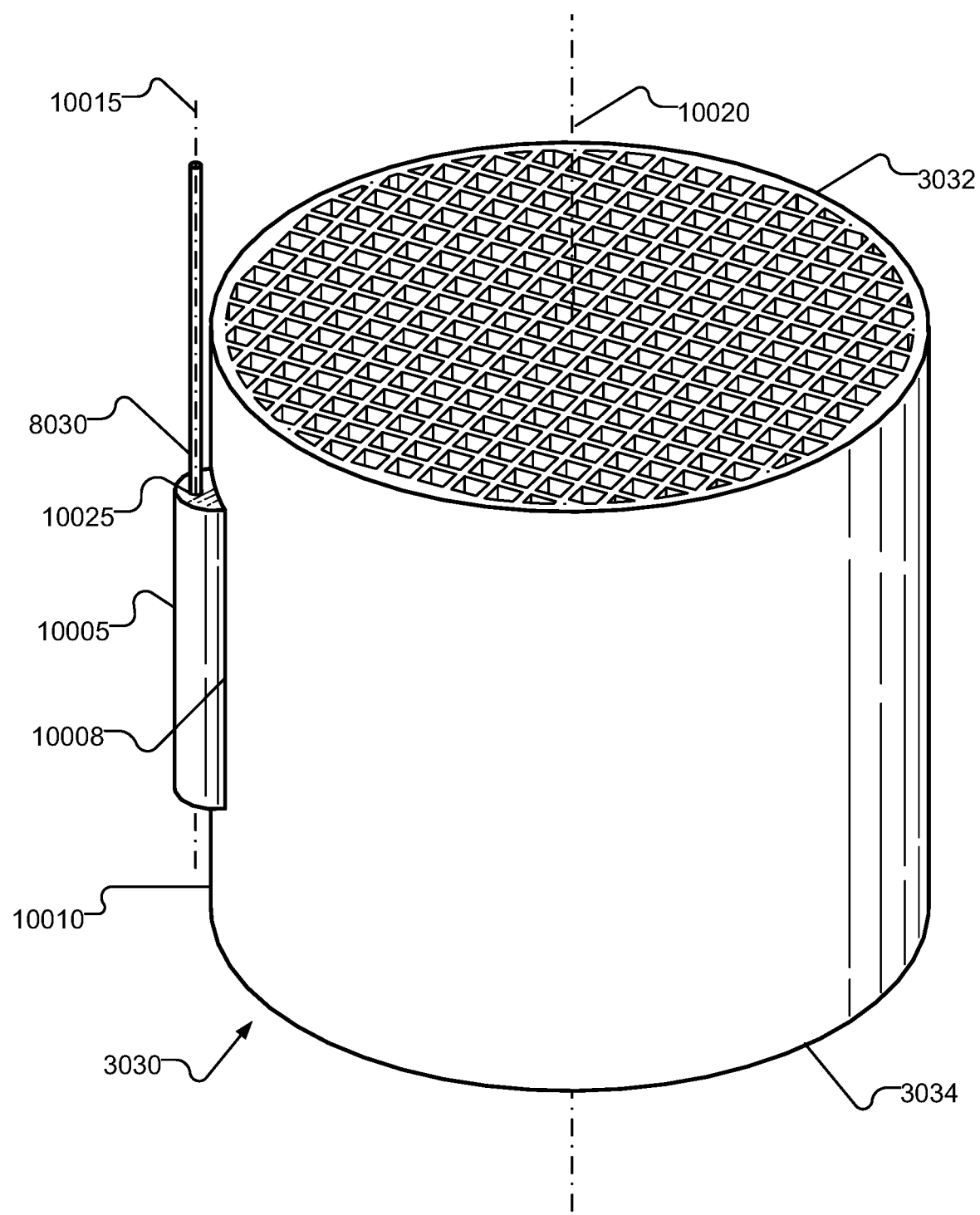
FIG. 10 depicts a second exemplary, non-limiting thermally conductive element embodiment, in thermally conductive contact with a catalyzing body according to the present disclosure.

Referring now to FIG. 10, a second thermally conductive element embodiment (10010) comprises a cylindrical segment (10005). The cylindrical segment (10005) includes a contact surface area (10008) that is formed with a radius of curvature that is matched with a radius of curvature of the outside circumferential surface of the cylindrical catalyzing body (3030). The cylindrical segment (10005) includes a longitudinal axis (10015) that is oriented parallel with the longitudinal axis (10020) of the cylindrical catalyzing body (3030). The cylindrical segment (10005) is formed from a prismatic rod that has a diameter of about 6.4 mm, which is about one quarter (¼) the diameter of the cylindrical catalyzing body (3030). The cylindrical segment (10005) has a longitudinal length of, 6.3 to 12.7 mm, which is about one quarter (¼) to one half (½) of the longitudinal length dimension of the catalyzing body (3030). The cylindrical segment (10005) may be longitudinally positioned to contact the external surface (10010) of the catalyzing body (3030) at any longitudinal position between the input or interface end (3032) and the output end (3034). Other cylindrical segments (10005) having other rod diameter and longitudinal length dimensions are usable without deviating from the present disclosure.

The first thermal sensor (8030) is attached to or otherwise supported by the cylindrical segment (10005) to provide a first temperature signal (8031) corresponding with a temperature of the cylindrical segments (10005) proximate to a surface of contact therewith. In the example embodiment of FIG. 10, the cylindrical segment (10005) includes a through hole or a blind hole (10025) extending along the longitudinal axis (10015) thereof and the first thermal sensor (8030) is installed into the through or blind hole (10025). Alternately, the first thermal sensor (8030) is thermally conductively coupled to any external or inside surface of the cylindrical segment (10005) by brazing, by a thermally conductive bonding material, by one or more fasteners of clamps, or the like.

The cylindrical segment (10005) is attached to or otherwise supported in mating contact with the external surface (10010) of the catalyzing body (3030) by a radially inward pressure force applied by the thermally insulating element (3080) disposed inside the catalyzing cavity (3035). As best shown in FIG. 3, the thermally insulating element (3080) is formed as an annular ring disposed inside the catalyzing cavity (3035) between the annular enclosure wall (3060) and the cylindrical catalyzing body (3030). By installing the cylindrical segment (10005) and first thermal sensor (8030) into the catalyzing cavity (3035), between the thermally insulating element (3080) and the outside surface of the catalyzing body (3030), the thermally insulating element (3080) provides sufficient radially directed compressive force to support the cylindrical segment (10005) in mating contact with the cylindrical catalyzing body (3030). The compressive force is sufficient to thermally conductively couple the cylindrical segment (10005) with the cylindrical catalyzing body (3030) over the entire surface contact area (10008). Alternately, the cylindrical segment (10005) is coupled to the outside surface of the catalyzing body (3030) by brazing, by a thermally conductive bonding material, by one or more fasteners or clamps, or the like. Preferably, the configuration of the cylindrical segment (10005), the configurations of the first thermal sensor (8030), the longitudinal position, between the interface (3032) and the output end (3034), and the contact method used to secure the cylindrical segment (10005) against the outside surface of the catalyzing body, provide a first temperature signal output from the first thermal sensor (8030) that is repeatable and sufficiently responsive to temperature changes of the bulk or average temperature of the contact area that are primarily related to changes in the oxidant flow rate being delivered into the mixing chamber (8015).

Figure 11:
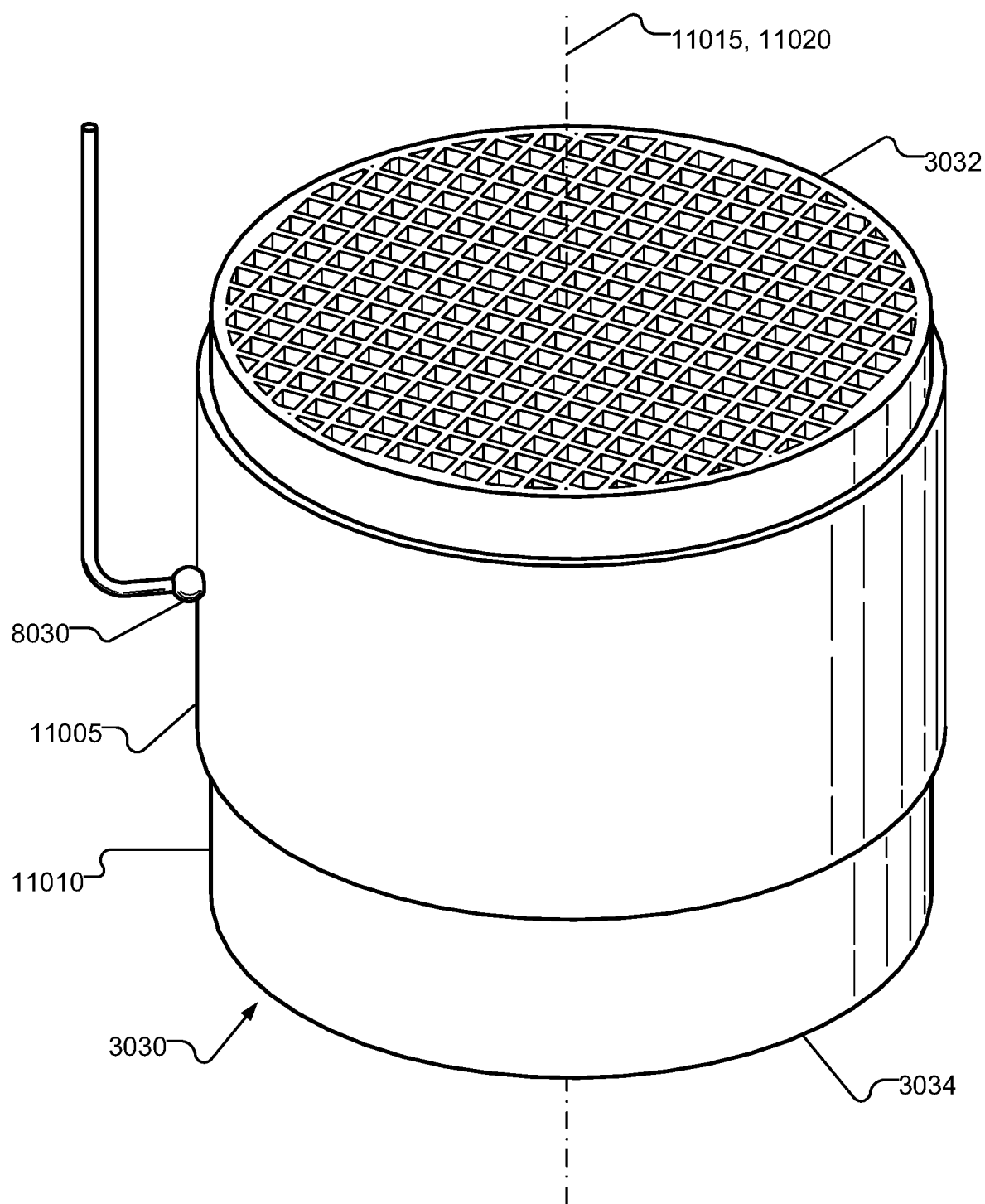
FIG. 11 depicts a third exemplary, non-limiting thermally conductive element embodiment, in thermally conductive contact with a catalyzing body according to the present disclosure.

Referring now to FIG. 11, in a third exemplary, non-limiting embodiment, a third thermally conductive element comprises a hollow cylinder (11005) having an inside diameter that is sized to provide mating contact with the outside diameter of the catalyzing body (3030) and having an outside diameter sized to provide a desired thickness, or material volume, of the annual wall formed by the hollow cylinder (11005). The hollow cylinder (11005) has a longitudinal axis (11015) that is oriented substantially coaxial with the longitudinal axis (11020) of the catalyzing body (3030). The contact area between the hollow cylinder (11005) and the catalyzing body (3030) extends over the surface of the inside diameter of the hollow cylinder (11005).

The hollow cylinder (11005), is formed with an annular wall thickness of about 1.6 mm and a longitudinal length 6.3 to 12.7 mm, that is about one quarter (¼) to one half (½) of the longitudinal length of the catalyzing body (3030). The hollow cylinder (11005) may be longitudinally positioned to contact the external surface (10010) of the catalyzing body (3030) at any longitudinal position between the input of interface end (3032) and the output end (3034). The hollow cylinder (11005) is held in mating contact with the external surface (11010) of the catalyzing body (3030) by soldering, by a thermally conductive bonding material, by crimping, by fasteners or clamps, by an interference fit, or the like. Other hollow cylinder (11005) having a different longitudinal length or material thickness are usable without deviating from the present disclosure.

The first thermal sensor (8030) is attached to or otherwise supported in mating contact with an external surface of the hollow cylinder (11005) to provide a thermally conductive coupling between an external surface of the hollow cylinder (11005) and the first thermal sensor (8030). In the example embodiment of FIG. 11, the first thermal sensor (8030) is thermally conductively coupled or otherwise supported in mating contact with the external surface the hollow cylinder (11005) by one of an inwardly directed radial pressure force applied by the thermally insulating element (3080) disposed inside the catalyzing cavity (3035), as shown in FIG. 3 and described above, or by brazing, by a thermally conductive bonding material, by one or more fasteners or clamps, or the like.

Figure 12:
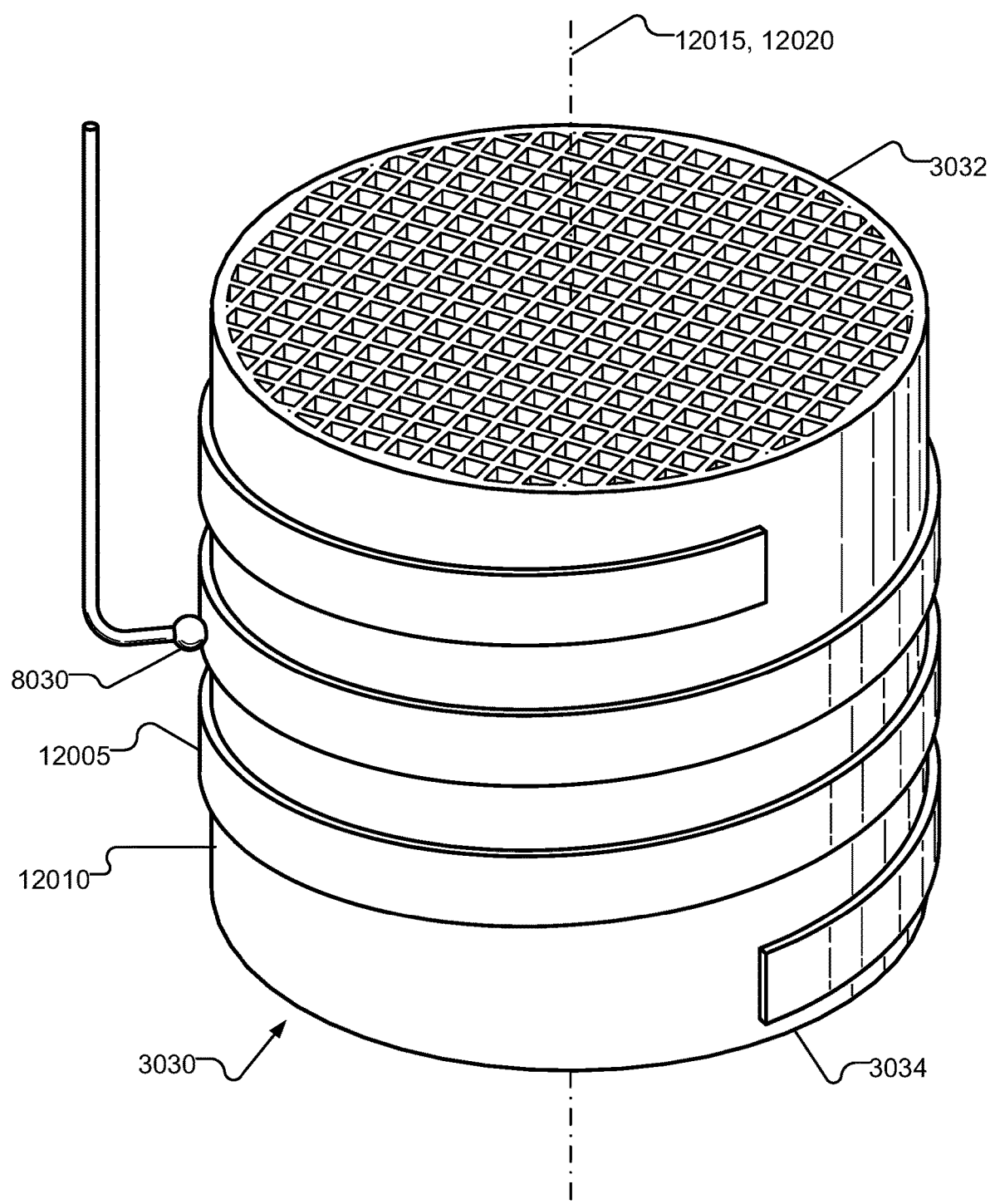
FIG. 12 depicts a fourth exemplary, non-limiting thermally conductive element embodiment, in thermally conductive contact with a catalyzing body according to the present disclosure.

Referring now to FIG. 12, a fourth exemplary, non-limiting conductive element embodiment comprises a spiral portion (12005) of a hollow cylinder. The spiral portion (12005) has an inner radius that is sized to provide mating contact with the external surface (12010) of the catalyzing body (3030), and an outer radius sized to provide a desired thickness of the spiral portion of (12005). The spiral portion has a longitudinal axis (12015) that is oriented substantially coaxial with the longitudinal axis (12020) of the catalyzing body (3030).

The spiral portion (12005) is formed with an annular wall thickness of about 1.6 mm and a longitudinal of length 12.7 to 25.4 mm, that is about one half (½) to the full longitudinal length of the catalyzing body (3030). The spiral portion (12005) may be longitudinally positioned to contact the external surface (11010) of the catalyzing body (3030) at any longitudinal position between the interface end (3032) and the output end (3034). Other spiral portions (12005) having different longitudinal length and thickness dimensions are usable without deviating from the present disclosure.

The first thermal sensor (8030) is attached to or otherwise supported in mating contact with an external surface of the spiral portion (12005) to provide a thermally conductive coupling between an external surface of the spiral portion and the first thermal sensor (8030). In the example embodiment of FIG. 12, the first thermal sensor (8030) is thermally conductively coupled or otherwise supported in mating contact with the external surface the spiral portion (12005) by one of an inwardly directed radial pressure force applied by the thermally insulating element (3080), disposed inside the catalyzing cavity (3035), as shown in FIG. 3 and described above, or by brazing, thermally conductive bonding material, by one or more fasteners or clamps, or the like.

Figure 13A:
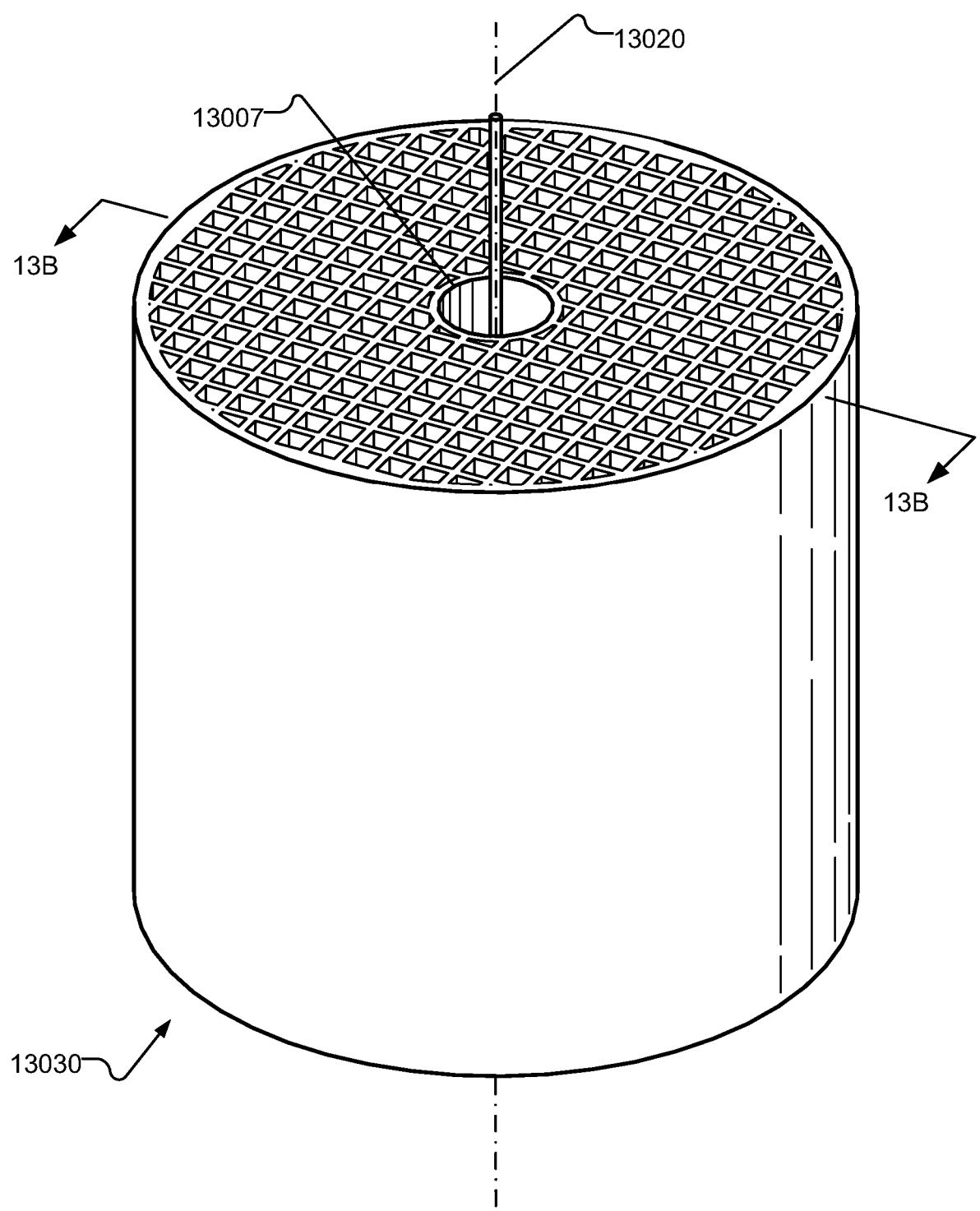
FIG. 13A depicts an isometric top view of a fifth exemplary, non-limiting embodiment depicting a cylindrical catalyzing body formed with a central longitudinal passage provided to receive a thermally conductive element therein according to the present disclosure.
Figure 13B:
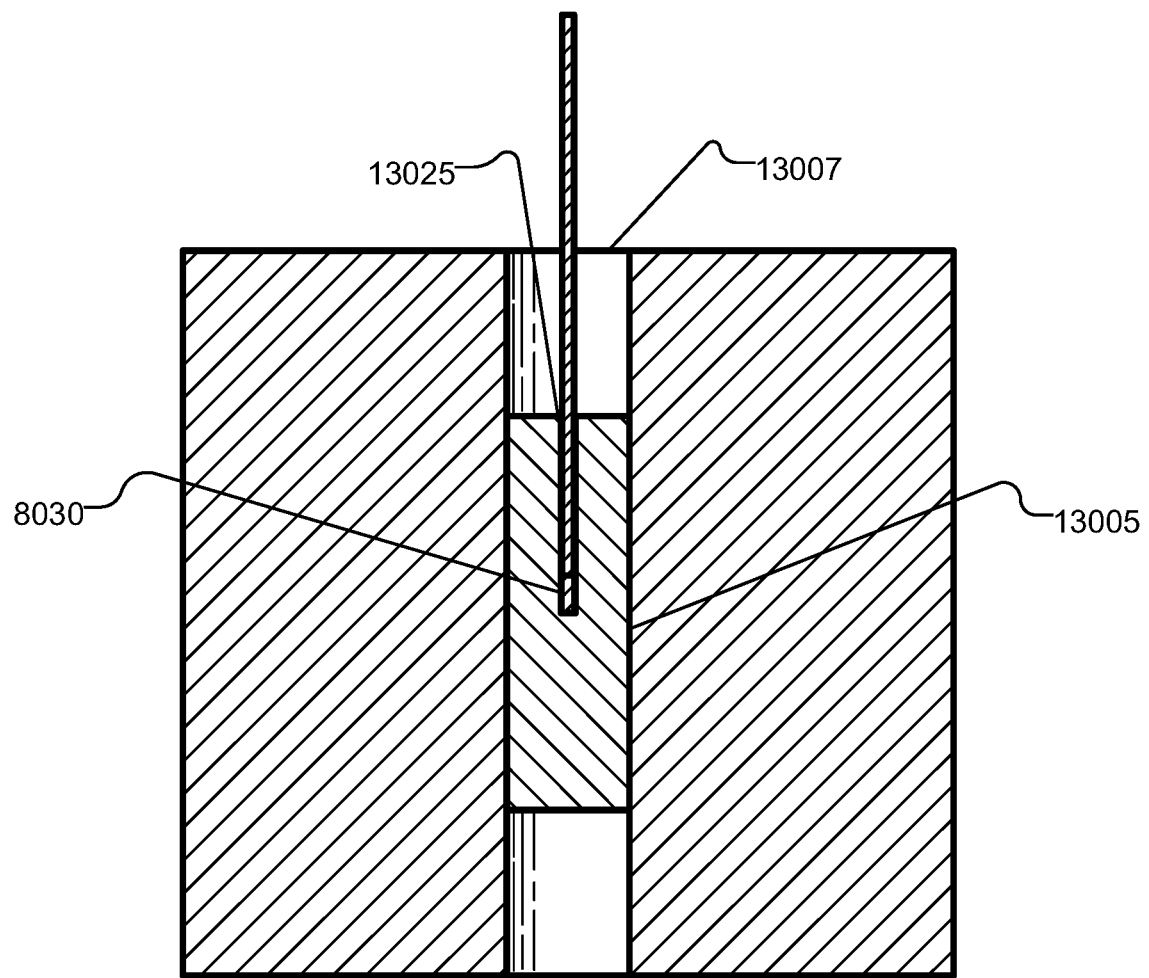
FIG. 13B depicts a section view taken through a longitudinal axis of the cylindrical catalyzing body formed with a central longitudinal passage and depicting a solid cylindrical thermally conductive element therein according to the present disclosure.

Referring now to FIGS. 13A and 13B, a cylindrical catalyzing body (13030) includes a plurality of catalyst fuel passages (3085) each providing an individual conduit that extends longitudinally through the cylindrical catalyzing body (13030). A central cavity (13007) is formed by a through hole, or a blind hole, that extends completely through or partly through the cylindrical catalyzing body (13030) along a longitudinal axis (13020) thereof. As shown in the section view of FIG. 13B, a fifth exemplary, non-limiting conductive element embodiment comprises a solid cylinder (13005) disposed inside the central cavity (13007). A solid cylinder (13005) is supported inside the central cavity (13007) in mating contact with the inside diameter thereof. The solid cylinder (13005) has a longitudinal axis that extends substantially coaxial with the longitudinal axis (13020) of the catalyzing body (13030).

The solid cylinder (13005) is formed with an outside diameter sized equal to, slightly greater than, or slightly less than the inside diameter of the central cavity (13007). A non-limiting exemplary diameter of the solid cylinder (13005) is 1.5 to 6.4 mm in diameter with a longitudinal length of 6.3 to 12.7 mm, which is about one quarter (¼) to one half (½) of the longitudinal length of the catalyzing body (13030). The solid cylinder (13005) may be longitudinally positioned to contact the central cavity (13007) at any longitudinal position between the input or interface end (3032) and the output end (3034). Other solid cylinder (13005) embodiments having different longitudinal length and outside cylinder diameter dimensions are usable without deviating from the present disclosure.

The first thermal sensor (8030) is attached to or otherwise supported by the solid cylinder (13005) to provide a thermally conductive coupling between at least one surface of the solid cylinder (13005) and the first thermal sensor (8030). In the example embodiment of FIG. 13B, the solid cylinder (13005) includes a through hole or a blind hole (13025) that extends along or parallel with the longitudinal axis (13020) of the solid cylinder (13005). The first thermal sensor (8030) is installed into the through or blind hole (13025) and held in place. Alternately, the first thermal sensor (8030) is thermally conductively coupled to any external or internal surface of the solid cylinder (13005) by brazing, by a thermally conductive bonding material, by one or more mechanical fasteners or clamps, or the like.

Figure 14:
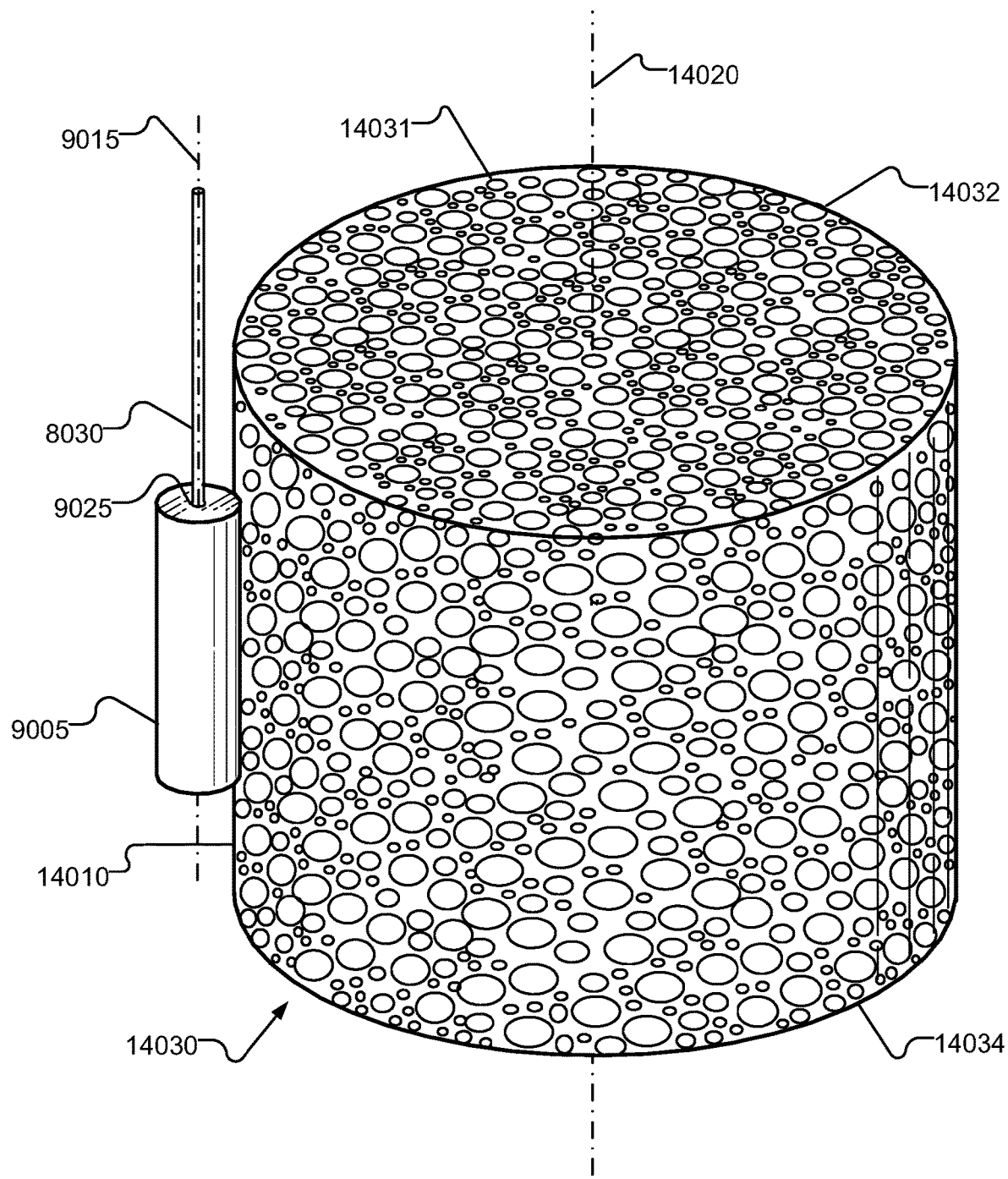
FIG. 14 depicts an isometric top view of a sixth exemplary, non-limiting thermally conductive element embodiment, in thermally conductive contact with a catalyzing body formed as a solid non-porous ceramic foam material formed with interconnecting open cells distributed through the solid ceramic foam structure according to the present disclosure.

Referring to FIG. 14 in a sixth exemplary, non-limiting embodiment comprises a cylindrical catalyzing body (14030) formed as an open cell solid foam structure comprising a solid, non-porous, ceramic foam material formed with a plurality of interconnecting open cells distributed through the solid ceramic foam structure. The open cells extend between the input or interface end (3032) and the output end (3034); however, some open cells can extend from the input or interface end (3032) to sidewalls of the cylindrical catalyzing body (14030). Each of the plurality of open cells (14031) includes inside surfaces thereof that are coated with a catalyst layer (3090). The open cell solid foam structure is formed as or is shaped as the cylindrical catalyzing body (14030) having a circumferential diameter of 25.4 mm and a longitudinal length of 25.4 mm. When installed into the cylindrical catalyzing cavity (3035), an input end (14032) of the cylindrical catalyzing body (14030) is inserted to contact the reactor shield base wall (3015) at the interface (3032), and fuel air mixture (2025, 3025) exiting from the reactor shield base wall (3015) enters the input end of the solid foam structure through the open cells (14031) thereof and passes through the open cells to the output end (14034) or through open cell openings that pass through the circumferential external surface (14010). While passing through the open cells, the fuel air mixture (2025, 3025) contacts the catalyst layer (3090) to initiate the CPOX reaction. After exiting from the open cells, the reformed fuel or syngas (2027) passes from the catalyzing cavity to the fuel inlet manifold (3055).

A prismatic rod (9005) is usable as a thermally conductive element. As described above the prismatic rod (9005) has a diameter of 3.2 mm that is about one eighth (⅛) the diameter of the cylindrical catalyzing body (14030), and a longitudinal length of, 6.3 to 12.7 mm, that is about one quarter (¼) to one half (½) of the longitudinal length of the cylindrical catalyzing body (14030). The prismatic rod (9005) may be longitudinally positioned to contact the circumferential external surface (14010) at any longitudinal position between the interface end (13032) and the output end (13034). Similarly, any of the above described thermally conductive elements (10005, 11005, 12005, 13005) is usable in combination with the open cell solid foam structure of the catalyzing body (14030).

The first thermal sensor (8030) is attached to or otherwise supported by the prismatic rod (9005) to provide a thermally conductive coupling between at least one surface of the prismatic rod (9005) and the first thermal sensor (8030). In the example embodiment of FIG. 14, the prismatic rod (9005) includes a through hole or a blind hole (9025) extending along the longitudinal axis (9015) thereof and the first thermal sensor (8030) is installed into the through or blind hole (9025). Alternately, the first thermal sensor (8030) is thermally conductively coupled to any external or inside surface of the prismatic rod (9005) by brazing, by a thermally conductive bonding material, by one or more fasteners of clamps, or the like.

The prismatic rod (9005) is attached to or otherwise supported in mating contact with the circumferential external surface (14010) of the cylindrical catalyzing body (14030) by one of a radially applied inward pressure force applied by the thermally insulating element (3080) disposed inside the catalyzing cavity (3035), as shown in FIG. 3, and described above, or by brazing, by a thermally conductive bonding material, by one or more fasteners or clamps, or the like.

8.12.9 Second Thermal Sensor:

Referring now to FIG. 8, a second thermal sensor (8040) is thermally conductively coupled to an outside surface of one of the hot zone enclosure walls (115), e.g. to an outside surface of the longitudinal cylindrical sidewall (2015), shown in FIG. 2. Alternately, the second thermal sensor (8040) can be positioned on the inside or on an outside surface of any one of the hot zone enclosure walls that form the first thermally conductive path. The second thermal sensor (8040) generates a second temperature signal that is sampled by the electronic controller at a sampling frequency that generates a continuous stream of second temperature signal values each corresponding with an instantaneous temperature of a surface of one of the hot zone enclosure walls (115). However, since the hot zone enclosure walls (115) are thermally conductively coupled with the disk shaped support walls (2082, 2084) that support opposing ends of each tubular fuel cell (2080), of the SOFC stack, variations in the temperature represented by changes in the second temperature signal correspond with or are proportional to variations of the SOFC reaction temperature, e.g. when the O:C ratio of the incoming fuel is varied. Alternately, in other nonlimiting embodiments, the second thermal sensor (8040) is thermally conductively coupled to any surface of the intermediate enclosure (2510) that forms the second thermally conductive path or to any one of the outer enclosure walls (2514, 2516, 2518) that form the third thermally conductive path without deviating from the present disclosure, as long as variations in the temperature represented by changes in the second temperature signal correspond with or are proportional to variations of the SOFC reaction temperature, e.g. when the O:C ratio of the incoming fuel is varied.

8.12.10 Third Thermal Sensor:

Referring now to FIG. 3, a third thermal sensor (3135) is thermally conductively coupled to a surface of the heat dissipating flange 3100, shown in FIG. 3. Alternately, the third thermal sensor (3135) can be positioned on any surface of the fuel reactor body (3040) that extends outside the outer enclosure walls (2514, 2516, 2518) that form the third thermally conductive path. The third thermal sensor (3135) generates a third temperature signal that is sampled by the electronic controller at a sampling frequency that generates a continuous stream of third temperature signal values each corresponding to an instantaneous temperature corresponding a surface of the third thermally conductive path associated with surfaces of the fuel reactor body (3040). However, since the third thermally conductive path also extends to elements that do not extend outside the outer enclosure walls, such as the annular perimeter wall (3010) and the reactor shield base wall (3015), changes in the third temperature signal ideally correspond with or are proportional to changes in temperature of the fuel reactor body, e.g. when the temperatures inside the fuel chamber approach the fuel auto ignition temperature which range from 295 to 580° C., depending on the hydrocarbon fuel type.

8.12.11 Alternate Operating Mode:

8.12.11.1 CPOX Reaction Temperature

Referring now to FIG. 8, in a non-limiting exemplary operating mode, a first temperature signal (8031) is received, by the electronic controller (190), from the first thermal sensor (8030). The first temperature signal (8030) may comprise an analog or digital signal corresponding with a voltage or current amplitude, a normalized voltage or current amplitude, or the like, wherein each different voltage or current amplitude value of the first temperature signal (8031) corresponds with an actual instantaneous temperature or a relative instantaneous temperature being sensed by the first thermal sensor (8030). The electronic controller (190) stores a plurality of first temperature set point values. The plurality of first temperature set point values may comprise a different first temperature set point value for each hydrocarbon fuel type that will be used by the SOFC system, e.g. a first temperature set point value for propane ($C_3H_8$) and a different first temperature set point for natural gas or methane ($CH_4$), or the like. The plurality of first temperature set point values may comprise a different first temperature set point value for each operating mode of the SOFC system, e.g. a first temperature set point value associated with a start-up mode when the fuel is propane, and a different first temperature set point value associated with a steady state operating mode when the fuel is propane, or the like. The plurality of first temperature set point values may also comprise a first temperature set point value associated with a maximum safe operating temperature, e.g. when the fuel is methane, or the like. Additionally, each first temperature set point value may comprise a range of values e.g. defined by a maximum and a minimum first temperature set point value, defined by a median value with a plus or minus range, or the like.

Based on a calibration process, described below, each first temperature set point value or range of first set point values corresponds with a desired syngas composition, e.g. when the syngas composition is free of, or substantially free of, unreacted hydrocarbon fuel and or hydrogen and carbon based byproducts of the CPOX reaction. As an example, if the hydrocarbon fuel being used is methane, a desired first temperature setpoint value produces a syngas composition that is substantially free of methane ($CH_4$) and other byproducts of the CPOX reaction, e.g. $C_2H_x$, tar ($C_{10}H_8$), and other long chain hydrocarbon molecules, especially ones that can participate in coke formation, sulfides, e.g. carbon disulfide ($CS_2$), hydrogen sulfide ($H_2S$), sulfur dioxide ($SO_2$), or the like, that can compete for oxygen sites at the solid oxide anode electrode layers (150) in the SOFC stack and or damage the solid oxide anode electrode layers (150). In another example, if the hydrocarbon fuel being used is propane, ($C_3H_8$), a desired first temperature setpoint value produces a syngas composition that is substantially free of propane, methane, and the other byproducts of the CPOX reaction listed above.

Figures 15A, 15B:
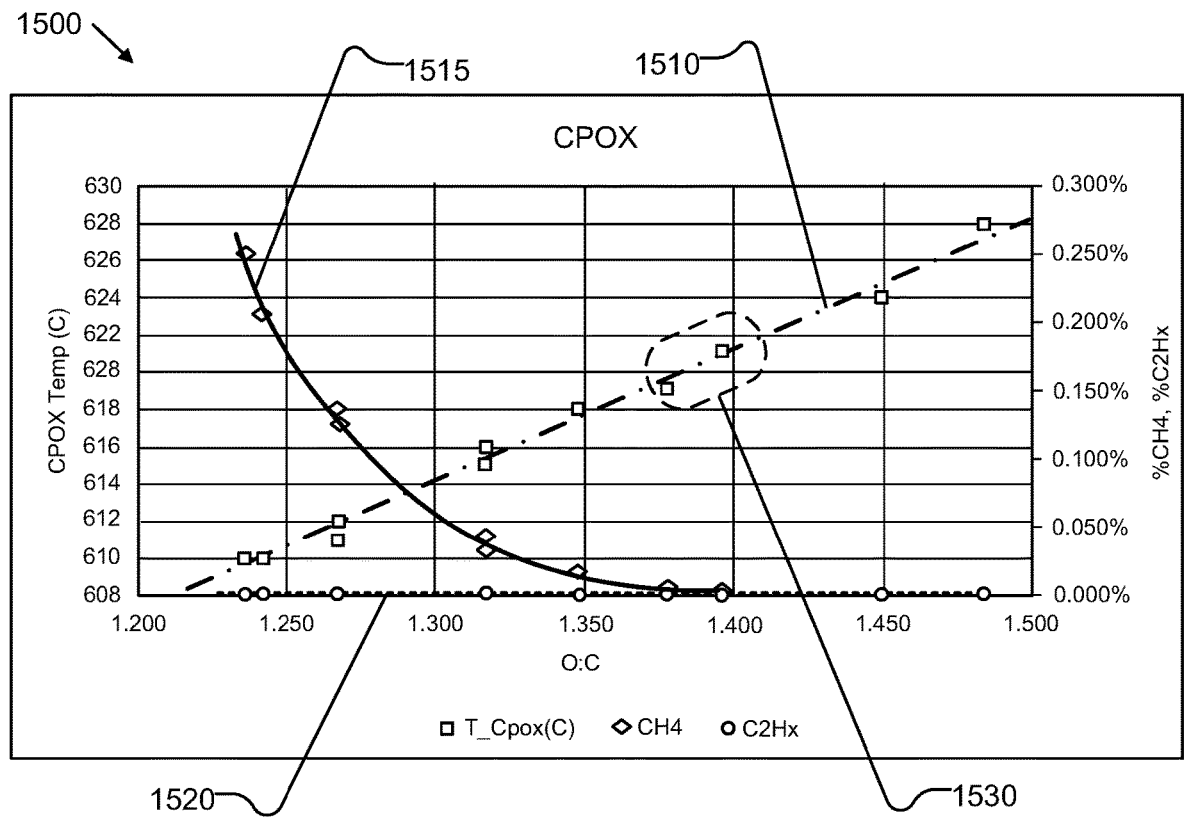
FIG. 15A depicts a graphic representation of O:C ratio vs T_CPOX values, % $CH_4$ values and % $C_2Hx$ values.
FIG. 15B depicts a data table listing the O:C ratio vs T_CPOX values, % $CH_4$ values and % $C_2Hx$ values plotted in FIG. 15A.

FIG. 15A depicts a graphical representation (1500) of calibration data that is listed in the Table (1505) of FIG. 15B. The data includes O:C or Oxygen to Carbon ratio of the incoming hydrocarbon fuel air mixture (2025, 3025), T_CPOX, or the first temperature in degrees Centigrade, % $CH_4$ and % $C_2H_x$ based on weight percentage. Referring to FIG. 15A, the O:C ratio is shown along horizontal axis over a range of 1.2 to 1.5 and the O:C ratio is plotted vs T_CPOX(C) or first temperature, shown on a left vertical axis of FIG. 15A over a range of 608 to 630 degrees Centigrade. The data further includes weight percentage of undesirable hydrocarbon components such as methane ($CH_4$) and ($C_2H_x$), shown or a right vertical axis of FIG. 15A over a range of 0.0 to 0.3 percent. Thus the right axis provides a measure of various undesirable byproducts of the CPOX reaction, e.g. $C_2H_x$, tar ($C_{10}H_8$), and other long chain hydrocarbon molecules, especially ones that can participate in coke formation, sulfides, e.g. carbon disulfide ($CS_2$), hydrogen sulfide ($H_2S$), sulfur dioxide ($SO_2$), or the like, that can compete for oxygen sites at the solid oxide anode electrode layers (150) in the SOFC stack and or damage the solid oxide anode electrode layers (150).

As best viewed in FIG. 15A, a plot (1510) of O:C ratio vs T_CPOX (° C.) is linear. The plot (1510) shows that a temperature T_CPOX (° C.), which corresponds with the instantaneous temperature sensed by the first thermal sensor (8030), increases linearly with increasing O:C ratio. In other words, the temperature T_CPOX (° C.), increases as air is added to the hydrocarbon fuel air mixture (2025, 3025).

Also, in FIG. 15A, a plot (1515) of O:C ratio vs % $CH_4$ is non-linear. The plot (1515) shows that a percentage of methane that remains in the syngas composition decreases non-linearly with increased O:C ratio. Thus, the percentage of unreacted methane decreases as the O:C ratio increases and as T_CPOX increases in response to the increased O:C ratio until the O:C ratio reaches 1.4 or above, when the percentage of unreacted methane is substantially zero. As further demonstrated in FIG. 15A, the O:C ratio of 1.4 corresponds with the T_CPOX temperature of 628° C. Also, in FIG. 15A, a plot (1520) of O:C ratio vs % $C_2H_x$ is not clearly linear of non-linear. The plot (1520) shows that a percentage of % $C_2H_x$ that remains in the syngas composition is undetectable.

Thus, FIG. 15A clearly demonstrates that by detecting the temperature T_CPOX, corresponding with the first temperature signal (8031), the O:C ratio and the syngas composition can be characterized, based on the T_CPOX value alone, at least to the extent that a T_CPOX temperature set point value or range of set point values (1530), can be selected to correspond with eliminating undesirable hydrocarbon components such as methane ($CH_4$) ($C_2H_x$), and other long chain hydrocarbon molecules from the syngas being generated. More specifically, a CPOX reaction being carried while the T_CPOX temperature is maintained at a set point value within a range of set point values (1530) shown in FIG. 15A will be free of undesirable hydrocarbon components. Moreover, the T_CPOX temperature can be controlled simply by varying the oxidant flow rate alone. Thus, based on the plots shown in FIG. 15A, and the data listed in FIG. 15B, a first temperature set point range (1530), corresponds with a set point temperature T_CPOX (C) of between about 618 and 623 degrees C. which corresponds with an O:C ratio range of between about 1.38 and 1.42. During steady state operation, the electronic controller (190) samples the first temperature signal (8031) at the sampling frequency to generate a continuous stream of first temperature signal values (8031), each corresponding to an instantaneous temperature of the thermally conductive element supported in mating contact with the catalyzing body, shown in any one of FIGS. 9-14 above. The electronic controller compares each first temperature signal value (8031) with an appropriate set point temperature value, or appropriate range of set point values. The set point values are stored by the electronic controller and different set point values, or set point value ranges, may correspond with different hydrocarbon fuel types, with different SOFC system configurations, with different thermally conductive element types, and other operating parameters, e.g. operating mode, oxidant type, fuel air mixture temperature, DC power output of the SOFC system, or the like. When a sampled first temperature signal value (8031) is equal to the appropriate first temperature set point value or within the range of appropriate first temperature set point values, no action is taken by the electronic controller. When the sampled first temperature signal value is not equal to the appropriate first temperature set point value or not within the range of appropriate first temperature set point values, the electronic controller makes a logical conclusion to either increase or decrease the oxidant flow rate being delivered into the mixing chamber (8015) and then transmits one or more command and control signals to the oxidant flow modulator (8025) wherein the command and control signals correspond with either increasing or decreasing the oxidant flow rate as demanded by the logical conclusion.

In one non-limiting exemplary operating mode, when the sampled first temperature signal value (8031) is less than a minimum acceptable first signal value, the electronic controller (190) commands the oxidant flow modulator (8025) to increase the mass or volume flow rate of oxidant entering the mixing chamber (8015) to thereby increase the O:C ratio, which results in an increase of the CPOX reaction temperature and a corresponding increase in the temperature T_CPOX (° C.) and corresponding first temperature signal value (8031). Alternately, when the sampled first temperature signal is greater than a maximum acceptable first temperature signal value (8031), the electronic controller (190) commands the oxidant flow modulator (8025) to decrease a mass or volume flow rate of oxidant entering the mixing chamber (8015) which results in a decrease of the CPOX reaction temperature. In each case, the increase or decrease of the CPOX reaction temperature results in a corresponding proportional increase or decrease in the temperature of the thermally conductive element thermally conductively coupled between the catalyzing body (9005, 10005, 11005, 12005, 13005) and first thermal sensor (8030). In a non-limiting exemplary embodiment, the first signal sampling rate ranges between about 5 Hz and 100 KHz. In a non-limiting exemplary embodiment, a minimum incremental change in the volume flow rate of the oxidant ranges between 0.1 to 2.0 Standard Cubic Centimeters per minute (SCCM).

8.12.11.2 SOFC Reaction Temperature

In an exemplary operating mode, a second temperature signal (8041) is received, by the electronic controller (190), from the second thermal sensor (8040). The second temperature signal (8041) may comprise an analog or digital signal corresponding with a voltage or current amplitude, a normalized voltage or current amplitude, or the like, wherein each different voltage or current amplitude value of the second temperature signal (8041) corresponds with a different temperature being sensed by the second thermal sensor (8040). The electronic controller (190) stores one of more second temperature set point values. Each second temperature set point value corresponds with a second temperature signal value or range of values that corresponds with an SOFC reaction temperature that produces a desired result.

The desired result may comprise any one of a threshold for DC power or current generation by the SOFC fuel cell stack or a DC power or current output value corresponding with median, maximum, or other DC power or current amplitude output. Other desired result criteria are a composition of exhaust gas exiting from the system exhaust port (2165), or the exhaust gas exiting from the SOFC tubes into the combustion chamber (2135), e.g. when the exhaust gas composition is substantially free of unreacted anode gas components, $H_2$ and CO, and/or free of byproducts that may indicate an incomplete conversion of the anode gas to electrical power. Still other desired result criteria are various measurable characteristics of an efficiency of the fuel cell, e.g. electrical energy output per unit volume of hydrocarbon fuel input, or the like.

As described above with respect to the first set point temperature values, each fuel type and each operating mode of the SOFC system, may have a different second temperature set point value that corresponds with only one hydrocarbon fuel type or only one operating mode, so the electronic controller (190) preferably stores a different second temperature set point value for each of a plurality of different hydrocarbon fuel types, for each operating mode, or the like. Accordingly, the electronic controller (190) may also sense the hydrocarbon fuel type being used by the SOFC system or a user may input hydrocarbon fuel type and other parameters of the SOFC system. Either way, the electronic controller selects an appropriate second temperature set point value that corresponds with the fuel type, operating mode, or the like.

The second temperature set point value stored by the electronic controller (190) may include one second temperature signal value or a range of second temperature signal values that correspond with the second temperature set point. A correlation between the desired DC power output and the second temperature set point value or range of second temperature signal values is determined by a system calibration described below. In addition to storing the plurality of second set point values or ranges, corresponding with different hydrocarbon fuel types, the electronic controller may further store other temperature signal values that correspond with other desirable operating conditions such as, a safe maximum operating temperature, a minimum or threshold temperature for DC power generation, or the like.

The electronic controller (190) periodically samples the second temperature signal (8041) received thereby and compares the sampled second temperature signal value with an appropriate second temperature set point or second temperature set point range of values. If the sampled second temperature signal is equal to the second temperature set point or within the second set point range, no action is taken by the electronic controller. If the sampled second temperature signal is not equal to the second temperature set point value or is not within the second set point range of values, the electronic controller makes a logical conclusion to either increase or decrease the hydrocarbon fuel flow rate being delivered into the mixing chamber (8015) and then transmits one or more control and command signals to the hydrocarbon fuel flow modulator (8035), wherein the control signals correspond with either increasing or decreasing the hydrocarbon fuel flow rate to the mixing chamber (8015).

In one non-limiting exemplary operating mode, when the second temperature signal value is less than a minimum acceptable second temperature signal value, the electronic controller (190) commands the hydrocarbon flow modulator (8035) to increase the mass or volume flow rate of hydrocarbon fuel entering the mixing chamber (8015). Alternately, when the sampled second temperature signal is greater than a maximum acceptable second temperature signal value, the electronic controller (190) commands the hydrocarbon fuel flow modulator (8035) to decrease a mass or volume flow rate of hydrocarbon fuel entering the mixing chamber (8015). In the first instance, the increase in the flow rate of hydrocarbon fuel entering the mixing chamber (8015) increases the volume of hydrocarbon fuel being converted to syngas which ultimately increases the temperature of the syngas and of the tubular SOFC rods and this increase in temperature ultimately increases the temperature of the outer enclosure walls being sensed by the second thermal sensor (8040). In the second instance, the decrease in the flow rate of hydrocarbon fuel entering the mixing chamber (8015) decreases the volume of hydrocarbon fuel being converted to syngas which ultimately decreases the temperature of the syngas and of the tubular SOFC rods and this decrease in temperature ultimately decreases the temperature of the outer enclosure walls being sensed by the second thermal sensor (8040).

In this manner, the electronic controller (190) periodically samples the second signal (8041) generated by the second thermal sensor (8040) at a second signal sampling rate; and makes appropriate adjustments to increase or decrease the temperature being sensed by the second thermal sensor (8040) by increasing or decreasing the mass or volume flow rate of hydrocarbon fuel entering the mixing chamber (8015). The second signal sampling rate ranges between about 5 Hz and 100 KHz. The minimum incremental change in the volume flow rate of the hydrocarbon fuel ranges between 0.1 and 2.0 Standard Cubic Centimeters per minute (SCCM).

As will be recognized by those skilled in the art, when the oxidant flow rate to the mixing chamber (8015) is varied without also varying the hydrocarbon fuel flow rate, the O:C ratio is changed. Similarly, when the hydrocarbon fuel flow rate to the mixing chamber (8015) is varied without also varying the oxidant flow rate, the O:C ratio is also changed. As demonstrated by the plots of FIG. 15A, O:C ratio changes, whether resulting from only changing the oxidant flow rate, or only changing the hydrocarbon fuel flow rate, result in changes in the temperature being sensed by first thermal sensor (8030). Similarly, O:C ratio changes, whether resulting from only changing the oxidant flow rate, or only changing the hydrocarbon fuel flow rate, result in changes in composition of the syngas, with an increase in methane content occurring as the O:C ratio drops below about 1.35.

According, to one non-limited exemplary operating method of the present disclosure, a first control loop is operated by the electronic controller (190). In the first control loop, the first thermal sensor (8030) is sampled at a first sampling rate, e.g. 50 Hz, with each sample providing a first temperature signal value corresponding with the first thermal sensor (8030). Additionally, the oxidant flow modulator (8025) is controlled to adjust the oxidant flow rate to either increase or decrease the oxidant flow rate as required to maintain the first temperature signal value at the set point value or within the range of set point values corresponding with the first temperature signal stored by the electronic controller. While the oxidant flow modulator (8025) can be adjusted at the same rate as the first sampling rate of 50 Hz, the first sampling rate of the first temperature signal value and the adjustment rate of the oxidant flow modulator (8025) can differ. Preferably the first control loop is operated independently of a second control loop described below.

The non-limited exemplary operating method further includes operating a second control loop by the electronic controller (190). In the second control loop, the second thermal sensor (8040) is sampled at a second sampling rate, e.g. 50 Hz, with each sample providing a second temperature signal value corresponding with the second thermal sensor (8040). Additionally, the hydrocarbon fuel flow modulator (8035) is controlled to adjust the hydrocarbon fuel flow rate to either increase or decrease the hydrocarbon fuel flow rate as required to maintain the second temperature signal value at the set point value or within the range of set point values corresponding with the second temperature signal stored by the electronic controller. While the hydrocarbon fuel flow modulator (8035) can be adjusted at the same rate as the second sampling rate of 50 Hz, the sampling rate of the second temperature signal value and the adjustment rate of the hydrocarbon fuel flow modulator (8035) can differ. Preferably the second control loop is operated independently of a first control loop described above.

The non-limited exemplary operating method further includes operating a third control loop by the electronic controller (190). In the third control loop, each second temperature signal value corresponding with the second thermal sensor (8040) is compared with a control failsafe temperature corresponding with the location of the second thermal sensor that is stored by the electronic controller (190). The control failsafe temperature corresponding with the location of the second thermal sensor is a maximum safe operating temperature for the location of the second thermal sensor (8040), which for the present example embodiment is a surface of the hot zone enclosure wall, or any other surface of the first thermally conductive pathway. When the control failsafe temperature corresponding with the location of the second thermal sensor is detected by the electronic controller, the electronic controller is configured to close the hydrocarbon fuel flow modulator (8035) to stop further fuel flow into the mixing chamber (8015). While the hydrocarbon fuel flow modulator is closed, the electronic controller is configured to fully open the oxidant and cathode gas flow modulators (8025, 8050) to pump oxidant through the SOFC system for cooling.

The non-limited exemplary operating method further includes operating a fourth control loop by the electronic controller (190). In the fourth control loop, the SOFC system is purposely operated with a high O:C ratio e.g. corresponding with an elevated first thermal sensor value T_CPOX, as shown in the plot (1510) in FIG. 15A. The selected elevated sensor value T_CPOX, for the fourth control loop, is greater than the setpoint sensor value T_CPOX or range of sensor values T_CPOX (1530) used during normal operation. The fourth control loop may be used during a startup mode, e.g. to more rapidly heat the SOFC system to an SOFC reaction temperature, e.g. sensed as by the second thermal sensor (8040). The fourth control loop may also be used to purposely over heat the SOFC system as a means for cleaning the catalyst layer (3090) and solid oxide anode electrode layers (150), e.g. to burn off tar deposits, or the like.

The fourth control loop is initiated to operate the SOFC system with an O:C ratio corresponding with the elevated first thermal sensor signal T_CPOX. In the example calibration chart of FIG. 15A, the elevated first thermal sensor signal T_CPOX at least corresponds with an O:C ratio greater than about 1.4. In one non-limiting embodiment, the fourth control loop in configured to run the SOFC system with an O:C ratio of 1.5 or greater, for a predetermined time period or until the elevated first thermal sensor signal T_CPOX reaches an upper setpoint value corresponding with a maximum first thermal sensor signal T_CPOX.

The fourth control loop includes a stored value or range of values associated with an elevated first thermal sensor signal, T_CPOX-elevated. The T_CPOX-elevated values provide a corresponding elevated O:C ratio that is greater than the O:C ratio corresponding with the setpoint temperature or set point temperature range (1530) used for normal operation. Preferably, the elevated O:C ratio is in a range of 2.0 to 2.2. Alternately the elevated temperature T_CPOX-elevated is a range of temperature values corresponding with the first temperature signal (8031) that provides an O:C ratio between about 2.0 and 2.2.

One non-limiting exemplary implementation of the fourth control loop is to change the set point value or range of values (1530) corresponding with first thermal sensor signal used for normal operation to the T_CPOX-elevated set point value or range of values corresponding with the desired elevated O:C ratio and then allow the fourth control loop to modulate oxidant flow rate as required to increase the first temperature signal values to comply with the T_CPOX-elevated set point value or range of values, without changing the hydrocarbon fuel flow rate. After the desired duration at the elevated temperature or O:C ratio, the fourth control loop ends its operation and changes the elevated temperature T_CPOX-elevated set point value or range of values back to the set point value or range of values (1530) corresponding with first thermal sensor signal used for normal operation and returns control back to the first and second control loops. Other parameters usable to end operation of the fourth control loop include, monitoring the second temperature signal (8041) and or monitoring the DC power or current amplitude generated by the SOFC stack as a means for determining when the SOFC stack has reached an acceptable operating temperature, or the like.

8.11.13 Calibration Procedure

According to the present disclosure an optimization process is carried out to maximize the weight percentage of the anode gas components $H_2$ and CO of the syngas, while also minimizing the weight percentage of unreacted hydrocarbons e.g. $CH_4$, $C_2H_x$ and other longer hydrocarbon molecule chains including ethane ($C_2H_6$) propane ($C_3H_8$), butane ($C_4H_{10}$), or the like. In some calibration procedures, the optimization process also includes characterizing the weight percentage of other components of the syngas (2027) such as oxygen gas, water, nitrogen gas, carbon monoxide, carbon dioxide, tar ($C_{10}H_8$), and sulfides, including carbon disulfide ($CS_2$), hydrogen sulfide ($H_2S$), sulfur dioxide ($SO_2$), or the like. More generally, the optimization process is carried out to identify a primary set point value or range of set point values corresponding with the first temperature signal (8031). The primary set point value, or range of set point values correspond with values generated by the first thermal sensor (8030) that correspond with a repeatable desired result related to a characteristic of the CPOX reaction. As noted above the desired result is a desired syngas composition; however, a different and simpler desired result is a weight percentage of methane of less than 0.01%, or the like.

The optimization process is performed to qualify a system design based on a specific hydrocarbon fuel type. The system design includes the configuration and location of the thermally conductive element, (9005, 10005, 11005, 12005, 13005), the configuration and location of the first thermal sensor (8031) with respect to the thermally conductive element, the configuration and physical dimensions of the catalyst body (3030), the configuration and location of the second thermal sensor (8040) and the repeatable desired result selected to characterize the CPOX reaction.

In a first calibration step, the SOFC system is installed into a calibration tool or fixture that includes elements provided to measure various operating parameters of the SOFC system, such as DC output power and or current generated by the SOFC system oxidant and hydrocarbon fuel flow rates, e.g. in the conduits (8017) and (8022), cathode gas flow rate, e.g. in the conduit (8055), syngas gas composition, e.g. in the input manifold (3055), and exhaust gas composition at the exit of the SOFC stack, e.g. in the combustion chamber (2135).

The calibration tool or fixture includes at least one gas chromatograph probe positioned to sample syngas exiting from the catalyzing body (3030) and a gas chromatograph configured to make the desired syngas composition analysis. Optionally, a second gas chromatograph probe is positioned to sample exhaust gas exiting from the SOFC stack, e.g. positioned inside the combustion chamber (2135) and a second gas chromatograph is configured to make the desired exhaust gas composition analysis. The calibration tool or fixture also provides a mass of volume flow rate meter associated with each of the oxidant flow modulator (8025) and the hydrocarbon fuel modulator (8035) and optionally, the cathode flow modulator (8050) for measuring appropriate gas flow rates. The calibration tool or fixture includes a calibration controller configured to operate the SOFC system, e.g. to sample thermal sensor signals (8031) and (8040), to sample DC power output values, e.g. current and/or power amplitude, to modulate oxidant, hydrocarbon fuel, and cathode air flow rates, to sample the flow rate meters, to store set point values, to analyze and store gas composition data, to determine and select set point values or ranges of values for each of the thermal sensors signals (8031) and (8040), or the like. The calibration controller is configured to collect gas chromatograph sample data, flow meter data and first and second thermal sensor data, and perform logical operations related to carrying out a calibration process by analyzing data associated with achieving one or more repeatable desired results related to a characteristic of the CPOX reaction and/or related to achieving the repeatable desired result related to a characteristic of the SOFC reaction.

In a second calibration step the SOFC system is brought to a steady state operating mode wherein an SOFC reaction has been initiated and the SOFC system is generating DC power. Thereafter operating parameters of the SOFC system are varied by the calibration controller as required to achieve the repeatable desired result related to a characteristic of the SOFC reaction. As noted above, the desired result related to a characteristic of the SOFC reaction can be associated with characteristics of the DC power or current output. In one example, the second signal values output by the second thermal sensor (8040) are monitored over a range of hydrocarbon fuel flow rates while the oxidant flow rate is held constant, to plot DC power output over a range of O:C ratios. In one non-limiting example embodiment, the calibration system may select a second temperature signal set point value, or range of second temperature signal set point values corresponding with a DC power output characteristic such as, a set point corresponding with initiation of the DC power output, a set point corresponding with maximum obtainable DC power output and a set point corresponding with a median DC power output.

In another non-limiting example embodiment, the calibration system may select a second temperature signal set point value, or range of second temperature signal set point values corresponding to a composition of the exhaust gas exiting from the SOFC stack that demonstrates that the exhaust gas is substantially free of anode gas components. In still another non-limiting example embodiment, the calibration system may select a second temperature signal set point value, or range of second temperature signal set point values, or a ratio of hydrocarbon fuel flow rate input to DC current output, or the like. Irrespective of which desired output of the SOFC system is being evaluated to determine the second signal values output by the second thermal sensor (8040), the second signal values output by the second thermal sensor (8040) are monitored over whatever range of hydrocarbon fuel flow rates is used while the oxidant flow rate is held constant, to plot the desired output of the SOFC system vs O:C ratios. Additionally, these plots may be repeated for one or more different oxidant flow rates in order to find an optimum O:C ratio and corresponding optimum second signal value or range of values corresponding with the desired output of the SOFC system.

In a third calibration step, a weight percentage of each syngas component or selected syngas components is determined by analyzing a sample of the syngas by a gas chromatograph over a plurality of different O:C ratios. The O:C ratios are varied by only modifying the oxidant flow rate, which is a process that is carried out by the calibration controller. During the third calibration step, the hydrocarbon fuel flow rate is not changed. The calibration controller also samples the first temperature signal (8031) and the oxidant flow rate meter data over the plurality of different O:C ratios and stores the first signal values and the oxidant flow rate values. The calibration controller is configured to analyze the syngas component weight percentage for each O:C ratio and associate a first temperature signal value and oxidant flow rate value with each O:C ratio. Additionally, during the third calibration step, the calibration controller is configured to monitor, and record data associated with the desired output of the SOFC system. The data related with desired output of the SOFC system at least includes: the second temperature signal (8041) at each O:C ratio and one or more of, the hydrocarbon fuel and cathode air flow rate, a DC output power characteristic of the SOFC stack, a composition of the exhaust gas exiting from the SOFC stack as determined from gas chromatograph data, or the like.

In a fourth calibration step, the weight percentage of each syngas component corresponding with each of the plurality of different O:C ratios generated by the third calibration step is analyzed to determine which O:C ratios constantly produce the desired syngas composition, e.g. with a weight percentage of methane of less than 0.01%, or the like. The fourth calibration step further includes determining, by the calibration controller, the first temperature signal value, or range of first temperature signal values degenerated by the first thermal sensor (8030) that are associated with providing the desired syngas composition. As shown by plot (1510) in FIG. 15A, the first set point value or range of values (1530) corresponds with the lowest temperature of first temperature signal value T_CPOX that meets the desired syngas composition. However, other higher temperature values can be selected without deviating from the present disclosure. Once the first set point value or range of set point values (1530) is selected, using the fixed hydrocarbon fuel flow rate, corresponding with the second set point value or range of values corresponding with the second thermal sensor (8040), the fourth calibration process can be rerun using other fixed hydrocarbon fuel flow rates in order to make refinements of the SOFC system operation by making small changes in each of the first and second set point values.

When using the calibration fixture, the calibration procedure need only be performed once for a given SOFC system configuration using a given hydrocarbon fuel type to determine the CPOX reaction temperature set point associated with the first thermal sensor (8030) and the SOFC stack temperature set point associated with the second thermal sensor (8040).

The calibration fixture optionally also includes a plurality of different hydrocarbon fuel sources each corresponding with a different hydrocarbon fuel type to calibrate the SOFC system for each of the plurality of different hydrocarbon fuel types. Thus, a fifth calibration step includes repeating calibration steps two though four for each of the plurality of different hydrocarbon fuel types which can result in selecting different CPOX reaction temperature set points and different SOFC stack temperature set points for each different hydrocarbon fuel type.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications (e.g. a solid oxide fuel system that includes a fuel reformer module carrying out an exothermic reaction to reform combustible fuels housed therein), those skilled in the art will recognize that its usefulness is not limited thereto and that the present invention can be beneficially utilized in any number of environments and implementations where it is desirable to manage thermal energy in high temperature corrosive environments where flammable materials are processed. Accordingly, the claims set forth below should be construed in view of the full breadth and spirit of the invention as disclosed herein.

What is claimed is:

1. A fuel reformer module for initiating catalytic partial oxidation (CPDX) to reform a hydrocarbon fuel oxidant mixture and deliver a syngas reformate therefrom comprising:
a catalyzing body, having an input end and an output end comprising a solid substrate formed to include a plurality of catalyst fuel passages extending therethrough;
a catalyst layer, comprising a material selected to initiate the CPDX reaction, formed onto an inside surface of each of the plurality of catalyst fuel passages;
a thermally conductive element, comprising a material having a coefficient of thermal conductivity of 50 W/m° K or greater, thermally coupled with the catalyzing body; and
a first thermal sensor, thermally coupled with the thermally conductive element, for generating a first temperature signal corresponding with a temperature sensed by the first thermal sensor,
wherein a contact area between the thermally conductive element and the catalyzing body is greater than a contact area between the first thermal sensor and the thermally conductive element.

2. The fuel reformer of claim 1 wherein the input end and the output end are separated by a first longitudinal dimension that extends along a longitudinal axis of the catalyzing body and the contact surface area between the thermally conductive element and the catalyzing body has a second longitudinal dimension that extends along the longitudinal axis of the catalyzing body, wherein the second longitudinal dimension is at least one quarter of the first longitudinal dimension.

3. The fuel reformer of claim 2 wherein the second longitudinal dimension is in a range of one quarter to one half of the first longitudinal dimension.

4. The fuel reformer of claim 2 wherein the second longitudinal dimension is in a range of one quarter of to equal to the first longitudinal dimension.

5. The fuel reformer of claim 1 wherein the catalyzing body is cylindrical with a first longitudinal dimension that extends a longitudinal axis of the catalyzing body between the input end and the output end.

6. The fuel reformer of claim 5 wherein the first longitudinal dimension is 25 mm or larger and an outside diameter dimension of the catalyzing body is 25 mm or larger.

7. The fuel reformer of claim 1 wherein the contact area between the thermally conductive element and body is sized to provide a heat flux density between the catalyzing body and the thermally conductive element that enables the first thermal sensor to sense a temperature change of 1 to 2 degrees centigrade in less than 30 seconds.

8. The fuel reformer of claim 1 wherein a material volume of the thermally conductive element is sized to provide heat flux between the catalyzing body and the thermally conductive element that enables the first thermal sensor to sense a temperature change of 1 to 2 degrees centigrade in less than 30 seconds.

9. The fuel reformer of claim 1 wherein the contact area between the thermally conductive element and the catalyzing body and a material volume of the thermally conductive element are sized to provide a heat flux density between the catalyzing body and the thermally conductive element that enables the first thermal sensor to sense a temperature change of 1 to 2 degrees centigrade in less than 30 seconds.

10. The fuel reformer of claim 1 wherein the input end and the output end are separated by a first longitudinal dimension that extends along a longitudinal axis of the catalyzing body and wherein each of the plurality of catalyst fuel passages extends, between the input end and the output end, along a fuel passage longitudinal axis that is parallel with the longitudinal axis of the catalyzing body.

11. The fuel reformer of claim 1 wherein solid substrate comprises an open cell foam material, and the plurality of catalyst fuel passages comprise a plurality of interconnecting open cells.

12. The fuel reformer of claim 5 wherein the thermally conductive element comprises a prismatic rod disposed in mating contact with the outside diameter of the catalyzing body and wherein a longitudinal axis of the prismatic rod is oriented substantially parallel with the longitudinal axis of the catalyzing body.

13. The fuel reformer of claim 11 wherein the catalyzing body is cylindrical about a longitudinal axis of the catalyzing body and the thermally conductive element comprises a prismatic rod disposed in mating contact with an outside diameter of the catalyzing body and wherein a longitudinal axis of the prismatic rod is oriented substantially parallel with the first longitudinal axis of the catalyzing body.

14. The fuel reformer of claim 5 wherein the thermally conductive element comprises a cylindrical segment disposed in mating contact with an outside diameter of the catalyzing body and wherein a longitudinal axis of the cylindrical segment is oriented substantially parallel with the longitudinal axis of the catalyzing body and wherein the cylindrical segment includes a contact surface area that is formed with a radius of curvature that is matched with a radius of curvature of an outside circumferential surface of the cylindrical catalyzing body.

15. The fuel reformer of claim 5 wherein the thermally conductive element comprises an annular wall encompassing a hollow cylinder having an inside diameter disposed in mating contact with the outside diameter of the catalyzing body, wherein a longitudinal axis of the annular wall is oriented substantially parallel with the longitudinal axis of the catalyzing body, and wherein the inside diameter is sized to substantially match the outside diameter of the catalyzing body.

16. The fuel reformer of claim 5 wherein the thermally conductive element comprises an annular wall encompassing a spiral portion of a hollow cylinder having an inside diameter disposed in mating contact with the outside diameter of the catalyzing body, wherein a longitudinal axis of the annular wall is oriented substantially parallel with the longitudinal axis of the catalyzing body, wherein the inside diameter is sized to substantially match the outside diameter of the catalyzing body.

17. The fuel reformer of claim 5 wherein the catalyzing body is formed to include a central cylindrical cavity, wherein the central cylindrical cavity is formed with a cavity inside diameter, wherein the thermally conductive element comprises a solid cylindrical element formed with a solid cylindrical element outside diameter, wherein the thermally conductive element is disposed inside the central cylindrical cavity, and wherein the cavity inside diameter is sized to substantially match the outside diameter of the solid cylindrical element.

18. An SOFC system comprising the fuel reformer module of claim 1 and further comprising:
- a hydrocarbon fuel flow rate modulator and an air flow rate modulator configured to vary an oxygen to Carbon (O:C) ratio of a fuel air mixture being delivered to the input end;
- an electronic controller operating to transmit independent command and control signals to each of the hydrocarbon fuel flow rate modulator and the oxidant flow rate modulator to vary the O:C ratio;
- a solid oxide fuel cell (SOFC) stack comprising a plurality individual SOFC fuel cells each receiving the fuel air mixture for participating in an SOFC reaction;
- a hot zone enclosure comprising a plurality of hot zone enclosure walls surrounding the SOFC stack;
- a second thermal sensor, coupled to a surface of the hot zone enclosure walls for generating a second temperature signal corresponding with a temperature of the surface of the hot zone enclosure walls;
- a range of first set point temperature values, stored by the electronic controller, corresponding with a range of desired first temperature signal values corresponding with the temperature of the thermally conductive element;
- a range of second set point temperature values, stored by the electronic controller, corresponding with a range of second signal values corresponding with a temperature corresponding with a surface of the hot zone enclosure walls;
- wherein the electronic controller operates a first control loop based on sampling the first thermal sensor signal values and controlling the oxidant flow rate modulator to increase or decrease the oxidant flow rate to maintain the sampled first temperature signal values within the range of first set point values; and,
- wherein the electronic controller operates a second control loop based on sampling the second thermal sensor signal values and controlling the hydrocarbon fuel flow rate modulator to increase or decrease the hydrocarbon fuel flow rate to maintain the sampled second temperature signal values within the range of second set point values.

19. The fuel reforming module of claim 1, further comprising a fuel reactor body comprising a reactor shield base wall, wherein the end of the fuel reactor body and the reactor shield base wall are opposing across an interface and wherein the reactor shield base wall is formed from a material having a coefficient of thermal conductivity of 140 W/m K or greater.

* * * * *